United States Patent
Ito et al.

(10) Patent No.: US 9,199,168 B2
(45) Date of Patent: Dec. 1, 2015

(54) GAME SYSTEM, GAME APPARATUS, STORAGE MEDIUM HAVING GAME PROGRAM STORED THEREIN, AND GAME PROCESS METHOD

(75) Inventors: Jun Ito, Kyoto (JP); Keizo Ohta, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 13/198,251

(22) Filed: Aug. 4, 2011

(65) Prior Publication Data
US 2012/0040759 A1    Feb. 16, 2012

(30) Foreign Application Priority Data

Aug. 6, 2010  (JP) .................................. 2010-177893
May 23, 2011  (JP) .................................. 2011-114864

(51) Int. Cl.
*A63F 13/00*    (2014.01)
*A63F 9/24*    (2006.01)
(Continued)

(52) U.S. Cl.
CPC ................. *A63F 13/06* (2013.01); *A63F 13/30* (2014.09); *A63F 13/428* (2014.09); *A63F 13/525* (2014.09); *A63F 13/5255* (2014.09); *G06F 3/0346* (2013.01); *A63F 13/5252* (2014.09)

(58) Field of Classification Search
CPC ....... A63F 13/06; A63F 13/30; A63F 13/428; A63F 13/525; A63F 13/5252; A63F 13/5255; A63F 2300/10; A63F 2300/30; A63F 2300/301; A63F 2300/6045; A63F 2300/6661; A63F 2300/6676; A63F 2300/6684; G06F 3/0346

USPC ......... 463/30–37, 39, 40; 345/156–167, 173, 345/1.1–1.3, 418–427

See application file for complete search history.

(56) References Cited

U.S. PATENT DOCUMENTS

| | | | |
|---|---|---|---|
| 4,210,329 | A | 7/1980 | Steiger et al. |
| 5,009,501 | A | 4/1991 | Fenner et al. |

(Continued)

FOREIGN PATENT DOCUMENTS

| | | |
|---|---|---|
| CA | 2707609 | 6/2009 |
| CN | 1593709 | 3/2005 |

(Continued)

OTHER PUBLICATIONS

Apr. 26, 2012 Office Action for U.S. Appl. No. 13/019,928, 18 pages.

(Continued)

*Primary Examiner* — Milap Shah
(74) *Attorney, Agent, or Firm* — Nixon & Vanderhye P.C.

(57) ABSTRACT

A game system includes a game apparatus, an operating device, and a hand-held device. The game apparatus performs a game control process based on first operation data representing a first player's operation on the operating device and second operation data representing a second player's operation on the hand-held device. The game apparatus generates a first game image for the first player, which is an image of a virtual game space and represents a result of the game control process, based on a first virtual camera set in the game space. The game apparatus also generates a second game image for the second player, which is an image of the game space, based on a second virtual camera set in the game space. The first game image is displayed on a first display device provided independently of the hand-held device. The second game image is displayed on a second display device of the hand-held device.

25 Claims, 24 Drawing Sheets

(51) Int. Cl.
*A63F 13/20* (2014.01)
*A63F 13/525* (2014.01)
*A63F 13/5255* (2014.01)
*A63F 13/30* (2014.01)
*A63F 13/428* (2014.01)
*G06F 3/0346* (2013.01)
*A63F 13/5252* (2014.01)

(56) References Cited

U.S. PATENT DOCUMENTS

| | | | |
|---|---|---|---|
| 5,440,326 | A | 8/1995 | Quinn |
| 5,452,104 | A | 9/1995 | Lee |
| 5,602,566 | A | 2/1997 | Motosyuku et al. |
| 5,608,449 | A | 3/1997 | Swafford, Jr. et al. |
| 5,619,397 | A | 4/1997 | Honda et al. |
| 5,820,462 | A | 10/1998 | Yokoi et al. |
| 5,825,350 | A | 10/1998 | Case, Jr. et al. |
| 5,825,352 | A | 10/1998 | Bisset et al. |
| D411,530 | S | 6/1999 | Carter et al. |
| 5,943,043 | A | 8/1999 | Furuhata et al. |
| 6,020,891 | A | 2/2000 | Rekimoto |
| 6,069,790 | A | 5/2000 | Howell et al. |
| 6,084,584 | A | 7/2000 | Nahi et al. |
| 6,084,594 | A | 7/2000 | Goto |
| 6,104,380 | A | 8/2000 | Stork et al. |
| 6,126,547 | A | 10/2000 | Ishimoto |
| 6,164,808 | A | 12/2000 | Shibata et al. |
| 6,183,365 | B1 | 2/2001 | Tonomura et al. |
| 6,201,554 | B1 | 3/2001 | Lands |
| 6,208,329 | B1 | 3/2001 | Ballare |
| 6,238,291 | B1 | 5/2001 | Fujimoto et al. |
| 6,252,153 | B1 | 6/2001 | Toyama |
| 6,254,481 | B1 | 7/2001 | Jaffe |
| 6,323,846 | B1 | 11/2001 | Westerman et al. |
| 6,340,957 | B1 | 1/2002 | Adler et al. |
| 6,347,290 | B1 | 2/2002 | Bartlett |
| 6,379,249 | B1 | 4/2002 | Satsukawa et al. |
| 6,396,480 | B1 | 5/2002 | Schindler et al. |
| 6,400,376 | B1 | 6/2002 | Singh et al. |
| 6,411,275 | B1 | 6/2002 | Hedberg |
| 6,425,822 | B1 | 7/2002 | Hayashida et al. |
| 6,466,198 | B1 | 10/2002 | Feinstein |
| 6,466,831 | B1 | 10/2002 | Shibata et al. |
| 6,498,860 | B1 | 12/2002 | Sasaki et al. |
| 6,499,027 | B1 | 12/2002 | Weinberger |
| 6,500,070 | B1 | 12/2002 | Tomizawa et al. |
| 6,509,896 | B1 | 1/2003 | Saikawa et al. |
| 6,538,636 | B1 | 3/2003 | Harrison |
| 6,540,610 | B2 | 4/2003 | Chatani |
| 6,540,614 | B1 | 4/2003 | Nishino et al. |
| 6,557,001 | B1 | 4/2003 | Dvir et al. |
| 6,567,068 | B2 | 5/2003 | Rekimoto |
| 6,567,101 | B1 | 5/2003 | Thomas |
| 6,567,984 | B1 | 5/2003 | Allport |
| 6,570,557 | B1 | 5/2003 | Westerman et al. |
| 6,582,299 | B1 | 6/2003 | Matsuyama et al. |
| 6,657,627 | B1 | 12/2003 | Wada et al. |
| 6,690,358 | B2 | 2/2004 | Kaplan |
| 6,716,103 | B1 | 4/2004 | Eck et al. |
| 6,798,429 | B2 | 9/2004 | Bradski |
| 6,834,249 | B2 | 12/2004 | Orchard |
| 6,847,351 | B2 | 1/2005 | Noguera |
| 6,856,259 | B1 | 2/2005 | Sharp |
| 6,888,536 | B2 | 5/2005 | Westerman et al. |
| 6,897,833 | B1 | 5/2005 | Robinson et al. |
| 6,908,386 | B2* | 6/2005 | Suzuki et al. ............ 463/30 |
| 6,921,336 | B1 | 7/2005 | Best |
| 6,930,661 | B2 | 8/2005 | Uchida et al. |
| 6,933,923 | B2 | 8/2005 | Feinstein |
| 6,939,231 | B2 | 9/2005 | Mantyjarvi et al. |
| 6,954,491 | B1 | 10/2005 | Kim et al. |
| 6,966,837 | B1 | 11/2005 | Best |
| 6,988,097 | B2 | 1/2006 | Shirota |
| 6,990,639 | B2 | 1/2006 | Wilson |
| 6,993,451 | B2 | 1/2006 | Chang et al. |
| 7,007,242 | B2 | 2/2006 | Suomela et al. |
| D519,118 | S | 4/2006 | Woodward |
| 7,023,427 | B2 | 4/2006 | Kraus et al. |
| 7,030,856 | B2 | 4/2006 | Dawson et al. |
| 7,030,861 | B1 | 4/2006 | Westerman et al. |
| 7,038,662 | B2 | 5/2006 | Noguera |
| 7,053,887 | B2 | 5/2006 | Kraus et al. |
| 7,068,294 | B2 | 6/2006 | Kidney et al. |
| 7,088,342 | B2 | 8/2006 | Rekimoto et al. |
| 7,109,978 | B2 | 9/2006 | Gillespie et al. |
| 7,115,031 | B2* | 10/2006 | Miyamoto et al. ............ 463/1 |
| 7,128,648 | B2 | 10/2006 | Watanabe |
| 7,140,962 | B2 | 11/2006 | Okuda et al. |
| 7,142,191 | B2 | 11/2006 | Idesawa et al. |
| 7,158,123 | B2 | 1/2007 | Myers et al. |
| 7,173,604 | B2 | 2/2007 | Marvit et al. |
| 7,176,886 | B2 | 2/2007 | Marvit et al. |
| 7,176,887 | B2 | 2/2007 | Marvit et al. |
| 7,176,888 | B2 | 2/2007 | Marvit et al. |
| 7,180,500 | B2 | 2/2007 | Marvit et al. |
| 7,180,501 | B2 | 2/2007 | Marvit et al. |
| 7,180,502 | B2 | 2/2007 | Marvit et al. |
| 7,184,020 | B2 | 2/2007 | Matsui |
| 7,225,101 | B2 | 5/2007 | Usuda et al. |
| 7,233,316 | B2 | 6/2007 | Smith et al. |
| 7,254,775 | B2 | 8/2007 | Geaghan et al. |
| 7,256,767 | B2 | 8/2007 | Wong et al. |
| 7,271,795 | B2 | 9/2007 | Bradski |
| 7,275,994 | B2 | 10/2007 | Eck et al. |
| 7,280,096 | B2 | 10/2007 | Marvit et al. |
| 7,285,051 | B2* | 10/2007 | Eguchi et al. ............ 463/43 |
| 7,289,102 | B2 | 10/2007 | Hinckley et al. |
| 7,295,191 | B2 | 11/2007 | Kraus et al. |
| 7,301,526 | B2 | 11/2007 | Marvit et al. |
| 7,301,527 | B2 | 11/2007 | Marvit |
| 7,301,529 | B2 | 11/2007 | Marvit et al. |
| 7,321,342 | B2 | 1/2008 | Nagae |
| 7,333,087 | B2 | 2/2008 | Soh et al. |
| RE40,153 | E | 3/2008 | Westerman et al. |
| 7,339,580 | B2 | 3/2008 | Westerman et al. |
| 7,352,358 | B2 | 4/2008 | Zalewski et al. |
| 7,352,359 | B2 | 4/2008 | Zalewski et al. |
| 7,365,735 | B2 | 4/2008 | Reinhardt et al. |
| 7,365,736 | B2 | 4/2008 | Marvit et al. |
| 7,365,737 | B2 | 4/2008 | Marvit et al. |
| D568,882 | S | 5/2008 | Ashida et al. |
| 7,376,388 | B2 | 5/2008 | Ortiz et al. |
| 7,389,591 | B2 | 6/2008 | Jaiswal et al. |
| 7,391,409 | B2 | 6/2008 | Zalewski et al. |
| 7,403,220 | B2 | 7/2008 | MacIntosh et al. |
| 7,431,216 | B2 | 10/2008 | Weinans |
| 7,446,731 | B2 | 11/2008 | Yoon |
| 7,461,356 | B2 | 12/2008 | Mitsutake |
| 7,479,948 | B2 | 1/2009 | Kim et al. |
| 7,479,949 | B2 | 1/2009 | Jobs et al. |
| 7,510,477 | B2 | 3/2009 | Argentar |
| 7,518,503 | B2 | 4/2009 | Peele |
| 7,519,468 | B2 | 4/2009 | Orr et al. |
| 7,522,151 | B2 | 4/2009 | Arakawa et al. |
| 7,540,011 | B2 | 5/2009 | Wixson et al. |
| 7,552,403 | B2 | 6/2009 | Wilson |
| 7,570,275 | B2 | 8/2009 | Idesawa et al. |
| D599,352 | S | 9/2009 | Takamoto et al. |
| 7,607,111 | B2 | 10/2009 | Vaananen et al. |
| 7,614,008 | B2 | 11/2009 | Ording |
| 7,619,618 | B2 | 11/2009 | Westerman et al. |
| 7,626,598 | B2 | 12/2009 | Manchester |
| 7,647,614 | B2 | 1/2010 | Krikorian et al. |
| 7,656,394 | B2 | 2/2010 | Westerman et al. |
| 7,663,607 | B2 | 2/2010 | Hotelling et al. |
| 7,667,707 | B1 | 2/2010 | Margulis |
| 7,692,628 | B2 | 4/2010 | Smith et al. |
| 7,696,980 | B1 | 4/2010 | Piot et al. |
| 7,699,704 | B2* | 4/2010 | Suzuki et al. ............ 463/30 |
| 7,705,830 | B2 | 4/2010 | Westerman et al. |
| 7,710,396 | B2 | 5/2010 | Smith et al. |
| 7,719,523 | B2 | 5/2010 | Hillis |
| 7,721,231 | B2 | 5/2010 | Wilson |

(56) References Cited

U.S. PATENT DOCUMENTS

| | | | |
|---|---|---|---|
| 7,730,402 B2 | 6/2010 | Song | |
| 7,736,230 B2 | 6/2010 | Argentar | |
| 7,762,891 B2* | 7/2010 | Miyamoto et al. | 463/31 |
| D620,939 S | 8/2010 | Suetake et al. | |
| 7,782,297 B2 | 8/2010 | Zalewski | |
| 7,791,808 B2 | 9/2010 | French et al. | |
| 7,827,698 B2 | 11/2010 | Jaiswal et al. | |
| D636,773 S | 4/2011 | Lin | |
| 7,934,995 B2 | 5/2011 | Suzuki | |
| D641,022 S | 7/2011 | Dodo et al. | |
| 8,038,533 B2* | 10/2011 | Tsuchiyama et al. | 463/42 |
| 8,105,169 B2 | 1/2012 | Ogasawara et al. | |
| D666,250 S | 8/2012 | Fulghum et al. | |
| 8,246,460 B2* | 8/2012 | Kitahara | 463/37 |
| 8,256,730 B2 | 9/2012 | Tseng | |
| 8,306,768 B2 | 11/2012 | Yamada et al. | |
| 8,317,615 B2 | 11/2012 | Takeda et al. | |
| 8,337,308 B2 | 12/2012 | Ito et al. | |
| 8,339,364 B2 | 12/2012 | Takeda et al. | |
| 8,529,352 B2 | 9/2013 | Mae et al. | |
| 8,531,571 B1* | 9/2013 | Cote | G06F 1/1686 345/158 |
| 8,567,599 B2 | 10/2013 | Beatty et al. | |
| 8,613,672 B2 | 12/2013 | Mae et al. | |
| 8,684,842 B2 | 4/2014 | Takeda et al. | |
| 8,690,675 B2 | 4/2014 | Ito et al. | |
| 8,702,514 B2 | 4/2014 | Ashida et al. | |
| 8,804,326 B2 | 8/2014 | Ashida et al. | |
| 8,814,680 B2 | 8/2014 | Ashida et al. | |
| 8,814,686 B2 | 8/2014 | Takeda et al. | |
| 8,827,818 B2 | 9/2014 | Ashida et al. | |
| 8,845,426 B2 | 9/2014 | Ohta et al. | |
| 8,896,534 B2 | 11/2014 | Takeda et al. | |
| 8,913,009 B2 | 12/2014 | Takeda et al. | |
| 8,956,209 B2 | 2/2015 | Nishida et al. | |
| 8,961,305 B2 | 2/2015 | Takeda et al. | |
| 2001/0019363 A1 | 9/2001 | Katta et al. | |
| 2002/0103026 A1 | 8/2002 | Himoto et al. | |
| 2002/0103610 A1 | 8/2002 | Bachmann et al. | |
| 2002/0107071 A1 | 8/2002 | Himoto et al. | |
| 2002/0122068 A1 | 9/2002 | Tsuruoka | |
| 2002/0165028 A1* | 11/2002 | Miyamoto et al. | 463/46 |
| 2003/0027517 A1 | 2/2003 | Callway et al. | |
| 2003/0207704 A1 | 11/2003 | Takahashi et al. | |
| 2003/0216179 A1* | 11/2003 | Suzuki et al. | 463/35 |
| 2004/0023719 A1 | 2/2004 | Hussaini et al. | |
| 2004/0092309 A1 | 5/2004 | Suzuki | |
| 2004/0229687 A1* | 11/2004 | Miyamoto et al. | 463/30 |
| 2004/0266529 A1 | 12/2004 | Chatani | |
| 2005/0176502 A1 | 8/2005 | Nishimura et al. | |
| 2005/0181756 A1 | 8/2005 | Lin | |
| 2005/0253806 A1 | 11/2005 | Liberty et al. | |
| 2006/0012564 A1 | 1/2006 | Shiozawa et al. | |
| 2006/0015808 A1 | 1/2006 | Shiozawa et al. | |
| 2006/0015826 A1 | 1/2006 | Shiozawa et al. | |
| 2006/0038914 A1 | 2/2006 | Hanada et al. | |
| 2006/0077165 A1 | 4/2006 | Jang | |
| 2006/0094502 A1 | 5/2006 | Katayama et al. | |
| 2006/0174026 A1* | 8/2006 | Robinson et al. | 709/231 |
| 2006/0250764 A1 | 11/2006 | Howarth et al. | |
| 2006/0252537 A1 | 11/2006 | Wu | |
| 2006/0252541 A1 | 11/2006 | Zalewski et al. | |
| 2006/0267928 A1 | 11/2006 | Kawanobe et al. | |
| 2007/0021210 A1 | 1/2007 | Tachibana | |
| 2007/0021216 A1 | 1/2007 | Guruparan | |
| 2007/0049374 A1 | 3/2007 | Ikeda et al. | |
| 2007/0060383 A1 | 3/2007 | Dohta | |
| 2007/0202956 A1 | 8/2007 | Ogasawara et al. | |
| 2007/0252901 A1 | 11/2007 | Yokonuma et al. | |
| 2007/0265085 A1 | 11/2007 | Miyamoto et al. | |
| 2008/0015017 A1 | 1/2008 | Ashida et al. | |
| 2008/0024435 A1 | 1/2008 | Dohta | |
| 2008/0030458 A1 | 2/2008 | Helbing et al. | |
| 2008/0039202 A1 | 2/2008 | Sawano et al. | |
| 2008/0064500 A1 | 3/2008 | Satsukawa et al. | |
| 2008/0100995 A1 | 5/2008 | Ryder et al. | |
| 2008/0150911 A1 | 6/2008 | Harrison | |
| 2008/0220867 A1 | 9/2008 | Zalewski et al. | |
| 2008/0300055 A1 | 12/2008 | Lutnick et al. | |
| 2009/0082107 A1 | 3/2009 | Tahara et al. | |
| 2009/0143140 A1* | 6/2009 | Kitahara | 463/37 |
| 2009/0183193 A1 | 7/2009 | Miller | |
| 2009/0195349 A1 | 8/2009 | Frader-Thompson et al. | |
| 2009/0219677 A1 | 9/2009 | Mori et al. | |
| 2009/0225159 A1 | 9/2009 | Schenider et al. | |
| 2009/0241038 A1 | 9/2009 | Izuno et al. | |
| 2009/0254953 A1 | 10/2009 | Lin | |
| 2009/0256809 A1 | 10/2009 | Minor | |
| 2009/0280910 A1 | 11/2009 | Gagner et al. | |
| 2009/0322671 A1 | 12/2009 | Scott et al. | |
| 2009/0322679 A1 | 12/2009 | Sato et al. | |
| 2010/0007926 A1 | 1/2010 | Imaizumi et al. | |
| 2010/0009746 A1 | 1/2010 | Raymond et al. | |
| 2010/0009760 A1 | 1/2010 | Shimamura et al. | |
| 2010/0045666 A1 | 2/2010 | Kornmann et al. | |
| 2010/0083341 A1 | 4/2010 | Gonzalez | |
| 2010/0105480 A1 | 4/2010 | Mikhailov et al. | |
| 2010/0149095 A1 | 6/2010 | Hwang | |
| 2010/0156824 A1 | 6/2010 | Paleczny et al. | |
| 2010/0311501 A1 | 12/2010 | Hsu | |
| 2011/0021274 A1 | 1/2011 | Sato et al. | |
| 2011/0190049 A1 | 8/2011 | Mae et al. | |
| 2011/0190050 A1 | 8/2011 | Mae et al. | |
| 2011/0190052 A1 | 8/2011 | Takeda et al. | |
| 2011/0190061 A1 | 8/2011 | Takeda et al. | |
| 2011/0195785 A1 | 8/2011 | Ashida et al. | |
| 2011/0228457 A1 | 9/2011 | Moon et al. | |
| 2011/0285704 A1 | 11/2011 | Takeda et al. | |
| 2011/0287842 A1 | 11/2011 | Yamada et al. | |
| 2011/0295553 A1 | 12/2011 | Sato | |
| 2012/0001048 A1 | 1/2012 | Takahashi et al. | |
| 2012/0015732 A1 | 1/2012 | Takeda et al. | |
| 2012/0026166 A1 | 2/2012 | Takeda et al. | |
| 2012/0040759 A1 | 2/2012 | Ito et al. | |
| 2012/0044177 A1 | 2/2012 | Ohta et al. | |
| 2012/0046106 A1 | 2/2012 | Ito et al. | |
| 2012/0052952 A1 | 3/2012 | Nishida et al. | |
| 2012/0052959 A1 | 3/2012 | Nishida et al. | |
| 2012/0062445 A1 | 3/2012 | Haddick et al. | |
| 2012/0068927 A1 | 3/2012 | Poston et al. | |
| 2012/0086631 A1 | 4/2012 | Osman et al. | |
| 2012/0087069 A1 | 4/2012 | Fu et al. | |
| 2012/0088580 A1 | 4/2012 | Takeda et al. | |
| 2012/0106041 A1 | 5/2012 | Ashida et al. | |
| 2012/0106042 A1 | 5/2012 | Ashida et al. | |
| 2012/0108329 A1 | 5/2012 | Ashida et al. | |
| 2012/0108340 A1 | 5/2012 | Ashida et al. | |
| 2012/0119992 A1 | 5/2012 | Nishida et al. | |
| 2012/0258796 A1 | 10/2012 | Ohta et al. | |
| 2012/0270651 A1 | 10/2012 | Takeda et al. | |
| 2013/0063350 A1 | 3/2013 | Takeda et al. | |
| 2013/0109477 A1 | 5/2013 | Ito et al. | |
| 2014/0295966 A1 | 10/2014 | Ashida et al. | |

FOREIGN PATENT DOCUMENTS

| | | |
|---|---|---|
| CN | 1868244 | 11/2006 |
| CN | 201572520 U | 9/2010 |
| CN | 202270340 U | 6/2012 |
| CN | 202355827 | 8/2012 |
| CN | 202355828 U | 8/2012 |
| CN | 202355829 U | 8/2012 |
| EP | 0 710 017 | 5/1996 |
| EP | 0 835 676 | 4/1998 |
| EP | 1 469 382 | 10/2004 |
| EP | 1 723 992 | 11/2006 |
| EP | 2 158 947 | 3/2010 |
| FR | 2 932 998 | 1/2010 |
| JP | 06-285259 | 10/1994 |
| JP | 07-068052 | 3/1995 |
| JP | 07-088251 | 4/1995 |
| JP | 08-045392 | 2/1996 |
| JP | 08-095669 | 4/1996 |
| JP | 09-099173 | 4/1997 |

(56) References Cited

FOREIGN PATENT DOCUMENTS

| | | |
|---|---|---|
| JP | 09-294260 | 11/1997 |
| JP | 10-341388 | 12/1998 |
| JP | 2000-222185 | 8/2000 |
| JP | 2001-034247 | 2/2001 |
| JP | 2001-084131 | 3/2001 |
| JP | 2001-340641 | 12/2001 |
| JP | 2002-177644 | 6/2002 |
| JP | 2002-248267 | 9/2002 |
| JP | 2003-189484 | 7/2003 |
| JP | 2003-325972 A | 11/2003 |
| JP | 2004-032548 | 1/2004 |
| JP | 2004-329744 A | 11/2004 |
| JP | 3108313 U | 2/2005 |
| JP | 3703473 | 2/2005 |
| JP | 2005-269399 | 9/2005 |
| JP | 3770499 | 4/2006 |
| JP | 3797608 | 7/2006 |
| JP | 2006-350986 | 12/2006 |
| JP | 2007-021065 | 2/2007 |
| JP | 2007-061271 | 3/2007 |
| JP | 2007-075353 | 3/2007 |
| JP | 2007-075751 | 3/2007 |
| JP | 2007-260409 | 10/2007 |
| JP | 2007-274836 | 10/2007 |
| JP | 2007-289413 | 11/2007 |
| JP | 2007-310840 | 11/2007 |
| JP | 2007-313354 | 12/2007 |
| JP | 2008-067844 | 3/2008 |
| JP | 2008-264402 | 11/2008 |
| JP | 2010-017412 | 1/2009 |
| JP | 2009-178363 | 8/2009 |
| JP | 2009-200799 | 9/2009 |
| JP | 3153862 | 9/2009 |
| JP | 2009-219707 | 10/2009 |
| JP | 2009-230753 | 10/2009 |
| JP | 2009-247763 | 10/2009 |
| JP | 2009-536058 | 10/2009 |
| JP | 2010-017395 | 1/2010 |
| JP | 2010-066899 | 3/2010 |
| JP | 2010-142561 | 7/2010 |
| JP | 4601925 | 12/2010 |
| TW | M278452 | 10/2005 |
| TW | 419388 | 1/2011 |
| WO | 03-007117 | 1/2003 |
| WO | 03/083822 | 10/2003 |
| WO | 2007/128949 | 11/2007 |
| WO | WO 2007128949 A1 * | 11/2007 ............... A63F 13/10 |
| WO | 2007/143632 | 12/2007 |
| WO | 2008/136064 | 11/2008 |
| WO | 2009/038596 | 3/2009 |
| WO | 2010/088477 | 8/2010 |

OTHER PUBLICATIONS

Apple Support: "iPhone Technical Specifications", Apple, Aug. 22, 2008, URL:http://support.apple.com/kp/SP495, 2 pages.
May 10, 2012 European Search Report for EP11739553.3, 8 pages.
Mar. 16, 2012 Office Action for U.S. Appl. No. 13/019,924, 14 pages.
Office Action dated Jan. 4, 2013, issued in U.S. Appl. No. 13/145,690, filed Dec. 19, 2011.
Australian Patent Examination Report No. 1 issued Oct. 16, 2012, in Australian Patent Application No. 2011204815.
IGN Staff, "PS3 Games on PSP?", URL: http://www.ign.com/articles/2006/10/25/ps3-games-on-psp, publication date printed on the article: Oct. 25, 2006, retrieved in a Google search on pages indexed before Feb. 3, 2010, retrieved from Internet on Oct. 16, 2012.
Marcusita, "what benefits can i get out of my psp on my ps3", publication date printed on the article: Dec. 15, 2007, URL: http://web/archive.org/web/20080824222755/http://forums.afterdawn.com/thread_view.cfm/600615, publication date as per webarchive: Aug. 24, 2008, retrieved from Internet on Oct. 16, 2012.
Apple Support, "iPhone—Technical Specifications", http://support.apple.com/kb/SP2, 2010. 3 pages.
PersonalApplets: "Gyro Tennis App for iPhone 4 and iPod Touch 4th gen" YouTube, Aug. 9, 2010, Hyyp://www.youtube.com/watch?v=c7PRFbqWKIs, 2 pages.
Jhrogersii, "Review: Gyro Tennis for iPhone", iSource, Sep. 17, 2010, http://isource.com/2010/09/17/review-gyro-tennis-for-phone/, 10 pages.
IGN Staff, "PS3 Games on PSP?", URL: http://www.ign.com/articles/2006/10/25/ps3-games-on-psp, Publication date printed on article: Oct. 2006.
Marcusita, "What Benefits Can I Get Out of My PSP on My PS3", URL: http://web.archive.org/web/20080824222755/http://forums.afterdawn.com/thread_view.cfm/600615, Publication date printed on article: Dec. 15, 2007.
Rob Aspin et al., "Augmenting the CAVE: An initial study into close focused, inward looking, exploration in IPT systems," 11th IEE International Symposium Distributed Simulation and Real-Time Applications, pp. 217-224 (Oct. 1, 2007).
D. Weidlich et al., "Virtual Reality Approaches for Immersive Design," CIRP Annals, Elsevier BV, NL, CH, FR, vol. 56, No. 1, pp. 139-142 (Jan. 1, 2007).
G.W. Fitzmaurice et al., "Virtual Reality for Palmtop Computers," ACM Transactions on Information Systems, ACM, New York, NY, vol. 11, No. 3, pp. 197-218 (Jul. 1, 1993).
Johan Sanneblad et al., "Ubiquitous graphics," Proceedings of the Working Conference on Advanced Visual Interfaces, AVI '06, pp. 373-377 (Oct. 1, 2006).
Office Action dated Oct. 16, 2012 in Australian Application No. 2011204815.
English-language machine translation for JP 2009-178363.
English-language machine translation for JP 2009-247763.
English-language machine translation for JP 09-294260.
English-language machine translation for JP 2004-032548.
English-language machine translation for JP 4601925.
English-language machine translation for JP 2002-248267.
English-language machine translation for JP 2007-075751.
English-language machine translation for JP 2008-264402.
Mae et al., U.S. Appl. No. 13/017,381, filed Jan. 31, 2011.
Mae et al., U.S. Appl. No. 13/017,527, filed Jan. 31, 2011.
Takeda et al., U.S. Appl. No. 13/019,924, filed Feb. 2, 2011.
Takeda et al., U.S. Appl. No. 13/019,928, filed Feb. 2, 2011.
Takeda et al., U.S. Appl. No. 13/145,690, filed Dec. 19, 2011.
Taekda et al., U.S. Appl. No. 13/153,106, filed Jun. 3, 2011.
Ashida et al., U.S. Appl. No. 13/206,059, filed Aug. 9, 2011.
Ashida et al., U.S. Appl. No. 13/206,767, filed Aug. 10, 2011.
Ashida et al., U.S. Appl. No. 13/206,914, filed Aug. 10, 2011.
Ashida et al., U.S. Appl. No. 13/207,867, filed Aug. 11, 2011.
Ito et al., U.S. Appl. No. 13/208,719, filed Aug. 12, 2011.
Ohta et al., U.S. Appl. No. 13/209,756, filed Aug. 15, 2011.
Nishida et al., U.S. Appl. No. 13/211,679, filed Aug. 17, 2011.
Nishida et al., U.S. Appl. No. 13/212,648, filed Aug. 18, 2011.
Takeda et al., U.S. Appl. No. 13/244,685, filed Sep. 26, 2011.
Takeda et al., U.S. Appl. No. 13/244,710, filed Sep. 26, 2011.
Ohta et al., U.S. Appl. No. 13/354,000, filed Jan. 19, 2012.
Takeda et al., U.S. Appl. No. 13/541,282, filed Jul. 3, 2012.
Xbox 360 Controller, Wikipedia, page as revised on Feb. 2, 2010 (6 pages).
Ashida et al., U.S. Appl. No. 13/206,767, filed Aug. 10, 2011—response to office action filed Dec. 11, 2013.
Ashida et al., U.S. Appl. No. 13/207,867, filed Aug. 11, 2011—response to office action filed Jan. 6, 2014.
Ohta et al., U.S. Appl. No. 13/209,756, filed Aug. 15, 2011—non-final office action mailed Dec. 30, 2013.
Nishida et al., U.S. Appl. No. 13/211,679, filed Aug. 17, 2011—notice of appeal filed Jan. 15, 2014.
Nishida et al., U.S. Appl. No. 13/212,648, filed Aug. 18, 2011—final office action mailed Dec. 4, 2013.
Takeda et al., U.S. Appl. No. 13/244,710, filed Sep. 26, 2011—response to office action filed Dec. 24, 2013.
Takeda et al., U.S. Appl. No. 13/541,282, filed Jul. 3, 2012—response to office action filed Dec. 13, 2013.
Takeda et al., U.S. Appl. No. 13/672,862, filed Nov. 9, 2012—non-final office action mailed Dec. 24, 2013.
Takeda et al., U.S. Appl. No. 13/019,924, filed Feb. 2, 2011—response to office action filed Feb. 10, 2014.
Takeda et al., U.S. Appl. No. 13/145,690, filed Dec. 19, 2011—now USP 8,684,842.
Taekda et al., U.S. Appl. No. 13/153,106, filed Jun. 3, 2011—final office action filed Feb. 4, 2014.

(56) References Cited

OTHER PUBLICATIONS

Ashida et al., U.S. Appl. No. 13/206,059, filed Aug. 9, 2011—response to office action filed May 14, 2014.
Ashida et al., U.S. Appl. No. 13/206,767, filed Aug. 10, 2011—allowed.
Ashida et al., U.S. Appl. No. 13/206,914, filed Aug. 10, 2011—now USP 8,702,514.
Ashida et al., U.S. Appl. No. 13/207,867, filed Aug. 11, 2011—allowed.
Ohta et al., U.S. Appl. No. 13/209,756, filed Aug. 15, 2011—response to office action filed Mar. 31, 2014.
Nishida et al., U.S. Appl. No. 13/211,679, filed Aug. 17, 2011—RCE filed Apr. 28, 2014.
Nishida et al., U.S. Appl. No. 13/212,648, filed Aug. 18, 2011—RCE filed May 7, 2014.
Ohta et al., U.S. Appl. No. 13/354,000, filed Jan. 19, 2012—allowed.
Takeda et al., U.S. Appl. No. 13/541,282, filed Jul. 3, 2012—allowed.
Takeda et al., U.S. Appl. No. 13/672,862, filed Nov. 9, 2012—allowed.
Ito et al., U.S. Appl. No. 13/687,057, filed Nov. 28, 2012—now USP 8,690,675.
Kenji Saeki, "Both the appearance and the function are improved! The report on the evolved Nintendo DSi.", [online], Dec. 1, 2008, Impress Watch Co., Ltd., GAME Watch, [searched on Jul. 23, 2014]. Internet <URL: http://game.watch.impress.co.jp1 docs/20081101/dsi1.htm> and partial English-language translation.
English-language machine translation of http://game.watch.impress.co.jp/docs/20081101/dsi1.htm [retrieved on Oct. 5, 2014].
English-language machine-translation for JP 2001-034247.
English-language machine-translation for JP 2010-066899.
Takeda et al., U.S. Appl. No. 13/019,924, filed Feb. 2, 2011—response to office action filed 00/19/2014.
Taekda et al., U.S. Appl. No. 13/153,106, filed Jun. 3, 2011—allowed.
Ashida et al., U.S. Appl. No. 13/206,059, filed Aug. 9, 2011—now USP 8,827,818.
Ashida et al., U.S. Appl. No. 13/206,767, filed Aug. 10, 2011—now USP 8,814,680.
Ashida et al., U.S. Appl. No. 13/207,867, filed Aug. 11, 2011—now USP 8,804,326.
Ohta et al., U.S. Appl. No. 13/209,756, filed Aug. 15, 2011—final office action mailed Jul. 8, 2014.
Takeda et al., U.S. Appl. No. 13/244,710, filed Sep. 26, 2011—response to office action filed Sep. 19, 2014.
Ohta et al., U.S. Appl. No. 13/354,000, filed Jan. 19, 2012—now USP 8,845,426.
Takeda et al., U.S. Appl. No. 13/541,282, filed Jul. 3, 2012—now USP 8,814,686.
Ashida et al., U.S. Appl. No. 14/302,248, filed Jun. 11, 2014—non-final office action mailed Sep. 4, 2014.
Office Action dated Sep. 24, 2013, issued in related U.S. Appl. No. 13/244,710.
Sony HMZ-T1 with TrackIR 5 playing PC games! WoW and Skyrim Uploaded by iphwne Nov. 16, 2011 http://www.youtube.com/watch?v=5OLCFMBWT6I.
Sony's New 3D OLED Headset/VR Goggles Uploaded by TheWaffleUniverse Jan. 8, 2011 http://www.youtube.com/watch?v=UoE5ij63EDI.
TrackIR 5—review Uploaded by arnycracker8 Jan. 27, 2011 http://www.youtube.com/watch?v=EXMXvAuBzo4.
Partial English-language translation of TWM278452.
Mae et al., U.S. Appl. No. 13/017,381, filed Jan. 31, 2011—now USP 8,613,672.
Mae et al., U.S. Appl. No. 13/017,527, filed Jan. 31, 2011—now USP 8,529,352.
Takeda et al., U.S. Appl. No. 13/019,924, filed Feb. 2, 2011—non-final office action mailed Oct. 8, 2013.
Takeda et al., U.S. Appl. No. 13/019,928, filed Feb. 2, 2011—now USP 8,317,615.
Takeda et al., U.S. Appl. No. 13/145,690, filed Dec. 19, 2011—allowed.
Taekda et al., U.S. Appl. No. 13/153,106, filed Jun. 3, 2011—non-final office action mailed Oct. 10, 2013.
Ashida et al., U.S. Appl. No. 13/206,059, filed Aug. 9, 2011—awaiting USPTO action.
Ashida et al., U.S. Appl. No. 13/206,767, filed Aug. 10, 2011—Quayle action mailed Nov. 14, 2013.
Ashida et al., U.S. Appl. No. 13/206,914, filed Aug. 10, 2011—allowed.
Ashida et al., U.S. Appl. No. 13/207,867, filed Aug. 11, 2011—non-final office action mailed Oct. 7, 2013.
Ito et al., U.S. Appl. No. 13/208,719, filed Aug. 12, 2011—now USP 8,337,308.
Ohta et al., U.S. Appl. No. 13/209,756, filed Aug. 15, 2011—awaiting USPTO action.
Nishida et al., U.S. Appl. No. 13/211,679, filed Aug. 17, 2011—final office action mailed Oct. 15, 2013.
Nishida et al., U.S. Appl. No. 13/212,648, filed Aug. 18, 2011—final office action mailed Dec. 2, 2013.
Takeda et al., U.S. Appl. No. 13/244,685, filed Sep. 26, 2011—now USP 8,339,364.
Takeda et al., U.S. Appl. No. 13/244,710, filed Sep. 26, 2011—non-final office action mailed Sep. 24, 2013.
Ohta et al., U.S. Appl. No. 13/354,000, filed Jan. 19, 2012—non-final office action mailed Nov. 8, 2013.
Takeda et al., U.S. Appl. No. 13/541,282, filed Jul. 3, 2012—non-final office action mailed Sep. 13, 2013.
Takeda et al., U.S. Appl. No. 13/672,862, filed Nov. 9, 2012—awaiting USPTO action.
Ito et al., U.S. Appl. No. 13/687,057, filed Nov. 28, 2012—allowed.
Ascension Technology Corporation, Flock of Birds, Real-Time Motion Tracking, retrieved from Internet on Dec. 30, 2003, www.ascension-tech.com, 3 pages.
English-language machine-translation for JP 07-068052.
English-language machine-translation for JP 07-088251.
English-language machine-translation for JP 08-045392.
English-language machine-translation for JP 08-095669.
English-language machine-translation for JP 2002-177644.
English-language machine-translation for JP 2007-260409.
English-language machine-translation for JP 2007-313354.
English-language machine-translation for JP 2009-200799.
English-language machine-translation for JP 09-099173.
English-language machine-translation for JP 2007-310840.
English-language machine-translation for JP 2001-340641.
English-language machine-translation for JP 2009-230753.
English-language machine-translation for JP 3108313U.
English-language machine-translation for JP 2007-274836.
English-language machine-translation for JP 2003-189484.
English-language machine translation of JP 2009-219707.
English-language machine-translation for CN 201572520U.
Takeda et al., U.S. Appl. No. 13/019,924, filed Feb. 2, 2011—now USP 8,961,305.
Taekda et al., U.S. Appl. No. 13/153,106, filed Jun. 3, 2011—now USP 8,913,009.
Ohta et al., U.S. Appl. No. 13/209,756, filed Aug. 15, 2011—non-final office action mailed Jul. 23, 2015.
Nishida et al., U.S. Appl. No. 13/211,679, filed Aug. 17, 2011—now USP 8,956,209.
Nishida et al., U.S. Appl. No. 13/212,648, filed Aug. 18, 2011—allowed.
Takeda et al., U.S. Appl. No. 13/244,710, filed Sep. 26, 2011—non-final office action mailed May 21, 2015.
Takeda et al., U.S. Appl. No. 13/672,862, filed Nov. 9, 2012—now USP 8,896,534.
Ashida et al., U.S. Appl. No. 14/302,248, filed Jun. 11, 2014—final office action mailed Jun. 17, 2015.
Takeda et al., U.S. Appl. No. 14/537,654, filed Nov. 10, 2014—awaiting USPTO action.
Notice of Reasons for Refusal mailed Sep. 2, 2015, issued in Japanese Patent Application No. 2011-114864.

* cited by examiner

Fig. 18

| | HAND-HELD DEVICE | SECOND VIRTUAL CAMERA |
|---|---|---|
| REFERENCE ATTITUDE | | |
| RIGHT TURN | | |
| LEFT TURN | | |

GAME SYSTEM, GAME APPARATUS, STORAGE MEDIUM HAVING GAME PROGRAM STORED THEREIN, AND GAME PROCESS METHOD

CROSS REFERENCE TO RELATED APPLICATION

The disclosure of Japanese Patent Application Nos. 2010-177893 and 2011-114864, filed Aug. 6, 2010 and May 23, 2011, respectively, is incorporated herein by reference.

BACKGROUND AND SUMMARY

The present invention relates to a game system, a game apparatus, a storage medium having a game program stored therein, and a game process method in which an image is displayed on each of two display screens.

Conventionally, there are some technologies for players to play a baseball game, as described in, for example, Japanese Laid-Open Patent Publication No. 2007-289413. In the technology described in Japanese Laid-Open Patent Publication No. 2007-289413, the player operates a bat using a holdable controller. Note that in the baseball game described in Japanese Laid-Open Patent Publication No. 2007-289413, a game image is displayed with the pitcher being viewed from the batter side, as is common among conventional baseball games (see FIG. 9 of Japanese Laid-Open Patent Publication No. 2007-289413).

On the other hand, conventionally, there are multiplayer games, but such a conventional game has game images displayed on a single display device, which makes it difficult for either player to view the game images and play the game. For example, in the baseball game of Japanese Laid-Open Patent Publication No. 2007-289413, game images are displayed with the pitcher being viewed from the batter side, and therefore supposing a case where two players operate the batter and the pitcher, respectively, it is difficult for the player who operates the pitcher to view the game images and perform game operations.

Therefore, an objective of the present invention is to provide a game system, a game apparatus, a storage medium having a game program stored therein, and a game process method in which game images can be displayed in a multiplayer game so as to be readily viewed by each player.

To solve the aforementioned problem, the present invention employs the following features (1) to (17).

(1) An embodiment of the present invention is directed to a game system comprising a game apparatus, an operating device, and a hand-held device. The game apparatus includes a first reception section, a game process section, a first image generation section, a second image generation section, a first image output section, and a second image output section. The first reception section receives data transmitted from the operating device and the hand-held device. The game process section performs a game control process based on first operation data representing a first player's operation on the operating device and second operation data representing a second player's operation on the hand-held device. The first image generation section generates a first game image for the first player based on a first virtual camera set in a virtual game space, the first game image being an image of the game space and representing a result of the game control process. The second image generation section generates a second game image for the second player based on a second virtual camera set in the game space, the second game image being an image of the game space. The first image output section outputs the first game image to a first display device provided independently of the hand-held device. The second image output section outputs the second game image to the hand-held device. In addition, the operating device includes a first operation data output section and a first operation data transmission section. The first operation data output section outputs the first operation data. The first operation data transmission section transmits the first operation data to the game apparatus. The hand-held device includes a second operation data output section, a second operation data transmission section, a second reception section, and a display process section. The second operation data output section outputs the second operation data. The second operation data transmission section transmits the second operation data to the game apparatus. The second reception section receives the second game image from the game apparatus. The display process section displays the second game image on a second display device provided in the hand-held device.

The "game apparatus" may be any information processing device that performs a game process, and generates an image based on the game process. Specifically, The game apparatus may be an information processing device exclusively designed for game use, or a multi-purpose information processing device such as a general personal computer.

The "operating device" may be any device capable of transmitting operation data (first operation data) to the game apparatus, and may communicate with the game apparatus in a wired or wireless manner.

The "hand-held device" is a portable game apparatus in an embodiment to be described later, but it does not have to have a function of performing a game process (game program). Specifically, the hand-held device may be used as a game controller for the game apparatus or may be a terminal device as in a variant to be described later.

The "game system" includes the game apparatus, the operating device, and the hand-held device, and may or may not include the "first display device" for displaying the first game image. That is, the game system may be provided either in the form in which the first display device is not included or in the form in which it is included.

The "game process section" may be information processing means for performing not only a game control process (step S2) for a baseball game as in the embodiment to be described later but also any game control processes based on the first operation data and the second operation data.

The "first display device" is provided independently of the hand-held device, and may be any device, such as a television 2 in the embodiment to be described later, which can display an image generated by the game apparatus. For example, the first display device may be integrally formed with the game apparatus (within a single casing).

The "first operation data output section" may be any feature capable of detecting an operation on the operating device, including an acceleration sensor 37, a gyroscope unit 6 (gyroscopes 55 and 56), an imaging information calculation section (infrared light detection means) 35, and an operating section 32 in the embodiment to be described later.

The "second operation data output section" may be any feature capable of detecting an operation on the hand-held device, including an acceleration sensor 89, a gyroscope 90, a touch panel 63, an operate button group 64, and an analog stick 65 in the embodiment to be described later.

According to the above configuration (1), the first display device displays the first game image generated based on the first virtual camera in the virtual game space, and the hand-held device second display device displays the second game image generated based on the second virtual camera in the virtual game space. As a result, by using two virtual cameras, it is possible to generate two different types of game images for a single game space as seen from different viewpoints. Thus, according to the above configuration (1), by appropriately setting the virtual cameras, it is possible to display game images that can be readily viewed by respective players.

(2) The second operation data output section may include a sensor for outputting data whose value changes in accordance with movement of the hand-held device. In this case, the second operation data includes data outputted by the sensor. The game process section performs a game control process in accordance with movement of the hand-held device, based on the second operation data.

The "movement of the hand-held device" is meant to include changes in position and attitude of the hand-held device. Specifically, the "movement" may refer to either the change in position or attitude, or both. The "sensor" may be any feature allowing the game process section to calculate (estimate) some movement of the hand-held device based on a sensor output.

According to the above configuration (2), the second player can perform a game operation of moving the hand-held device itself. The second player can intuitively play the game with such a game operation which can be more readily performed.

(3) The second operation data output section may include an acceleration sensor and/or a gyroscope. In this case, the second operation data includes acceleration data sensed by the acceleration sensor and/or angular rate data sensed by the gyroscope.

According the above configuration (3), by using the sensing result by the acceleration sensor or the gyroscope, the game process section can readily calculate (estimate) the movement of the hand-held device.

(4) The game process section may perform a game control process for moving the second virtual camera in accordance with movement of the hand-held device, based on the second operation data.

The "moving the second virtual camera" is intended to mean changing the position and/or the attitude of the second virtual camera.

According to the above configuration (4), the second virtual camera moves in accordance with the movement of the hand-held device, so that the display range of the game space being displayed on the screen of the hand-held device also changes in accordance with the movement of the hand-held device. That is, the second player can perform an operation of changing the range to be displayed on the screen of the hand-held device by moving the hand-held device itself. Thus, the second player can freely change the display range with an intuitive and easy operation.

Note that in the present invention, since the first display device displays the first game image, the first player can play the game while viewing the first game image. Specifically, in the present invention, two screens display their respective different game images, and therefore the second player can freely change the display range on one screen without worrying about causing any inconvenience for the first player. Thus, the second player can freely change the display range of the second game image on the hand-held device without being concerned about impact on the first player.

(5) The game process section may set the first virtual camera such that the first game image includes a predetermined object whose action is controlled based on the first operation data.

The "predetermined object" may be an object whose action is controlled directly or indirectly based on the first operation data. Similar to, for example, a batter object 101 and a bat object 103 in the embodiment to be described later, the "predetermined object" may have its action controlled directly based on the first operation data. Alternatively, similar to, for example, a ball object 104 in a fielding scene, the "predetermined object" may have its action controlled based on the behavior of the bat object 103 whose action is controlled based on the first operation data.

According to the above configuration (5), the first virtual camera is set such that the first game image includes a target to be operated by the first player or a target of interest of the first player. Thus, it is possible to display the first game image so as to be readily viewed by the first player.

(6) The first operation data output section may include a sensor for outputting data whose value changes in accordance with movement of the operating device. In this case, the first operation data includes data outputted by the sensor. The game process section performs a game control process for controlling an object arranged in the game space in accordance with movement of the operating device.

The "movement of the operating device" is meant to include changes in an operational position and an operational attitude. The "sensor" may be any feature allowing the game process section to calculate (estimate) some operational movement based on a sensor output, similar to an imaging information calculation section 35, an acceleration sensor 37, and gyroscopes 55 and 56 in the embodiment to be described later.

According to the above configuration (6), the first player can perform a game operation of moving the operating device itself. The first player can intuitively play the game with such a game operation which can be more readily performed.

(7) The first operation data output section may include an acceleration sensor and/or a gyroscope. In this case, the first operation data includes acceleration data sensed by the acceleration sensor and/or angular rate data sensed by the gyroscope.

According to the above configuration (7), by using the sensing result by the acceleration sensor or the gyroscope, the game process section can readily calculate (estimate) the movement of the operating device.

(8) The game process section may include a first process section, a second process section, a third process section, and a fourth process section. The first process section determines a moving direction of a predetermined moving object so as to change in accordance with movement of the hand-held device and moves the moving object in the determined moving direction. The second process section sets the first virtual camera such that a first game image including the moving object is generated. The third process section moves a predetermined operation object in accordance with movement of the operating device. The fourth process section determines whether the moving object and the operation object have contacted or not and generates a game image in accordance with the determination result.

The "predetermined moving object" may be any object whose moving direction is determined so as to change in accordance with the movement of the hand-held device, similar to the ball object 104 in a pitching scene in the embodiment to be described later.

The "operation object" may be any object to be moved in accordance with the movement of the operating device, similar to the bat object 103 in the embodiment to be described later.

According to the above configuration (8), it is possible to realize a game in which the moving direction of the moving object is operated by the second player moving the hand-held device, and the operation object is operated so as to hit the moving object by the first player moving the operating device. Thus, for example, it is possible to provide a novel and highly enjoyable game in which two players move their own operating means to play against each other while viewing their respective game images, as in a pitching scene of a baseball game in the embodiment to be described later.

Also, in the above configuration (8), where the second game image includes any image representing the aforementioned moving direction (e.g., a target image 105 in the embodiment to be described later), it is possible to enhance strategic characteristics in a game played between players by rendering the second game image invisible to the first player. If the second game image is visible to the first player, the content of operation by the second player (concretely, the moving direction of the moving object) can be revealed to the first player, which is a disadvantage in the game for the second player and also results in reduced strategic characteristics. On the other hand, according to the above configuration (8), the second game image is displayed on the second display device of the hand-held device, and therefore is difficult to see for the first player, which will not cause the problem mentioned above. Thus, according to the configuration (8), where one player seeing a game image might bring the other player inconvenience in the game, it is possible to prevent the problem by displaying the game image on the hand-held device.

(9) The game process section may include a fifth process section, a sixth process section, and a seventh process section. The fifth process section calculates behavior of a predetermined moving object based on the first operation data, the behavior being determined in accordance with movement of the operating device, and moving the moving object based on the behavior. The sixth process section moves the second virtual camera in accordance with movement of the hand-held device. The seventh process section determines whether or not the second virtual camera is directed toward a predetermined range including the moving object, and generates a game image in accordance with the determination result.

The "predetermined moving object" may be any object whose behavior changes in accordance with the movement of the operating device, similar to the ball object 104 in a fielding scene in the embodiment to be described later.

According to the above configuration (9), it is possible to realize a game in which the first player moves the operating device to determine the behavior of a moving object, and the second player moves the hand-held device to direct the second virtual camera toward the moving object. Thus, for example, it is possible to provide a novel and highly enjoyable game in which two players move their own operating means to play against each other while viewing their respective game images, as in a fielding scene of the baseball game in the embodiment to be described later.

(10) The game process section may perform game control processes in accordance with an operation of swinging the operating device and an operation of tilting the hand-held device, the swinging operation and the tilting operation being detected based on the first operation data and the second operation data, respectively.

According to the above configuration (10), the first player plays the game by performing the operation of swinging the operating device, and the second player plays the game by performing the operation of tilting the hand-held device. Here, in the present invention, the first player plays the game while viewing the first display device provided independently of the operating device, and therefore can readily perform the operation of swinging the operating device itself. On the other hand, since the second game image is displayed on the screen of the hand-held device, and the second player performs the game while viewing the hand-held device, it is difficult for the second player to perform a game operation with the action of, for example, swinging the hand-held device. Accordingly, in the above configuration (10), the first player can perform a game operation by swinging the operating device, and the second player can perform a game operation by tilting the hand-held device. Thus, it is possible to provide game operations that are suitable for characteristics of respective devices and can be readily performed by players.

(11) The game apparatus may further include a display setting section for setting first display setting data and second display setting data, the first display setting data representing any object to be arranged in the game space but not to be rendered in the first game image, the second display setting data representing any object to be arranged in the game space but not to be rendered in the second game image. In this case, the first image generation section generates the first game image based on the first display setting data. The second image generation section generates the second game image based on the second display setting data.

According to the above configuration (11), the display setting data is set for each of the two game images, and therefore any individual object not to be rendered can be set for each game image. Thus, an object not to be displayed in one game image can be appropriately displayed in the other game image, making it possible to appropriately generate the game images.

(12) The second operation data output section may include a touch panel provided on a screen of the second display device. In this case, the second operation data includes touch data representing an input position on the touch panel. The game process section performs a game control process based on the touch data.

According to the above configuration (12), the second player can perform game operations with the touch panel, and therefore game operations with the hand-held device can be performed with higher operability. Moreover, in the present invention, the first player cannot view the screen of the hand-held device, and therefore the content of operation on the touch panel is not revealed to the first player. Thus, according to the above configuration (12), any inconvenience such as the second player's operation being disadvantageously revealed to the first player does not occur, making it possible to prevent reduction in strategic and enjoyable characteristics of the game.

(13) The second operation data output section may include at least one operation button. In this case, the second operation data includes operation button data representing whether or not an input has been made with the operation button.

According to the above configuration (13), the second player can perform game operations with the operation button, and therefore game operations with the hand-held device can be performed with higher operability.

(14) The first data output section may include image pickup means. In this case, the first operation data includes data representing a position of a predetermined imaging target in an image taken by the image pickup means. The game process section performs a game control process for calculating a position on a screen of the first display device based on the data representing the position of the imaging target.

According to the above configuration (14), a position on the display screen is calculated based on the position of an imaging target in a pickup image. Accordingly, the first player can changing the position on the display screen by moving the operating device to change the position of the imaging target. Thus, the first player can perform a game operation by moving the operating device and specifying a position on the display screen, so that game operations with the operation device can be performed with higher operability.

(15) Another embodiment of the present invention is directed to a game apparatus capable of communicating with an operating device and a hand-held device. Here, the operating device is capable of transmitting first operation data including data whose value changes in accordance with movement of the operating device. The hand-held device is capable of transmitting second operation data including data whose value changes in accordance with movement of the hand-held device. The game apparatus includes an operation data acquisition section, a first object control section, a first virtual camera setting section, a first image generation section, a second virtual camera setting section, a second image generation section, a first image output section, and a second image output section. The operation data acquisition section acquires the first operation data and the second operation data, respectively, from the operating device and the hand-held device. The first object control section controls an object arranged in a virtual game space based on the first operation data. The first virtual camera setting section sets a first virtual camera in the game space. The first image generation section generates a first game image for a first player operating the operating device, based on the first virtual camera. The second virtual camera setting section controls a second virtual camera in the game space based on the second operation data to move in accordance with movement of the hand-held device. The second image generation section generates a second game image for a second player operating the hand-held device, based on the second virtual camera. The first image output section outputs the first game image to a first display device provided independently of the hand-held device. The second image output section outputs the second game image to the hand-held device so as to be displayed on a second display device provided in the hand-held device.

According to the above configuration (15), similar to the above configuration (1), by appropriately setting the virtual cameras, it is possible to display game images that can be readily viewed by respective players. Furthermore, according to the above configuration (15), similar to the above configuration (4), the second player can freely change the display range with an intuitive and easy operation, and similar to the above configuration (5), it is possible to display the first game image so as to be readily viewed by the first player.

(16) The game apparatus may further comprise a second object control section for determining a moving direction of a predetermined moving object so as to change in accordance with movement of the hand-held device and moving the moving object in the determined moving direction. In this case, the first virtual camera setting section sets the first virtual camera such that a first game image including the moving object is generated. The first object control section moves a predetermined operation object in accordance with movement of the operating device. The game apparatus further comprises a first determination process section for determining whether the moving object and the operation object have contacted or not and generating a game image in accordance with the determination result.

According to the above configuration (16), similar to the above configuration (8), it is possible to provide a novel and highly enjoyable game in which two players move their own operating means to play against each other while viewing their respective game images.

(17) The first object control section may calculate behavior of a predetermined moving object based on the first operation data, the behavior being determined in accordance with movement of the operating device, and moving the moving object based on the behavior. In this case, the game apparatus further includes a second determination process section for determining whether or not the second virtual camera is directed toward a predetermined range including the moving object, and generating a game image in accordance with the determination result.

According to the above configuration (17), similar to the above configuration (9), it is possible to provide a novel and highly enjoyable game in which two players move their own operating means to play against each other while viewing their respective game images.

Also, in another embodiment, the present invention may be carried out in the form of a computer-readable storage medium having stored therein a game program for causing a computer of a game apparatus to function as means equivalent to the sections of the game apparatus as described in (1) to (17) above. Furthermore, the present invention may be embodied in the form of a game process method to be performed in the game system as described in (1) to (14) above.

According to the present invention, by using two virtual cameras, it is possible to generate two different types of game images for a single game space as seen from different viewpoints, and therefore it is possible to display game images that can be readily viewed by respective players.

These and other objects, features, aspects and advantages of the present invention will become more apparent from the following detailed description of the present invention when taken in conjunction with the accompanying drawings.

BRIEF DESCRIPTION OF THE DRAWINGS

FIG. 18 is a diagram illustrating the relationship between the attitude of the hand-held device and the attitude of a second virtual camera;

DETAILED DESCRIPTION

1. Overall Configuration of the Game System

Figure 1:
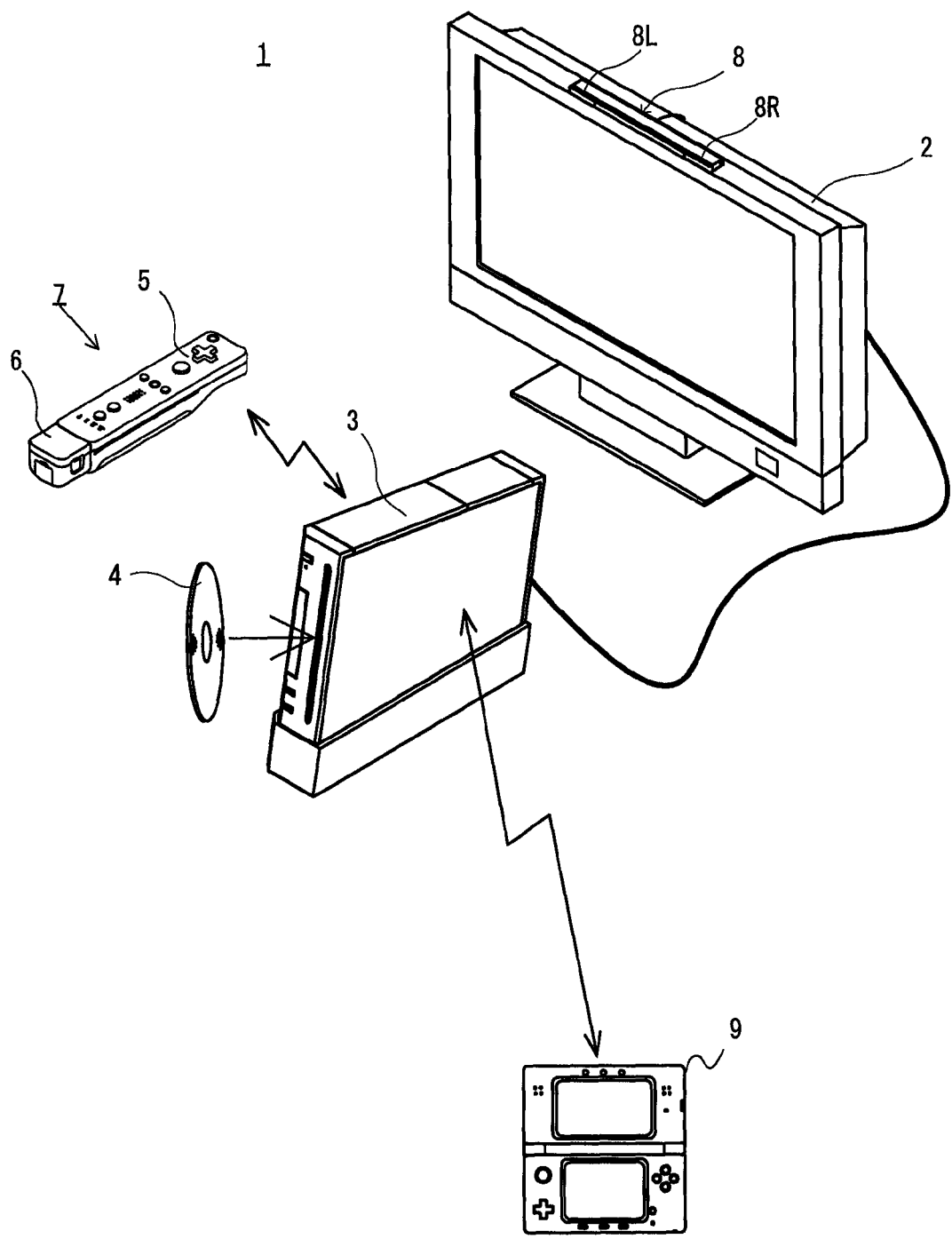
FIG. 1 is an external view of a game system.

A game system 1 according to an embodiment of the present invention will now be described with reference to the drawings. FIG. 1 is an external view of the game system 1. In FIG. 1, the game system 1 includes a display device (hereinafter referred to as a "television") 2 such as a television receiver, a game apparatus 3, an optical disc 4, an operating device 7, a marker device 8, and a hand-held device 9. In the game system 1, the game apparatus 3 performs game processes based on game operations performed using the operating device 7 and the hand-held device 9, and game images acquired through the game processes are displayed on the television 2 and/or on a display (a lower LCD 62 shown in FIG. 8) of the hand-held device 9.

In the game apparatus 3, the optical disc 4 typifying an information storage medium used for the game apparatus 3 in a replaceable manner is removably inserted. An information processing program (a game program, for example) to be executed by the game apparatus 3 is stored in the optical disc 4. The game apparatus 3 has, on the front surface thereof, an insertion opening for the optical disc 4. The game apparatus 3 reads and executes the information processing program stored on the optical disc 4 which is inserted into the insertion opening, to perform the game process.

The television 2 is connected to the game apparatus 3 by a connecting cord. Game images acquired as a result of the game processes performed by the game apparatus 3 are displayed on the television 2. The television 2 includes a speaker 2a (see FIG. 2), and the speaker 2a outputs game sounds acquired as a result of the game process. In alternative embodiments, the game apparatus 3 and the display device may be an integral unit. Also, the communication between the game apparatus 3 and the television 2 may be wireless communication.

The marker device 8 is provided along the periphery of the screen (on the upper side of the screen in FIG. 1) of the television 2. The user can perform game operations by moving the operating device 7, the details of which will be described later, and the marker device 8 is used by the game apparatus 3 for detecting the movement of the operating device 7. The marker device 8 includes two markers 8R and 8L on opposite ends thereof. Specifically, the marker 8R (as well as the marker 8L) includes one or more infrared LEDs (Light Emitting Diodes), and emits an infrared light in a forward direction from the television 2. The marker device 8 is connected to the game apparatus 3, and the game apparatus 3 is able to control the lighting of each infrared LED of the marker device 8. While FIG. 1 shows an embodiment in which the marker device 8 is arranged on top of the television 2, the position and the direction of arranging the marker device 8 are not limited to this particular arrangement.

The operating device 7 provides the game apparatus 3 with operation data representing the content of operations performed on the controller itself. Hereinafter, operation data transmitted to the game apparatus 3 by the operating device 7 is referred to as "first operation data". In the present embodiment, the operating device 7 includes a controller 5 and a gyroscope unit 6. As will be described in detail below, the operating device 7 has the gyroscope unit 6 detachably connected to the controller 5. Alternatively, the controller 5 may include a gyroscope. The controller 5 and the game apparatus 3 are connected by wireless communication. In the present embodiment, the wireless communication between the operating device 7 and the game apparatus 3 uses, for example, Bluetooth (Registered Trademark) technology. In other embodiments, the operating device 7 and the game apparatus 3 may be connected by a wired connection.

In the present embodiment, the hand-held device 9 is a portable game apparatus which includes display devices (LCDs 62 and 72 to be described later) and input devices (e.g., a touch panel 63 and an acceleration sensor 89 to be described later). The hand-held device 9 can communicate with the game apparatus 3 wirelessly or wired. The hand-held device 9 receives game images and sound acquired by processing, from the game apparatus 3, and displays the game images on the display while outputting the game sound from a speaker. The hand-held device 9 transmits operation data representing the content of operations performed thereon to the game apparatus 3. Hereinafter, the operation data transmitted to the game apparatus 3 by the hand-held device 9 is referred to as the "second operation data".

While in the present embodiment, the hand-held device 9 is a portable game apparatus, in another embodiment, the hand-held device 9 may be any device (or controller) which includes a display device(s) and an input device(s) and can be held by a user. Specifically, the hand-held device 9 is not required to be provided with the function of executing any game process (or game program). Furthermore, while in the present embodiment, the hand-held device 9 is a portable game apparatus equipped with two display devices as shown in FIG. 1, the hand-held device 9 may be a portable game apparatus equipped with one display device or may be a game controller equipped with one display device.

2. Internal Configuration of the Game Apparatus 3

Figure 2:
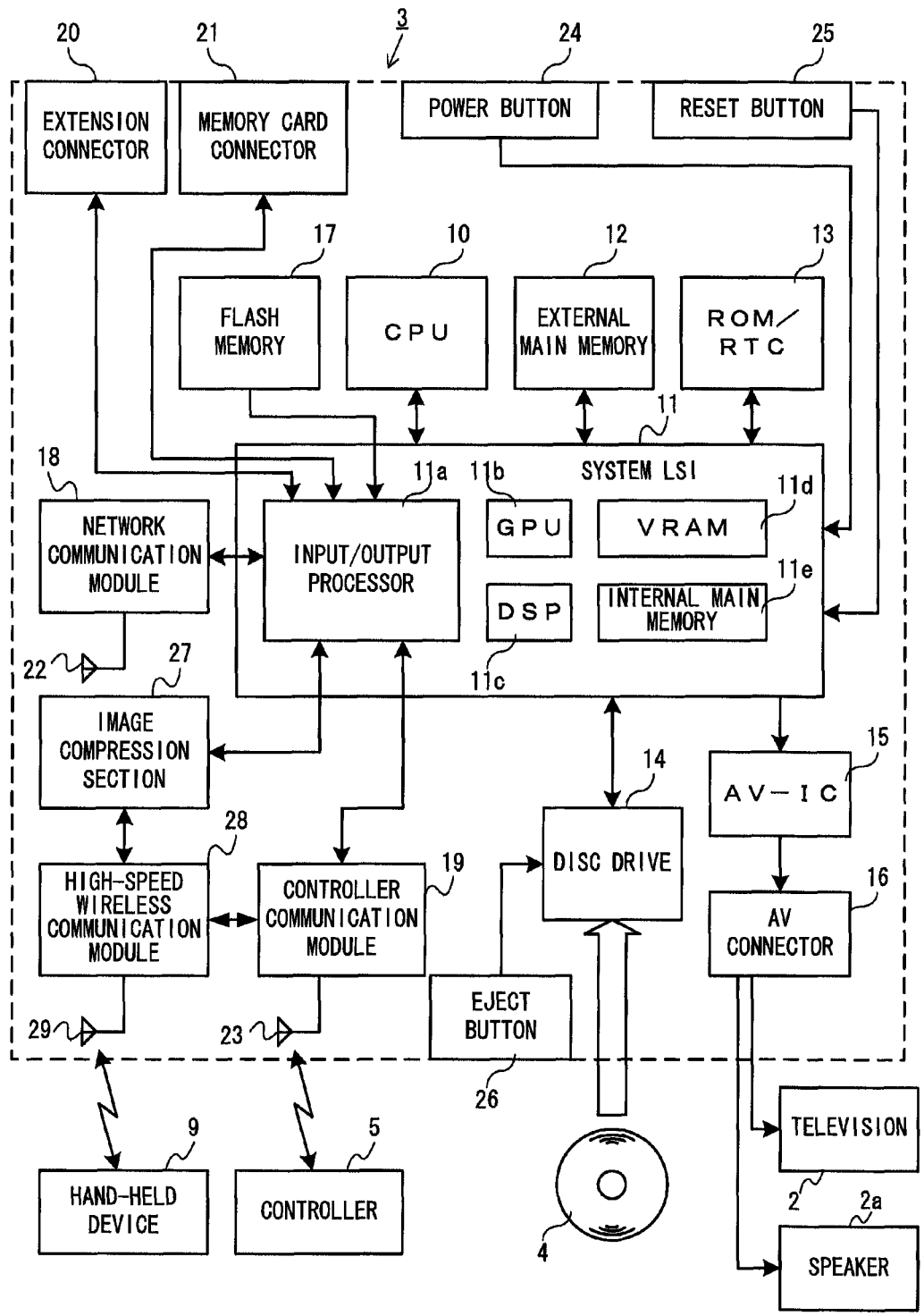
FIG. 2 is a block diagram illustrating an internal configuration of a game apparatus.

An internal configuration of the game apparatus 3 will be described with reference to FIG. 2. FIG. 2 is a block diagram illustrating an internal configuration of the game apparatus 3. The game apparatus 3 includes a CPU (Central Processing Unit) 10, a system LSI 11, external main memory 12, a ROM/RTC 13, a disc drive 14, and an AV-IC 15.

The CPU 10 performs game processes by executing a game program stored, for example, on the optical disc 4, and functions as a game processor. The CPU 10 is connected to the system LSI 11. The external main memory 12, the ROM/RTC 13, the disc drive 14, and the AV-IC 15, as well as the CPU 10, are connected to the system LSI 11. The system LSI 11 performs processes for controlling data transmission between the respective components connected thereto, generating images to be displayed, acquiring data from an external device (s), and the like. The internal configuration of the system LSI will be described below. The external main memory 12 is of a volatile type and stores a program such as a game program read from the optical disc 4, a game program read from flash memory 17, and various data. The external main memory 12 is used as a work area and a buffer area for the CPU 10. The ROM/RTC 13 includes a ROM (a so-called boot ROM) incorporating a boot program for the game apparatus 3, and a clock circuit (RTC: Real Time Clock) for counting time. The disc drive 14 reads program data, texture data, and the like from the optical disc 4, and writes the read data into internal main memory 11e (to be described below) or the external main memory 12.

The system LSI 11 includes an input/output processor (I/O processor) 11a, a GPU (Graphics Processor Unit) 11b, a DSP (Digital Signal Processor) 11c, VRAM (Video RAM) 11d, and the internal main memory 11e. Although not shown in the figures, these components 11a to 11e are connected with each other through an internal bus.

The GPU 11b, acting as a part of a rendering mechanism, generates images in accordance with graphics commands (rendering commands) from the CPU 10. The VRAM 11d stores data (data such as polygon data and texture data) necessary for the GPU 11b to execute the graphics commands. When images are generated, the GPU 11b generates image data using data stored in the VRAM 11d.

Here, in the present embodiment, the game apparatus 3 generates both game images to be displayed on the television 2 and game images to be displayed on the display devices (the lower LCD 62 and the upper LCD 72) of the hand-held device 9. Hereinafter, the game images to be displayed on the television 2 are referred to as the "first game images" and the game images to be displayed on the hand-held device 9 are referred to as the "second game images".

The DSP 11c, functioning as an audio processor, generates sound data using sound data and sound waveform (e.g., tone quality) data stored in one or both of the internal main memory 11e and the external main memory 12.

The image data (data for first game images) and sound data, which are generated as described above, are read out by the AV-IC 15. The AV-IC 15 outputs the read-out image data to the television 2 via an AV connector 16, and outputs the read-out sound data to the speaker 2a provided in the television 2. Thus, images are displayed on the television 2, and sounds are outputted from the speaker 2a.

The input/output processor 11a exchanges data with components connected thereto, and downloads data from an external device(s). The input/output processor 11a is connected to the flash memory 17, a network communication module 18, a controller communication module 19, an expansion connector 20, a memory card connector 21, and an image compression section 27. An antenna 22 is connected to the network communication module 18. An antenna 23 is connected to the controller communication module 19. The image compression section 27 is connected to a high-speed wireless communication module 28, and an antenna 29 is connected to the high-speed wireless communication module 28. The controller communication module 19 is connected to the high-speed wireless communication module 28.

The input/output processor 11a can be connected to a network such as the Internet via the network communication module 18 and the antenna 22 to communicate with other game devices and servers connected to the network. The input/output processor 11a regularly accesses the flash memory 17, and detects the presence or absence of any data which needs to be transmitted to the network, and when detected, transmits the data to the network via the network communication module 18 and the antenna 22. Further, the input/output processor 11a receives data transmitted from another game device and data downloaded from a download server via the network, the antenna 22 and the network communication module 18, and stores the received data in the flash memory 17. The CPU 10 executes a game program so as to read data stored in the flash memory 17 and use the data, as appropriate, in the game program. The flash memory 17 may store game save data (e.g., game result data or unfinished game data) of a game played using the game apparatus 3 in addition to data exchanged between the game apparatus 3 and other game apparatus or servers.

The input/output processor 11a receives first operation data transmitted from the operating device 7 via the antenna 23 and the controller communication module 19, and stores it (temporarily) in a buffer area of the internal main memory 11e or the external main memory 12. Also, the input/output processor 11a receives second operation data, which is transmitted from the hand-held device 9, via the antenna 29, the high-speed wireless communication module 28, and the controller communication module 19, and stores it (temporarily) in the buffer area of the internal main memory 11e or the external main memory 12.

When transmitting game images (second game images) to the hand-held device 9, the input/output processor 11a outputs game image data generated by the GPU 11b to the image compression section 27. The image compression section 27 performs a predetermined compression process on the image data from the input/output processor 11a. The high-speed wireless communication module 28 wirelessly communicates with the hand-held device 9. Accordingly, the image data compressed by the image compression section 27 is transmitted by the high-speed wireless communication module 28 to the hand-held device 9 via the antenna 29. In the present embodiment, the image data transmitted from the game apparatus 3 to the hand-held device 9 is image data used in a game, and the playability of a game can be adversely influenced if there is a delay in the images displayed in the game. Therefore, it is preferred to eliminate delay as much as possible for the transmission of image data from the game apparatus 3 to the hand-held device 9. Therefore, in the present embodiment, the image compression section 27 compresses image data using a compression technique with high efficiency such as the H.264 standard, for example. Other compression techniques may be used, and image data may be transmitted uncompressed if the communication speed is sufficient. The high-speed wireless communication module 28 is, for example, a Wi-Fi certified communication module, and may perform wireless communication at high speed with the hand-held device 9 using a MIMO (Multiple Input Multiple Output) technique employed in the IEEE 802.11n standard, for example, or may use other communication schemes.

While the above description focuses on the image data transmitted from the game apparatus 3 to the hand-held device 9, in the present embodiment, sound data is also transmitted together with the image data. Specifically, the input/output processor 11a outputs sound data generated by the DSP 11c to the high-speed wireless communication module 28 via the image compression section 27. The high-speed wireless communication module 28 transmits the sound data, along with the image data, to the hand-held device 9 via the antenna 29. Note that the image compression section 27 may or may not perform a compression process on the sound data.

Also, when the hand-held device 9 transmits data (specifically, second operation data) to the game apparatus 3, the high-speed wireless communication module 28 receives the data via the antenna 29. The received data is acquired by the input/output processor 11a. Note that in the present embodiment, any data from the hand-held device 9 to the game apparatus 3 is not subjected to a compression process, and the data is not subjected to a decompression process, but in another embodiment, such data may be subjected to a compression process in the hand-held device 9 and a decompression process in the game apparatus 3.

The input/output processor 11a is connected to the expansion connector 20 and the memory card connector 21. The expansion connector 20 is a connector for an interface, such as a USB or SCSI interface. The expansion connector 20 can receive a medium such as an external storage medium, a peripheral device such as another controller, or a wired communication connector which enables communication with a network in place of the network communication module 18. The memory card connector 21 is a connector for connecting thereto an external storage medium such as a memory card (which may be of a proprietary or standard format, such as SD, miniSD, microSD, Compact Flash, etc.). For example, the input/output processor 11a can access an external storage medium via the expansion connector 20 or the memory card connector 21 to store data in the external storage medium or read data from the external storage medium.

The game apparatus 3 includes a power button 24, a reset button 25, and an eject button 26. The power button 24 and the reset button 25 are connected to the system LSI 11. When the power button 24 is on, power is supplied to the components of the game apparatus 3 through an AC adaptor (not shown). When the reset button 25 is pressed, the system LSI 11 reboots a boot program of the game apparatus 3. The eject button 26 is connected to the disc drive 14. When the eject button 26 is pressed, the optical disc 4 is ejected from the disc drive 14.

In other embodiments, some of the components of the game apparatus 3 may be provided as extension devices separate from the game apparatus 3. In this case, an extension device may be connected to the game apparatus 3 via the expansion connector 20, for example. Specifically, an extension device may include components of the image compression section 27, the high-speed wireless communication module 28 and the antenna 29, for example, and can be attached/detached to/from the expansion connector 20. Thus, by connecting the extension device to a game apparatus which does not include the above components, the game apparatus can communicate with the hand-held device 9.

3. Configuration of the Operating Device 7

Figure 3:
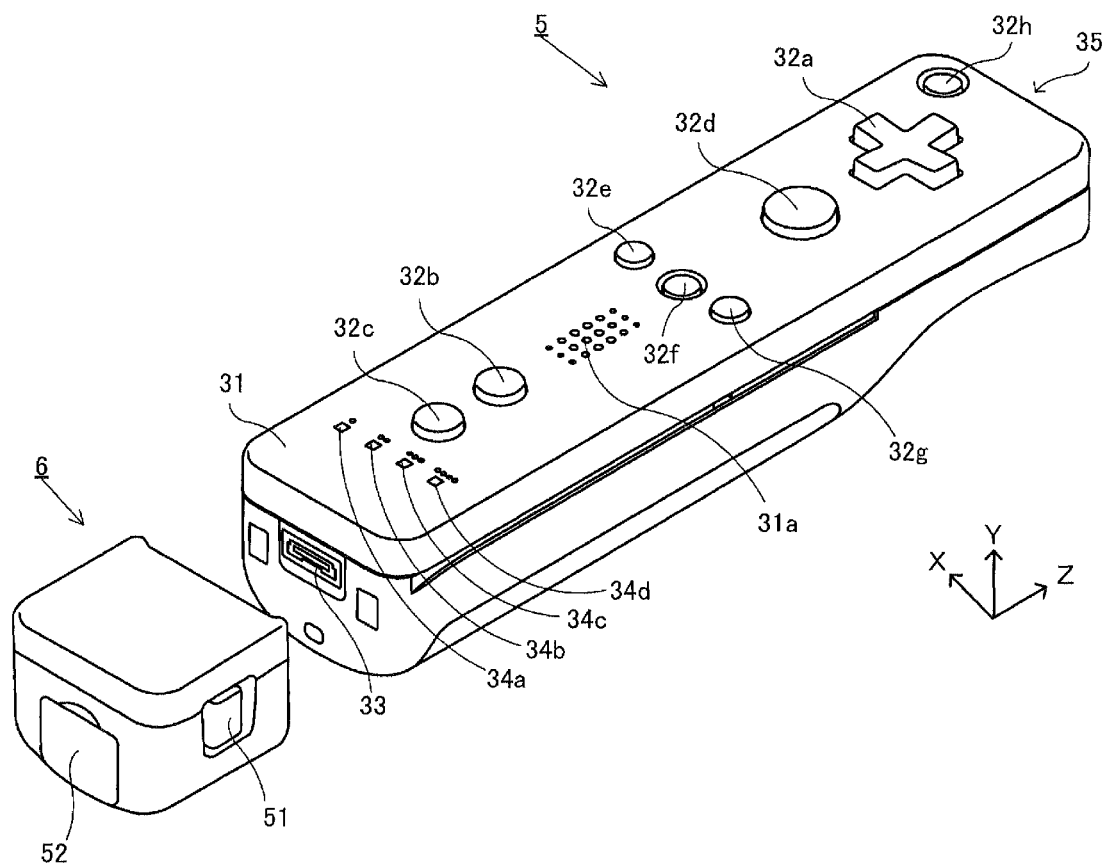
FIG. 3 is a perspective view illustrating an external configuration of an operating device.
Figure 4:
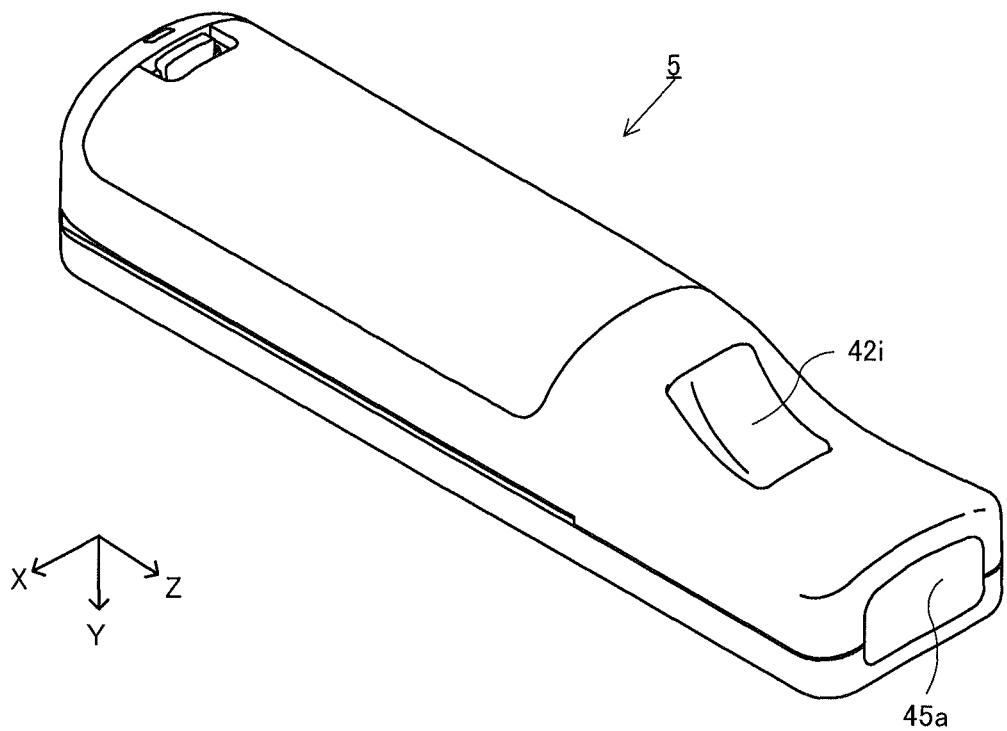
FIG. 4 is a perspective view illustrating an external configuration of a controller.

Next, with reference to FIGS. 3 to 7, the operating device 7 (the controller 5 and the gyroscope unit 6) will be described. FIG. 3 is a perspective view illustrating an external configuration of the operating device 7. FIG. 4 is a perspective view illustrating an external configuration of the controller 5. The perspective view of FIG. 3 shows the operating device 7 as viewed from the top rear side thereof, and the perspective view of FIG. 4 shows the controller 5 as viewed from the bottom front side thereof.

As shown in FIG. 3 and FIG. 4, the controller 5 has a housing 31 formed by, for example, plastic molding. The housing 31 has a generally parallelepiped shape extending in a longitudinal direction from front to rear (Z-axis direction shown in FIG. 3), and as a whole is sized to be held by one hand of an adult or even a child. A player can perform game operations by pressing buttons provided on the controller 5, and moving the controller 5 to change the position and the attitude (tilt) thereof.

The housing 31 has a plurality of operation buttons. As shown in FIG. 3, on the top surface of the housing 31, a cross button 32a, a first button 32b, a second button 32c, an A button 32d, a minus button 32e, a home button 32f, a plus button 32g, and a power button 32h are provided. In the present invention, the top surface of the housing 31 on which the buttons 32a to 32h are provided may be referred to as a "button surface". On the other hand, as shown in FIG. 4, a recessed portion is formed on the bottom surface of the housing 31, and a B button 32i is provided on a rear slope surface of the recessed portion. The operation buttons 32a to 32i are assigned, as necessary, their respective functions in accordance with the information processing program executed by the game apparatus 3. Further, the power button 32h is intended to remotely turn ON/OFF the game apparatus 3. The home button 32f and the power button 32h each have the top surface thereof recessed below the top surface of the housing 31. Therefore, the home button 32f and the power button 32h are prevented from being inadvertently pressed by the player.

On the rear surface of the housing 31, the connector 33 is provided. The connector 33 is used for connecting the controller 5 to another device (for example, the gyroscope unit 6 or another controller). Both sides of the connector 33 on the rear surface of the housing 31 have a fastening hole 33a for preventing easy inadvertent disengagement of another device as described above.

In the rear-side portion of the top surface of the housing 31, a plurality (four in FIG. 3) of LEDs 34a, 34b, 34c, and 34d are provided. The controller 5 is assigned a controller type (number) so as to be distinguishable from another main controller. The LEDs 34a, 34b, 34c, and 34d are each used for informing the player of the controller type which is currently being set for the controller 5 being used, and for informing the player of remaining battery power of the controller 5, for example. Specifically, when a game operation is performed using the controller 5, one of the LEDs 34a, 34b, 34c, and 34d corresponding to the controller type is lit up.

The controller 5 has an imaging information calculation section 35 (FIG. 6), and a light incident surface 35a through which a light is incident on the imaging information calculation section 35 is provided on the front surface of the housing 31, as shown in FIG. 4. The light incident surface 35a is made of a material transmitting therethrough at least infrared light outputted from the markers 8R and 8L.

On the top surface of the housing 31, sound holes 31a for externally outputting a sound from a speaker 49 (shown in FIG. 5) incorporated in the controller 5 is provided between the first button 32b and the home button 32f.

Figure 5:
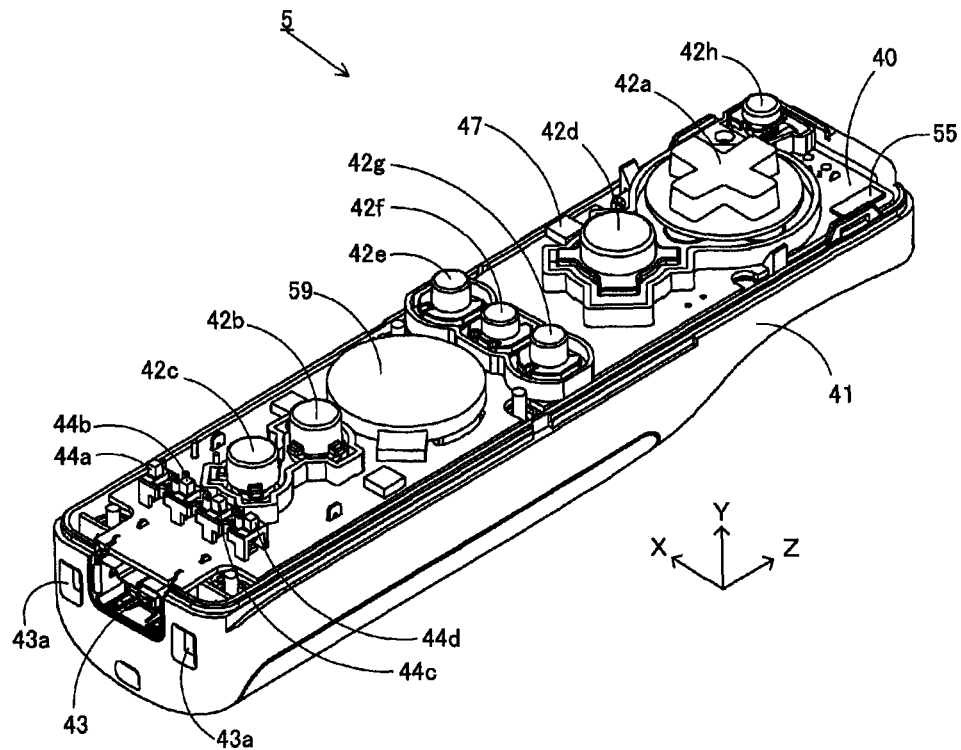
FIG. 5 is a diagram illustrating an internal configuration of the controller.
Figure 6:
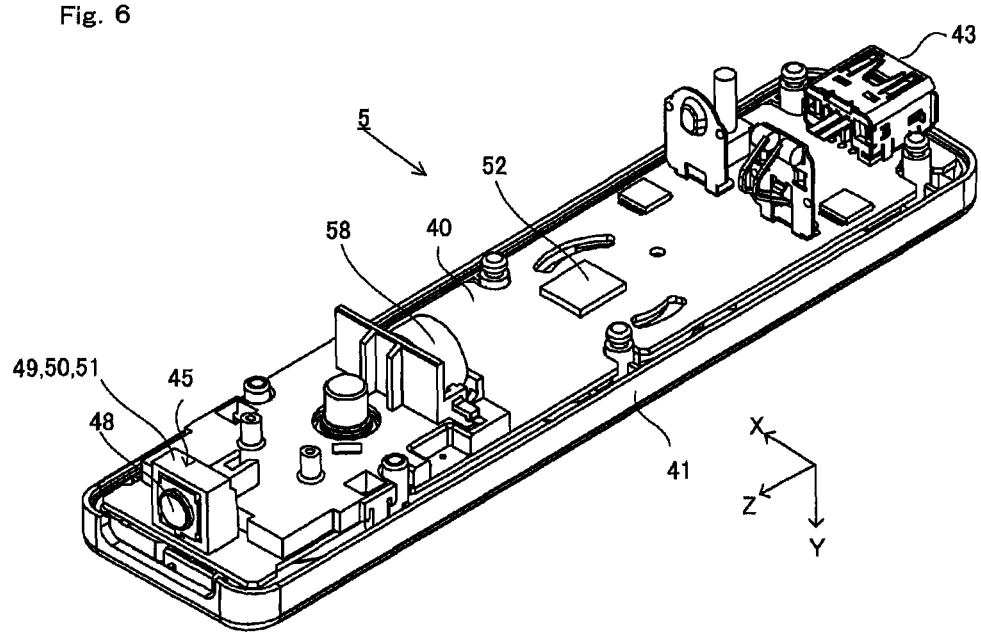
FIG. 6 is another diagram illustrating an internal configuration of the controller.

Next, with reference to FIGS. 5 and 6, an internal configuration of the controller 5 will be described. FIG. 5 and FIG. 6 are diagrams illustrating the internal configuration of the controller 5. FIG. 5 is a perspective view illustrating a state where an upper casing (a part of the housing 31) of the controller 5 is removed. FIG. 6 is a perspective view illustrating a state where a lower casing (a part of the housing 31) of the controller 5 is removed. The perspective view of FIG. 6 shows a substrate 30 of FIG. 5 as viewed from the reverse side.

As shown in FIG. 5, the substrate 30 is fixed inside the housing 31, and on a top main surface of the substrate 30, the operation buttons 32a to 32h, the LEDs 34a, 34b, 34c, and 34d, an acceleration sensor 37, an antenna 45, the speaker 49, and the like are provided. These elements are connected to a microcomputer 42 (see FIG. 6) via lines (not shown) formed on the substrate 30 and the like. In the present embodiment, the acceleration sensor 37 is provided on a position offset from the center of the controller 5 with respect to the X-axis direction. Thus, calculation of the movement of the controller 5 being rotated about the Z-axis may be facilitated. Further, the acceleration sensor 37 is provided anterior to the center of the controller 5 with respect to the longitudinal direction (Z-axis direction). Further, a wireless module 44 (see FIG. 6) and the antenna 45 allow the controller 5 to act as a wireless controller.

On the other hand, as shown in FIG. 6, at a front edge of a bottom main surface of the substrate 30, the imaging information calculation section 35 is provided. The imaging information calculation section 35 includes an infrared filter 38, a lens 39, an image pickup element 40 and an image processing circuit 41 located in order, respectively, from the front of the controller 5. These components 38 to 41 are attached on the bottom main surface of the substrate 30.

On the bottom main surface of the substrate 30, the microcomputer 42 and a vibrator 48 are provided. The vibrator 48 is, for example, a vibration motor or a solenoid, and is connected to the microcomputer 42 via lines formed on the substrate 30 or the like. The controller 5 is vibrated by actuation of the vibrator 48 based on a command from the microcomputer 42. Therefore, the vibration is conveyed to the player's hand holding the controller 5, and thus a so-called vibration-feedback game is realized. In the present embodiment, the vibrator 48 is disposed slightly toward the front of the housing 31. That is, the vibrator 48 is positioned offset from the center toward the end of the controller 5, and therefore the vibration of the vibrator 48 can lead to enhancement of the vibration of the entire controller 5. Further, the connector 33 is provided at the rear edge of the bottom main surface of the substrate 30. In addition to the components shown in FIGS. 5 and 6, the controller 5 includes a quartz oscillator for generating a reference clock of the microcomputer 42, an amplifier for outputting a sound signal to the speaker 49, and the like.

Further, the gyroscope unit 6 includes gyroscopes (gyroscopes 55 and 56 shown in FIG. 7) for detecting angular rates about three axes, respectively. The gyroscope unit 6 is detachably attached to the connector 33 of the controller 5. The gyroscope unit 6 has, at the front edge (an edge portion oriented to the Z-axis positive direction shown in FIG. 3), a plug (a plug 53 shown in FIG. 7) connectable to the connector 33. Further, the plug 53 has hooks (not shown) on both sides, respectively. In a state where the gyroscope unit 6 is attached to the controller 5, the plug 53 is connected to the connector 33, and the hooks engage with the fastening holes 33a, respectively, of the controller 5. Therefore, the controller 5 and the gyroscope unit 6 are securely fixed to each other. Further, the gyroscope unit 6 has a button 51 on each side surface (surfaces oriented to the X-axis direction shown in FIG. 3). When the button 51 is pressed, the hook is disengaged from the fastening hole 33a. Therefore, when the plug 53 is removed from the connector 33 while the button 51 is being pressed, the gyroscope unit 6 can be disconnected from the controller 5.

Further, a connector having the same shape as the connector 33 is provided at the rear edge of the gyroscope unit 6. Therefore, another device which can be attached to (the connector 33 of) the controller 5 can be attached as well to the connector of the gyroscope unit 6. In FIG. 3, a cover 52 is detachably provided over the connector.

FIGS. 3 to 6 show only examples of the shape of the controller 5 and the gyroscope unit 6, the shape of each operation button, the number and the positions of acceleration sensors and vibrators, and so on. The present invention can be realized with other shapes, numbers, and positions. Further, although in the present embodiment the imaging direction of the image pickup means is the Z-axis positive direction, the imaging direction may be any direction. That is, the imaging information calculation section 35 (the light incident surface 35a through which a light is incident on the imaging information calculation section 35) of the controller 5 may not necessarily be provided on the front surface of the housing 31, but may be provided on any other surface on which a light can be received from the outside of the housing 31.

Figure 7:
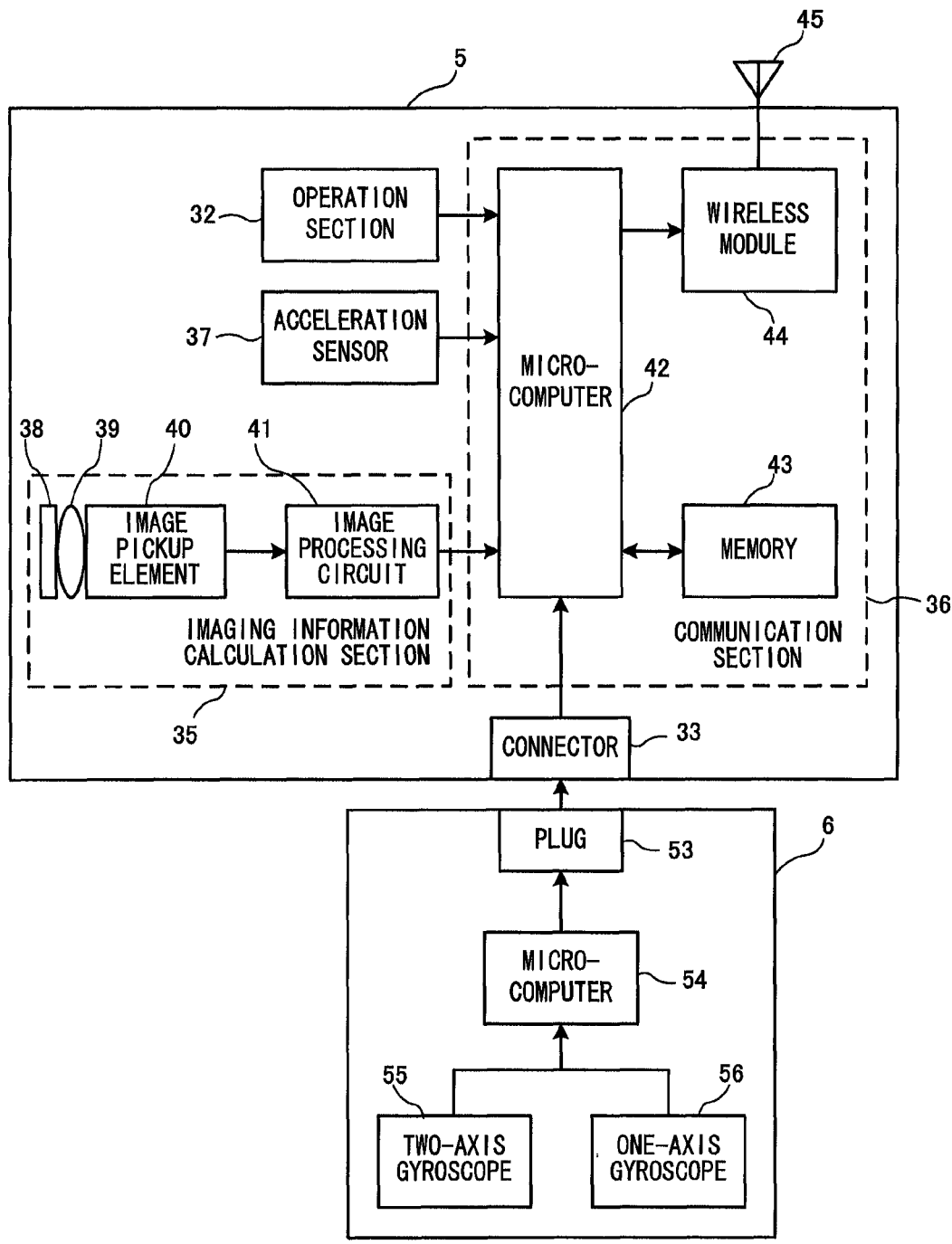
FIG. 7 is a block diagram illustrating a configuration of the operating device.

FIG. 7 is a block diagram illustrating a configuration of the operating device 7 (the controller 5 and the gyroscope unit 6). The controller 5 includes an operating section 32 (the operation buttons 32a to 32i), the connector 33, the imaging information calculation section 35, a communication section 36, and the acceleration sensor 37. The controller 5 transmits, as first operation data, data representing the content of an operation performed on the controller 5 itself, to the game apparatus 3.

The operating section 32 includes the operation buttons 32a to 32i described above, and outputs, to the microcomputer 42 of the communication section 36, operation button data indicating an input state (that is, whether or not each operation button 32a to 32i is pressed) of each operation button 32a to 32i.

The imaging information calculation section 35 is a system for analyzing image data taken by the image pickup means and calculating, for example, the centroid and the size of an area having a high brightness in the image data. The imaging information calculation section 35 has a maximum sampling period of, for example, about 200 frames/sec., and therefore can trace and analyze even a relatively fast motion of the controller 5.

The imaging information calculation section 35 includes the infrared filter 38, the lens 39, the image pickup element 40 and the image processing circuit 41. The infrared filter 38 transmits therethrough only infrared light included in the light incident on the front surface of the controller 5. The lens 39 collects the infrared light transmitted through the infrared filter 38 so as to be incident on the image pickup element 40. The image pickup element 40 is a solid-state imaging device such as, for example, a CMOS sensor or a CCD sensor, which receives the infrared light collected by the lens 39, and outputs an image signal. The markers 8R and 8L of the marker device 8 provided near the display screen of the television 2 each include an infrared LED for outputting an infrared light forward from the television 2. Therefore, the infrared filter 38 enables the image pickup element 40 to receive only the infrared light transmitted through the infrared filter 38 and generate image data, so that an image of each of the markers 8R and 8L can be taken with enhanced accuracy. Hereinafter, the image taken by the image pickup element 40 is referred to as a pickup image. The image data generated by the image pickup element 40 is processed by the image processing circuit 41. The image processing circuit 41 calculates, in the pickup image, the positions of subjects to be imaged (the markers 8R and 8L). The image processing circuit 41 outputs data representing coordinate points of the calculated positions, to the microcomputer 42 of the communication section 36. The data representing the coordinate points is transmitted as first operation data to the game apparatus 3 by the microcomputer 42. Hereinafter, the coordinate points are referred to as "marker coordinate points". The marker coordinate point changes depending on the attitude (angle of tilt) and/or the position of the controller 5 itself, and therefore the game apparatus 3 is allowed to calculate the attitude and the position of the controller 5 using the marker coordinate point.

In another embodiment, the controller 5 may not necessarily include the image processing circuit 41, and the controller 5 may transmit the pickup image as it is to the game apparatus 3. At this time, the game apparatus 3 may have a circuit or a program, having the same function as the image processing circuit 41, for calculating the marker coordinate point.

The acceleration sensor 37 detects accelerations (including a gravitational acceleration) of the controller 5, that is, force (including gravity) applied to the controller 5. The acceleration sensor 37 detects a value of an acceleration (linear acceleration) applied to a detection section of the acceleration sensor 37 in the straight line direction along the sensing axis direction, among all accelerations applied to a detection section of the acceleration sensor 37. For example, a multiaxial acceleration sensor having two or more axes detects an acceleration of a component for each axis, as the acceleration applied to the detection section of the acceleration sensor. For example, the three-axis or two-axis acceleration sensor may be of the type available from Analog Devices, Inc. or STMicroelectronics N.V. The acceleration sensor 37 is, for example, an electrostatic capacitance type acceleration sensor. However, another type of acceleration sensor may be used.

In the present embodiment, the acceleration sensor 37 detects a linear acceleration in each of three axis directions, i.e., the up/down direction (Y-axis direction shown in FIG. 3), the left/right direction (the X-axis direction shown in FIG. 3), and the forward/backward direction (the Z-axis direction shown in FIG. 3), relative to the controller 5. The acceleration sensor 37 detects acceleration in the straight line direction along each axis, and an output from the acceleration sensor 37 represents a value of the linear acceleration for each of the three axes. In other words, the detected acceleration is represented as a three-dimensional vector in an XYZ-coordinate system (controller coordinate system) defined relative to the operating device 7 (the controller 5).

Data (acceleration data) representing the acceleration detected by the acceleration sensor 37 is outputted to the communication section 36. The acceleration detected by the acceleration sensor 37 changes depending on the attitude (angle of tilt) and the movement of the controller 5, and therefore the game apparatus 3 is allowed to calculate the attitude and the movement of the controller 5 using the acquired acceleration data. In the present embodiment, the game apparatus 3 calculates the attitude, angle of tilt, etc., of the controller 5 based on the acquired acceleration data.

When a computer such as a processor (e.g., the CPU 10) of the game apparatus 3 or a processor (e.g., the microcomputer 42) of the controller 5 processes an acceleration signal outputted from the acceleration sensor 37 (or similarly from an acceleration sensor 89 to be described later), additional information relating to the controller 5 can be inferred or calculated (determined), as one skilled in the art will readily understand from the description herein. For example, in the case where the computer performs processing on the premise that the controller 5 including the acceleration sensor 37 is in static state (that is, in the case where processing is performed on the premise that the acceleration to be detected by the acceleration sensor includes only the gravitational acceleration), when the controller 5 is actually in static state, it is possible to determine whether or not, or how much the controller 5 tilts relative to the direction of gravity, based on the acceleration having been detected. Specifically, when the state where the detection axis of the acceleration sensor 37 faces vertically downward is set as a reference, whether or not the controller 5 tilts relative to the reference can be determined based on whether or not 1G (gravitational acceleration) is applied to the detection axis, and the degree to which the controller 5 tilts relative to the reference can be determined based on the magnitude of the gravitational acceleration. Further, the multiaxial acceleration sensor 37 processes the acceleration signals having been detected for the respective axes so as to more specifically determine the degree to which the controller 5 tilts relative to the direction of gravity. In this case, the processor may calculate, based on the output from the acceleration sensor 37, the angle at which the controller 5 tilts, or the direction in which the controller 5 tilts without calculating the angle of tilt. Thus, the acceleration sensor 37 is used in combination with the processor, making it possible to determine the angle of tilt or the attitude of the controller 5.

On the other hand, when it is premised that the controller 5 is in dynamic state (where the controller 5 is being moved), the acceleration sensor 37 detects the acceleration based on the movement of the controller 5, in addition to the gravitational acceleration. Therefore, when the gravitational acceleration component is eliminated from the detected acceleration through a predetermined process, it is possible to determine the direction in which the controller 5 moves. Even when it is premised that the controller 5 is in dynamic state, the acceleration component based on the movement of the acceleration sensor is eliminated from the detected acceleration through a predetermined process, whereby it is possible to determine the tilt of the controller 5 relative to the direction of gravity. In another embodiment, the acceleration sensor 37 may include an embedded processor or another type of dedicated processor for performing any desired processing on an acceleration signal detected by the acceleration detection means incorporated therein before outputting to the microcomputer 42. For example, when the acceleration sensor 37 is intended to detect static acceleration (for example, gravitational acceleration), the embedded or dedicated processor could convert the acceleration signal to a corresponding angle of tilt (or another preferable parameter).

The communication section 36 includes the microcomputer 42, memory 43, the wireless module 44 and the antenna 45. The microcomputer 42 controls the wireless module 44 for wirelessly transmitting, to the game apparatus 3, data acquired by the microcomputer 42 while using the memory 43 as a storage area in the process. Further, the microcomputer 42 is connected to the connector 33. Data transmitted from the gyroscope unit 6 is inputted to the microcomputer 42 through the connector 33. Hereinafter, a configuration of the gyroscope unit 6 will be described.

The gyroscope unit 6 includes the plug 53, a microcomputer 54, the two-axis gyroscope 55, and the one-axis gyroscope 56. As described above, the gyroscope unit 6 detects angular rates about three axes (X-, Y-, and Z-axes in the present embodiment), respectively, and transmits data (angular rate data) representing the detected angular rates, to the controller 5.

The two-axis gyroscope 55 detects an angular rate (per unit time) about each of the X-axis and the Z-axis. Further, the one-axis gyroscope 56 detects an angular rate (per unit time)

about the Y-axis. In the present invention, the directions of rotation about the X-axis, the Y-axis, and the Z-axis relative to the imaging direction (the Z-axis positive direction) of the controller 5 are referred to as a pitch direction, a yaw direction, and a roll direction, respectively. That is, the two-axis gyroscope 55 detects angular rates in the pitch direction (the direction of rotation about the X-axis) and the roll direction (the direction of rotation about the Z-axis), and the one-axis gyroscope 56 detects an angular rate in the yaw direction (the direction of rotation about the Y-axis).

In the present embodiment, the two-axis gyroscope 55 and the one-axis gyroscope 56 are used to detect the angular rates about the three axes. However, in another embodiment, the number of gyroscopes and a combination thereof to be used may be optionally selected, provided that the angular rates about the three axes can be detected.

Data representing the angular rates detected by the gyroscopes 56 and 57 are outputted to the microcomputer 54. That is, data representing the angular rates about the three axes, i.e., the X-, Y-, and Z-axes, are inputted to the microcomputer 54. The microcomputer 54 transmits the data representing the angular rates about the three axes, as angular rate data, to the controller 5 through the plug 53. The transmission from the microcomputer 54 to the controller 5 is sequentially performed at a predetermined cycle, and the game is typically processed at a cycle of 1/60 seconds (corresponding to one frame time), and the transmission is preferably performed at a cycle shorter than a cycle of 1/60 seconds.

The controller 5 will be described again. Data outputted from the operating section 32, the imaging information calculation section 35, and the acceleration sensor 37 to the microcomputer 42, and data transmitted from the gyroscope unit 6 to the microcomputer 42 are temporarily stored to the memory 43. The data are transmitted as the first operation data to the game apparatus 3. At the time of the transmission to the controller communication module 19 of the game apparatus 3, the microcomputer 42 outputs the operation data stored in the memory 43 to the wireless module 44 as the first operation data. The wireless module 44 uses, for example, the Bluetooth (registered trademark) technology to modulate the first operation data onto a carrier wave of a predetermined frequency, and radiates the low power radio wave signal from the antenna 45. That is, the first operation data is modulated onto the low power radio wave signal by the wireless module 44 and transmitted from the controller 5. The controller communication module 19 of the game apparatus 3 receives the low power radio wave signal. The game apparatus 3 demodulates or decodes the received low power radio wave signal to acquire the first operation data. Based on the first operation data acquired from the operating device 7, the second operation data acquired from the hand-held device 9, and the game program, the CPU 10 of the game apparatus 3 performs the game process. The wireless transmission from the communication section 36 to the controller communication module 19 is sequentially performed at a predetermined time interval. Since the game process is generally performed at a cycle of 1/60 sec. (corresponding to one frame time), data is preferably transmitted at a cycle of a shorter time period. The communication section 36 of the controller 5 outputs, to the controller communication module 19 of the game apparatus 3, the first operation data at intervals of 1/200 seconds, for example.

As described above, the operating device 7 can transmit marker coordinate data, acceleration data, angular rate data, and operation button data as first operation data representing operations performed thereon. In addition, the game apparatus 3 executes the game process using the first operation data as game inputs. Accordingly, by using the operating device 7, the player can perform the game operation of moving the operating device 7 itself, in addition to conventionally general game operations of pressing operation buttons. For example, it is possible to perform the operations of tilting the operating device 7 to arbitrary attitudes, pointing the operating device 7 to arbitrary positions on the screen, and moving the operating device 7 itself.

Also, in the present embodiment, the operating device 7 is not provided with any display means for displaying game images, but the operating device 7 may be provided with a display means for displaying an image or suchlike to indicate, for example, a remaining battery level.

4. External Configuration of the Hand-Held Device 9

Figure 8:
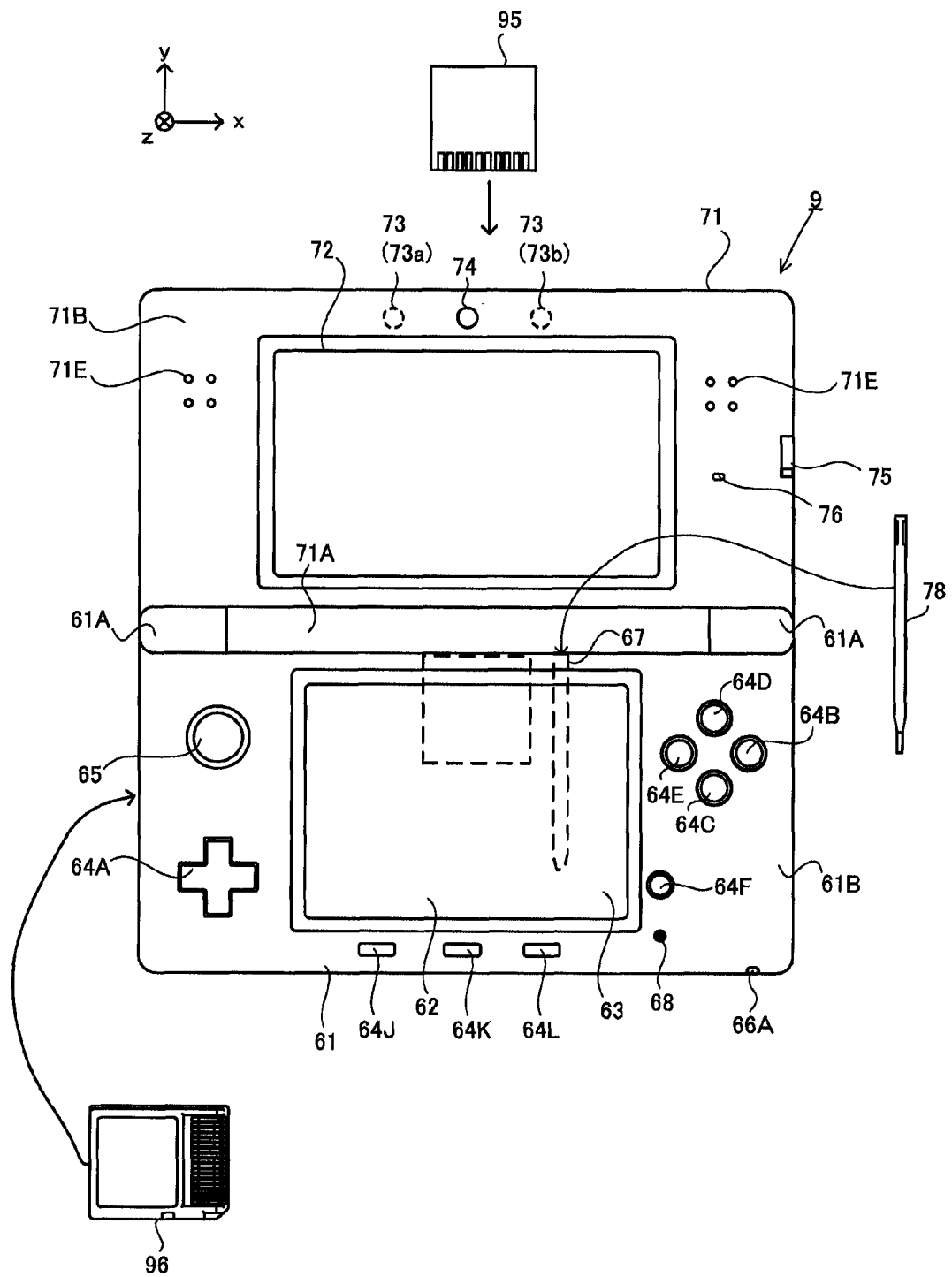
FIG. 8 is a diagram illustrating an external configuration of a hand-held device.

FIG. 8 is a diagram illustrating an external configuration of the hand-held device 9. As shown in FIG. 8, the hand-held device 9 includes a lower housing 61 and an upper housing 71. The lower housing 61 and the upper housing 71 are connected together so that they can be opened/closed (folded). In the present embodiment, the housings 61 and 71 each have a landscape-oriented rectangular plate shape and are pivotally connected together along their long-side portions. Specifically, the lower housing 61 and the upper housing 71 are connected in a foldable manner by coupling the protruding portion 61A of the lower housing 61 with the protruding portion 71A of the upper housing 71.

(Description of the Lower Housing)

First, a configuration of the lower housing 61 will be described. As shown in FIG. 8, a lower LCD (Liquid Crystal Display) 62, a touch panel 63, operation buttons 64A to 64L, an analog stick 65, LEDs 66A to 66B, an insertion hole 67, and a microphone hole 68 are provided in the lower housing 61. Hereinafter, these components will be described in detail.

The lower LCD 62 is accommodated in the lower housing 61. In the present embodiment, the number of pixels of the lower LCD 62 is, for example, 256 dots×192 dots (horizontal×vertical), but a display device with any resolution can be used as the lower LCD 62. Furthermore, in the present embodiment, an LCD is used as the display device, but any other display device may be used such as a display device using EL (Electro Luminescence), for example.

The touch panel 63 is mounted on the screen of the lower LCD 62. Note that in the present embodiment, the touch panel 63 is a resistive film type touch panel. However, the touch panel is not limited to the resistive film type and can be a touch panel of any type such as, for example, the electrostatic capacitance type. Furthermore, the touch panel 63 may be either a single-touch panel or a multi-touch panel. In the present embodiment, a touch panel having the same resolution (detection precision) as the resolution of the lower LCD 62 is used as the touch panel 63. Note however that it is not always necessary that the resolution of the touch panel 63 and the resolution of the lower LCD 62 coincide with each other. The insertion hole 67 (a dotted line shown in FIG. 8) is provided on the upper-side surface of the lower housing 61. The insertion hole 67 can accommodate a stylus 78 which is used for performing operations on the touch panel 63. Note that although an input on the touch panel 63 is usually made by using the stylus 78, the present invention is not limited to the stylus 78 and a finger of the user may be used for making an input on the touch panel 63.

The operation buttons 64A to 64L are each an input device for making a predetermined input. As shown in FIG. 8, among the operation buttons 64A to 64L, a cross button 64A (a direction input button 64A), a button 64B, a button 64C, a button 64D, a button 64E, a power button 64F, a select button 64J, a HOME button 64K, and a start button 64L are provided on the inner-side surface (main surface) of the lower housing 61. The cross button 64A is cross-shaped, and includes buttons for specifying up, down, left and right directions. The buttons 64A to 64E, the select button 64J, the HOME button 64K, and the start button 64L are assigned functions in accordance with a game program, as necessary. For example, the cross button 64A is used for selection operation, and the like, and the operation buttons 64B to 64E are used for determination operation, cancellation operation, etc. The power button 64F is used for turning ON/OFF the power of the hand-held device 9.

Although not shown, L and R buttons are provided on the upper-side surface of the lower housing 61. The L button is provided on the left end portion of the upper surface of the lower housing 61, and the R button is provided on the right end portion of the upper surface of the lower housing 61. Although not shown, a sound volume button is provided on the left-side surface of the lower housing 61. The sound volume button is used for adjusting the sound volume of a speaker of the hand-held device 9.

An analog stick 65 is a device for directing a course, provided on the inner-side surface of the lower housing 61. As shown in FIG. 8, the analog stick 65 is provided above the cross button 64A. The analog stick 65 is configured such that its stick portion can tilt in an arbitrary direction (at an arbitrary angle in any of the up, down, left and right directions) with respect to the inner-side surface of the lower housing 61 when it is operated with a thumb and/or a finger.

Also, a cover portion which can be opened/closed is provided on the left-side surface of the lower housing 61. A connector (not shown) for electrically connecting the hand-held device 9 and external data storage memory 96 with each other is provided inside the cover portion. The external data storage memory 96 is detachably connected to the connector. The external data storage memory 96 is used for, for example, recording (storing) data for an image captured by the hand-held device 9.

Also, a cover portion which can be opened/closed is provided on the upper-side surface of the lower housing 61. A connector (not shown) for electrically and detachably connecting the hand-held device 9 and external memory 95 having a game program recorded therein is provided inside the cover portion. A predetermined game program is executed as the external memory 95 is connected to the hand-held device 9.

As shown in FIG. 8, a first LED 66A for notifying the user of the ON/OFF status of the power supply of the hand-held device 9 is provided on the lower-side surface of the lower housing 61. Also, a second LED for notifying the user of the wireless communication establishment status of the hand-held device 9 is provided on the right-side surface of the lower housing 61. The hand-held device 9 can wirelessly communicate with other devices, and the second LED is lit while the wireless communication is maintained. The hand-held device 9 has a function of connecting to a wireless LAN by a scheme based on the IEEE 802.11n standard, for example. A wireless switch for enabling/disabling the wireless communication function is provided on the right-side surface of the lower housing 61.

The microphone hole 68 is provided on the inner-side surface of the lower housing 61. A microphone (see FIG. 9) as a sound input device to be described later is provided under the microphone hole 68, and the microphone detects sound from the outside of the hand-held device 9.

Note that although not shown, the lower housing 61 accommodates a rechargeable battery serving as the power supply of the hand-held device 9, and the battery can be charged through a terminal provided on a side surface (e.g., the upper-side surface) of the lower housing 61.

(Description of the Upper Housing)

Next, a configuration of the upper housing 71 will be described. As shown in FIG. 8, the upper LCD (Liquid Crystal Display) 72, an outer camera 73 (a left-eye camera 73a and a right-eye camera 73b), an inner camera 74, a 3D adjustment switch 75, and the 3D indicator 76 are provided in the upper housing 71. Hereinafter, these components will be described in detail.

As shown in FIG. 8, the upper LCD 72 is accommodated in the upper housing 71. In the present embodiment, the screen of the upper LCD 72 is designed to be longer than the screen of the lower LCD 62, and the number of pixels of the lower LCD 72 is, for example, 640 dots×200 dots (horizontal× vertical). However, a display device with any resolution can be used as the upper LCD 72. Furthermore, in the present embodiment, the upper LCD 72 is a liquid crystal display, but a display device using EL (Electro Luminescence), etc., may be used, for example.

Also, in the present embodiment, the upper LCD 72 is a display device capable of displaying images that can be stereoscopically viewed (with the naked eye). Specifically, in the present embodiment, a display device of a lenticular type or a parallax barrier type is used as the upper LCD 72 so that the left-eye and right-eye images, which are alternatingly displayed in the horizontal direction on the upper LCD 72, can be seen separately by the left eye and the right eye, respectively. However, in another embodiment, the upper LCD 72 does not have to be a display device capable of displaying images that can be viewed stereoscopically. Note that in the present embodiment, the upper LCD 72 is a display device that can be switched between a stereoscopic display mode where a stereoscopically viewable image is displayed and a two-dimensional display mode where an image is two-dimensionally displayed (a two-dimensionally viewable image is displayed). The display mode switching is done with the 3D adjustment switch 75 to be described later.

The outer camera 73 is provided on an outer-side surface (the back surface opposite to the main surface on which the upper LCD 72 is provided) of the upper housing 71, and is a stereo camera whose image pickup direction is the normal direction to the outer-side surface. The outer camera 73 includes two cameras, i.e., the left-eye camera 73a and the right-eye camera 73b. The left-eye camera 73a and the right-eye camera 73b are placed so that their image pickup directions are parallel to each other. The left-eye camera 73a and the right-eye camera 73b each include an image pickup element (e.g., a CCD image sensor, a CMOS image sensor, etc.) having a predetermined resolution, and a lens. The interval between the left-eye camera 73a and the right-eye camera 73b is set to be about equal to the interval between eyes of a human, and may be set in the range of 30 mm to 70 mm, for example. Note that the interval between the left-eye camera 73a and the right-eye camera 73b is not limited to this range. In other embodiments, the interval between the two cameras 73a and 73b may be variable. With the outer camera 73, it is possible to take images that can be viewed stereoscopically.

The inner camera 74 is a camera which is provided on the inner-side surface (main surface) 71B of the upper housing 71 and whose image pickup direction is the normal direction to the inner-side surface. The inner camera 74 includes an image pickup element (e.g., a CCD image sensor, a CMOS image sensor, etc.) having a predetermined resolution, and a lens. The inner camera 24 captures an image in the direction opposite to that of the outer camera 73, and therefore when the user is looking straight at the upper LCD 72, it is possible to capture an image of the face of the user from the front by the inner camera 74.

The 3D adjustment switch 75 is a sliding switch, and is a switch used for switching between the display modes of the upper LCD 72 as described above. The 3D adjustment switch 75 is used for adjusting the stereoscopic feel of the stereoscopically viewable image (stereoscopic image) displayed on the upper LCD 72. As shown in FIG. 8, the 3D adjustment switch 75 is provided at the edge between the inner-side surface and the right-side surface of the upper housing 71, and is provided at such a position that the 3D adjustment switch 75 can be seen when the user is looking straight at the upper LCD 72. The 3D adjustment switch 75 is provided with a slider slidable in up and down directions, and the stereoscopic feel of the stereoscopic image can be adjusted in accordance with the position of the slider. Here, when the slider is positioned at its lowermost point, the upper LCD 72 is set to the two-dimensional display mode, and when the slider is positioned between a predetermined position above the lowermost point and the uppermost point, the upper LCD 72 is set to the stereoscopic display mode. Also, when the slider is present between the predetermined position and the uppermost point, how a stereoscopic image is seen is adjusted in accordance with the position of the slider.

The 3D indicator 76 shows whether the upper LCD 72 is in the stereoscopic display mode. The 3D indicator 76 is an LED, and is lit when the stereoscopic display mode of the upper LCD 72 is enabled.

Speaker holes 71E are provided on the inner-side surface of the upper housing 71. Sound from a speaker 93 to be described later is outputted from the speaker holes 71E.

5. Internal Configuration of the Hand-Held Device 9

Figure 9:
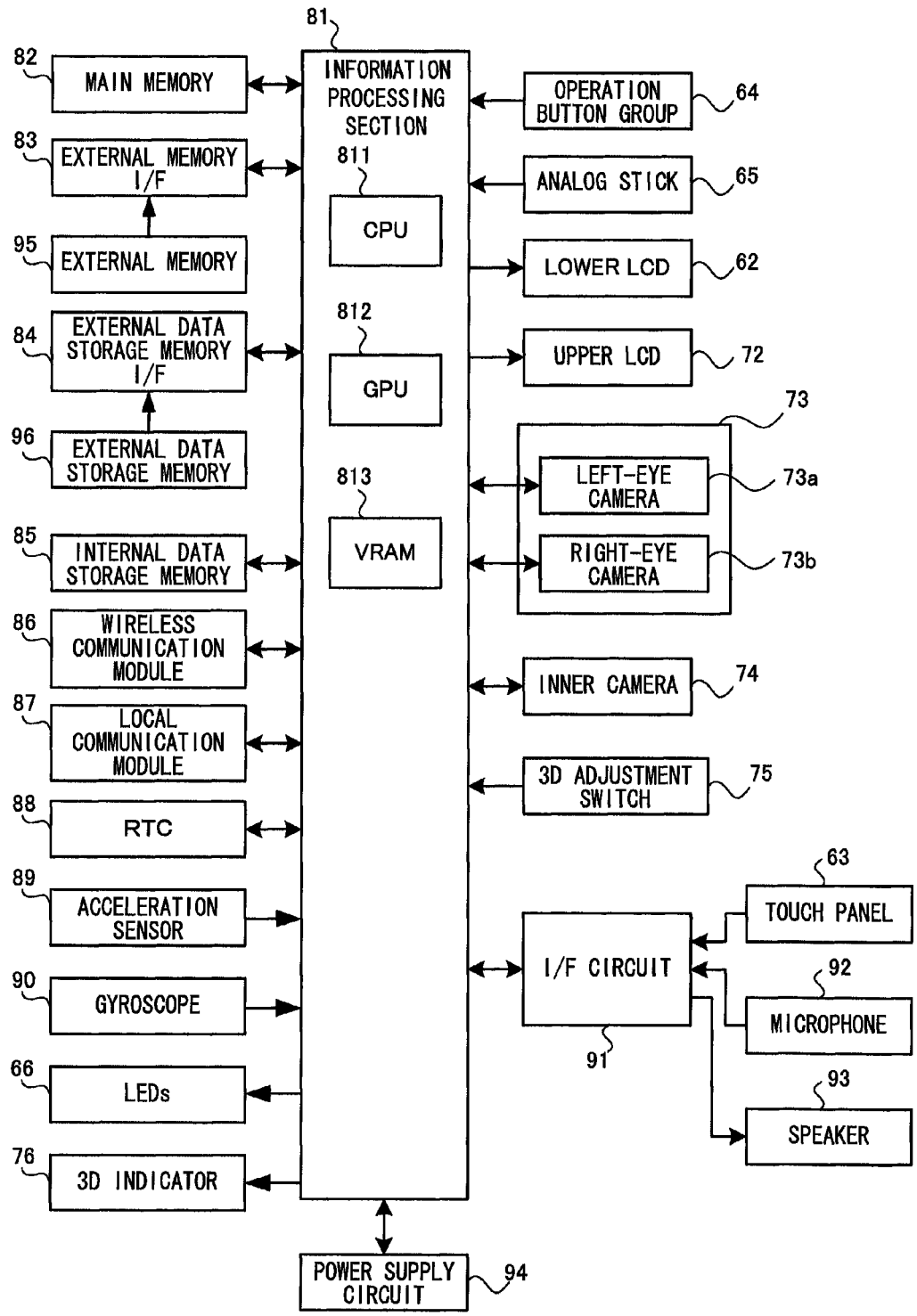
FIG. 9 is a block diagram illustrating an internal configuration of the hand-held device.

Next, referring to FIG. 9, an internal electrical configuration of the hand-held device 9 will be described. FIG. 9 is a block diagram illustrating an internal configuration of the hand-held device 9. As shown in FIG. 9, the hand-held device 9 includes electronic components such as an information processing section 81, main memory 82, an external memory interface (external memory I/F) 83, external data storage memory I/F 84, internal data storage memory 85, a wireless communication module 86, a local communication module 87, a real time clock (RTC) 38, an acceleration sensor 89, a gyroscope 90, a power supply circuit 94, and an interface circuit (I/F circuit) 41, in addition to the components described above. These electronic components are mounted on an electronic circuit substrate and accommodated in the lower housing 61 (or in the upper housing 71).

The information processing section 81 is an information processing section including a CPU 811 for executing a predetermined program, a GPU 812 for performing image processes, etc. In the present embodiment, a program for performing a predetermined process is stored in memory (e.g., the external memory 95 connected to the external memory I/F 83, or the internal data storage memory 85) in the hand-held device 9. The CPU 811 of the information processing section 81 executes the program, thereby performing a process according to the program (e.g., an image pickup process, an image display process to be described later, etc.). Note that a program to be executed by the CPU 811 of the information processing section 81 may be acquired from other devices through communication with the other devices. The information processing section 81 includes VRAM 813. The GPU 812 of the information processing section 81 produces an image in accordance with an instruction from the CPU 811 of the information processing section 81, and renders the image in the VRAM 813. The GPU 812 of the information processing section 81 outputs the image rendered in the VRAM 813 to the upper LCD 72 and/or the lower LCD 62, thereby displaying the image on the upper LCD 72 and/or the lower LCD 62. Note that when image data is acquired from the outside (the game apparatus 3), the acquired image data is stored to the VRAM 813, and an image is displayed on the upper LCD 72 and/or the lower LCD 62.

The main memory 82, the external memory I/F 83, the external data storage memory I/F 84, and the internal data storage memory 85 are connected to the information processing section 81. The external memory I/F 83 is an interface for detachably connecting the external memory 95. The external data storage memory I/F 84 is an interface for detachably connecting the external data storage memory 96.

The main memory 82 is a volatile storage section used as a work area and a buffer area for (the CPU 811 of) the information processing section 81. That is, the main memory 82 temporarily stores various data used for the process based on the program, and temporarily stores a program acquired from the outside (the external memory 95, other devices, etc.). In the present embodiment, PSRAM (Pseudo-SRAM) is used as the main memory 82, for example.

The external memory 95 is a non-volatile storage section for storing a program to be executed by the information processing section 81. The external memory 95 is formed by read-only semiconductor memory, for example. When the external memory 95 is connected to the external memory I/F 83, the information processing section 81 can load the program stored in the external memory 95. A predetermined process is performed by executing the program loaded by the information processing section 81. The external data storage memory 96 is formed by non-volatile readable/writable memory (e.g., NAND-type flash memory), and is used for storing predetermined data. For example, the external data storage memory 96 stores images captured by the outer camera 73 and images captured by other devices. When the external data storage memory 96 is connected to the external data storage memory I/F 84, the information processing section 81 can load images stored in the external data storage memory 96, and display the images on the upper LCD 72 and/or the lower LCD 62.

The internal data storage memory 85 is formed by readable/writable non-volatile memory (e.g., NAND-type flash memory), and is used for storing predetermined data. For example, the internal data storage memory 85 stores data and programs downloaded through wireless communication via the wireless communication module 86.

The wireless communication module 86 has a function of connecting to a wireless LAN by a scheme based on the IEEE 802.11.n standard, for example. The local communication module 87 has a function of performing wireless communication with game devices of the same type by a predetermined communication scheme (e.g., a unique protocol or infrared communication). The wireless communication module 86 and the local communication module 87 are connected to the information processing section 81. The information processing section 81 can transmit/receive data to/from other devices via the Internet by using the wireless communication module 86, and can transmit/receive data to/from other game devices of the same type by using the local communication module 87.

In the present embodiment, the game apparatus 3 and the hand-held device 9 communicate with each other via the wireless communication module 86. Also, information processing section 81 includes an unillustrated image decompression section. The image decompression section performs a predetermined decompression process on image data (and sound data) from the wireless communication module 86. Accordingly, when the game apparatus 3 transmits image data (and sound data), the wireless communication module 86 receives the image data and then the image decompression section performs the predetermined decompression process on the received data. The image data subjected to the decompression process is stored as necessary to the VRAM 813 by the CPU 811, and then outputted to the upper LCD 72 and/or the lower LCD 62.

The acceleration sensor 89 is also connected to the information processing section 81. The acceleration sensor 89 detects magnitudes of linear acceleration along the directions of three axes (x-, y-, and z-axes shown in FIG. 8). In the present embodiment, the acceleration sensor 89 is provided inside the lower housing 61. The acceleration sensor 89 detects magnitudes of linear acceleration of the axes, where the x-axis is the long-side direction of the lower housing 61, the y-axis is the short-side direction of the lower housing 61, and the z-axis is the direction vertical to the inner-side surface (main surface) of the lower housing 61. For example, the acceleration sensor 89 may be one of those of types that are available from Analog Devices, Inc. or STMicroelectronics N.V. Note that while the acceleration sensor 89 is assumed to be an electrostatic capacitance type acceleration sensor, for example, other types of acceleration sensors may be used. The acceleration sensor 89 may be an acceleration sensor which performs detection in one or two axial directions. The information processing section 81 acquires data (acceleration data) representing acceleration detected by the acceleration sensor 89 to detect the attitude and the movement of the hand-held device 9.

The gyroscope 90 is connected to the information processing section 81. The gyroscope 90 detects angular rates about three axes, i.e., the x-, y- and z-axes. Any number and combination of gyroscopes may be used for detecting angular rates about the three axes, and similar to the gyroscope unit 6, the gyroscope 90 may include a two-axis gyroscope and a one-axis gyroscope. Alternatively, the gyroscope 90 may be a gyroscope for detection in one axial direction or two axial directions. The information processing section 81 can acquire data (angular rate data) representing the angular rates detected by the gyroscope 90 to detect the attitude and the movement of the hand-held device 9.

As described above, the hand-held device 9 can acquire acceleration data and angular rate data as operation data representing operations performed thereon. Accordingly, by using the hand-held device 9, the player can perform the game operation of moving the hand-held device 9 itself, in addition to conventionally general game operations of pressing operation buttons.

The information processing section 81 is also connected to the RTC 88 and the power supply circuit 94. The RTC 88 counts the time, and outputs it to the information processing section 81. The information processing section 81 calculates the current time (date) based on the time counted by the RTC 88. The power supply circuit 94 controls the power from the power supply (the rechargeable battery described above accommodated in the lower housing 61) of the hand-held device 9, and supplies power to components of the hand-held device 9.

An I/F circuit 91 is connected to the information processing section 81. A microphone 92 and the speaker 93 are connected to the I/F circuit 91. Specifically, the speaker 93 is connected to the I/F circuit 91 via an amplifier, not shown. The microphone 92 detects sound of the user, and outputs a sound signal to the I/F circuit 91. The amplifier amplifies the sound signal from the I/F circuit 91, and outputs the sound from the speaker 93. The touch panel 63 is connected to the I/F circuit 91. The I/F circuit 91 includes a sound control circuit for controlling the microphone 92 and the speaker 93 (amplifier), and a touch panel control circuit for controlling the touch panel. The sound control circuit performs A/D conversion and D/A conversion on a sound signal, or converts a sound signal to sound data of a predetermined format. The touch panel control circuit produces touch position data of a predetermined format based on a signal from the touch panel 63, and outputs it to the information processing section 81. The touch position data represents the coordinates of the position on the input surface of the touch panel 63 at which an input has been made. Note that the touch panel control circuit reads a signal from the touch panel 63 and produces the touch position data once per a predetermined period of time. The information processing section 81 can know the position at which an input has been made on the touch panel 63 by acquiring the touch position data.

An operation button group 64 includes the operation buttons 64A to 64L and the L and R buttons, and is connected to the information processing section 81. Operation button data representing the input status of the operation button group 64 (whether any button has been pressed) is outputted from the operation button group 64 to the information processing section 81. The information processing section 81 acquires the operation data from the operation button group 64 to perform a process in accordance with the input on the operation button group 64.

The analog stick 65 is connected to the information processing section 81, and outputs stick data, which represents the tilting direction and amount of the analog stick 65, to the information processing section 81. The information processing section 81 acquires the stick data from the analog stick 65, and performs a process according to an input with the analog stick 65.

As described above, there are five input means included in the hand-held device 9 as input devices, which are the acceleration sensor 89, the gyroscope 90, the touch panel 63, the operation button group 64, and the analog stick 65. However, in another embodiment, the hand-held device 9 may include any input devices. For example, the hand-held device 9 may include one or more of the five input means. For example, the hand-held device 9 may also include a touch pad or may also include infrared light detection means (an infrared filter 38, a lens 39, a image pickup element 40, and an image processing circuit 41) similar to those of the controller 5.

The second operation data representing operations on the input devices of the hand-held device 9 is transmitted to the game apparatus 3. Here, the second operation data includes acceleration data from the acceleration sensor 89 and angular rate data from the gyroscope 90, in addition to the touch position data, the operation button data, and the stick data as mentioned above. The information processing section 81 wirelessly transmits the second operation data to the hand-held device 9 via the wireless communication module 86. Note that the second operation data is sequentially transmitted from the hand-held device 9 to the game apparatus 3 in predetermined cycles, preferably in cycles of one frame period or less as in the case of the first operation data being transmitted from the controller 5 to the game apparatus 3.

The lower LCD 62 and the upper LCD 72 are connected to the information processing section 81. The lower LCD 62 and the upper LCD 72 display images in accordance with an instruction from (the GPU 812 of) the information processing section 81. In the present embodiment, it is possible for the information processing section 81 to display a stereoscopic image (stereoscopically viewable image) on the upper LCD 72 using a right-eye image and a left-eye image.

The outer camera 73 and the inner camera 74 are connected to the information processing section 81. The outer camera 73 and the inner camera 74 capture images in accordance with instructions of the information processing section 81, and output data for the captured images to the information processing section 81.

The 3D adjustment switch 75 is connected to the information processing section 81. The 3D adjustment switch 75 transmits to the information processing section 81 an electrical signal in accordance with the position of a slider 25*a*.

The 3D indicator 76 is connected to the information processing section 81. The information processing section 81 controls lighting of the 3D indicator 76. For example, when the upper LCD 72 is in the stereoscopic display mode, the information processing section 81 lights the 3D indicator 76. This has been descriptive of the internal configuration of the hand-held device 9.

6. Outline of the Game Process

Next, the game process to be executed in the game system of the present embodiment will be outlined. In the present embodiment, the game process will be described by taking as an example a baseball game played between two players. In the following, a player using the operating device 7 for offense is referred to as a "first player", and a player using the hand-held device 9 for defense is referred to as a "second player".

This baseball game mainly consists of situations where a pitcher throws a ball and a batter attempts to hit the ball (pitching scenes) and where a fielder attempts to catch a ball hit by a batter (fielding scenes). The game process will be outlined below for both the pitching and fielding scenes.

Figure 10:
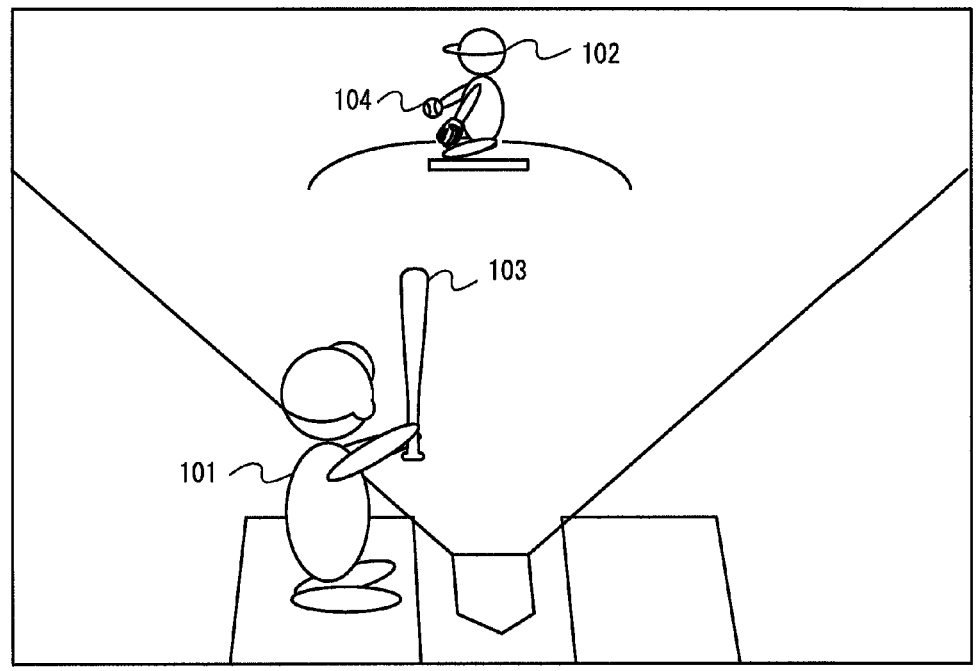
FIG. 10 is a diagram illustrating an exemplary game image (first game image) to be displayed as a pitching scene on a television.

First, the game process for the pitching scene will be described. FIG. 10 is a diagram illustrating an exemplary game image (first game image) to be displayed as a pitching scene on the television 2. The first game image shown in FIG. 10 is an image essentially for the first player. Specifically, the first game image represents a game space with a pitcher (pitcher object) 102 to be operated by the second player being viewed from the position of a batter (batter object) 101 to be operated by the first player. Note that in the game image of FIG. 10, no catcher (catcher object) is displayed, but in another embodiment, a catcher may be displayed on the near side with respect to the batter 101. Also, in the present embodiment, the viewing point and the line of sight for the first game image in the pitching scene are fixed. That is, the position and the attitude of a virtual camera (referred to as a "first virtual camera") for generating the first game image do not change in the pitching scene. Note that in another embodiment, the game apparatus 3 may slightly move the first virtual camera for producing a dramatic effect.

Figure 11:
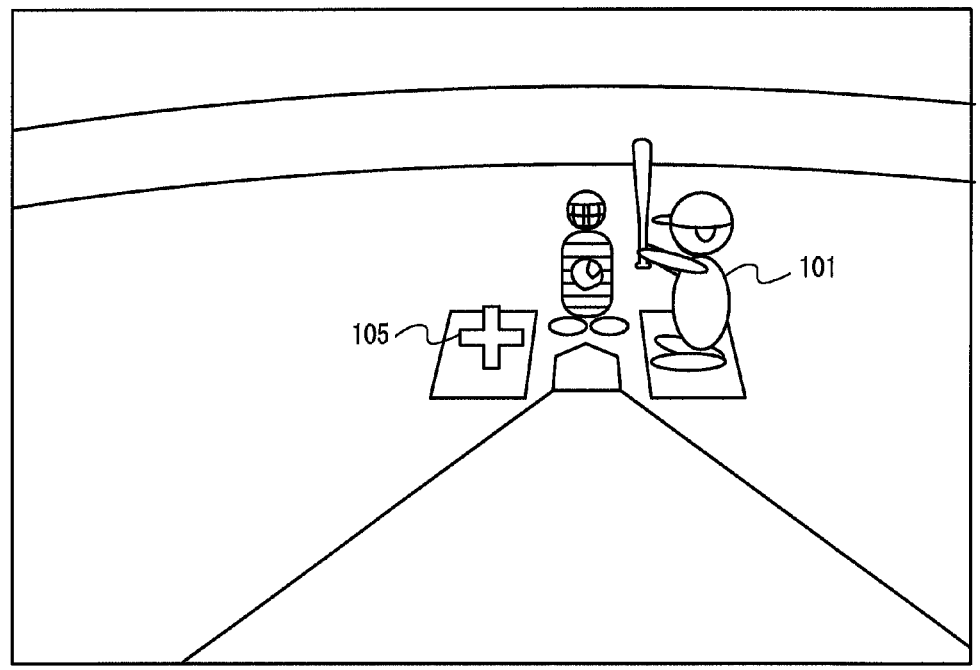
FIG. 11 is a diagram illustrating an exemplary game image (second game image) to be displayed as a pitching scene on the hand-held device.

On the other hand, FIG. 11 is a diagram illustrating an exemplary game image (second game image) to be displayed as a pitching scene on the hand-held device 9. The second game image shown in FIG. 11 is an image essentially for the second player. Specifically, the second game image represents a game space with a batter 101 to be operated by the first player being viewed from the position of the pitcher 102 to be operated by the second player. Note that no pitcher is displayed in the game image of FIG. 11, but in another embodiment, the pitcher 102 may be displayed on the near side with respect to the batter 101. Also, it is assumed here that the second game image is displayed on the lower LCD 62 of the hand-held device 9, but in another embodiment, the upper LCD 62 may display the second game image shown in FIG. 11 or another game image.

Figure 12:
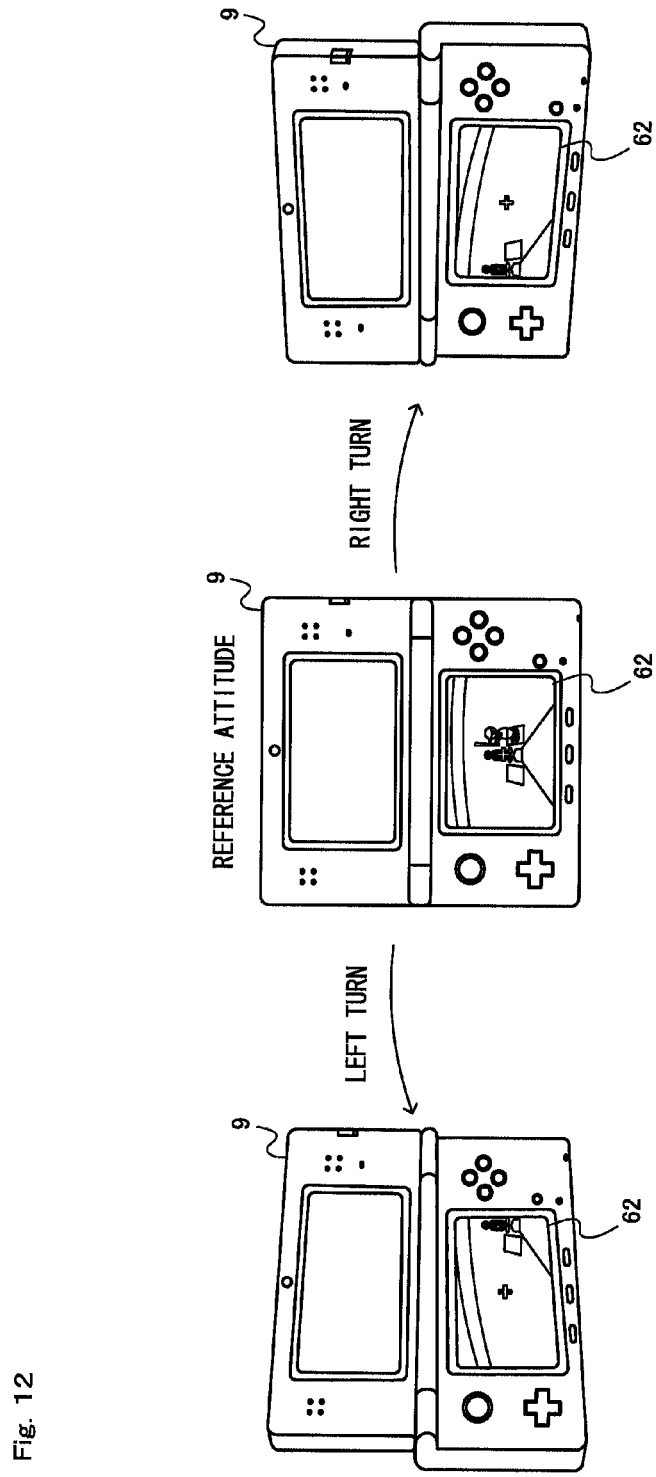
FIG. 12 is a diagram illustrating the relationship between the attitude of the hand-held device and the second game image.

Here, the attitude of a virtual camera (referred to as a "second virtual camera") for generating the second game image is controlled to correspond to the attitude of the hand-held device 9. FIG. 12 is a diagram illustrating the relationship between the attitude of the hand-held device 9 and the second game image. In FIG. 12, with the hand-held device 9 being in a reference attitude, the second virtual camera is in the attitude directed from the pitcher 102 toward the batter 101. Note that in the reference attitude shown in FIG. 12, the screen of the lower LCD 62 is assumed to be parallel to the vertical direction (the direction of gravity). In this case, if the hand-held device 9 in the reference attitude turns counterclockwise (left where the lower LCD 62 is viewed from the front), the second virtual camera in the game space also turns left. As a result, the game image is displayed with the line of sight tilted left compared to the game image to be displayed in the case of the reference attitude, as shown in FIG. 12, i.e., the screen is scrolled to the left. Similarly, if the hand-held device 9 in the reference attitude turns right, the second virtual camera also turns right, so that the game image is displayed with the line of sight tilted right compared to the game image to be displayed in the case of the reference attitude, i.e., the screen is scrolled to the right.

While FIG. 12 illustrates the case where the hand-held device 9 turns left and right, when the hand-held device 9 turns up and down, the attitude of the second virtual camera changes to accord with the attitude of the hand-held device 9 in a similar manner to the left and right turns. Specifically, when the hand-held device 9 in the reference attitude turns up (down), the second virtual camera also turns up (down), so that the game image is displayed with the line of sight tilted up (down) compared to the game image to be displayed in the case of the reference attitude. Furthermore, in the case where the hand-held device 9 turns about an axis perpendicular to the screen of the lower LCD 62, the attitude of the second virtual camera similarly changes to accord with the attitude of the hand-held device 9.

As described above, in the present embodiment, the second player can change the attitude of the second virtual camera (hence the range of the game image to be displayed) by performing an operation to change the attitude of the hand-held device 9. Accordingly, the second player can change the attitude of the second virtual camera by turning while holding the hand-held device 9 in front of him/her. As a result, the second player can change the range of display by moving while viewing the screen of the hand-held device, which provides the player with an unprecedented feeling of game operation. Note that when the attitude of the second virtual camera is changed, the player may turn his/her body while holding the hand-held device 9 in front or may simply turn the hand-held device 9 without turning himself/herself.

Also, in the present embodiment, the pitching direction of the pitcher 102 (the direction in which a ball is thrown) is determined by the attitude of the second virtual camera. Concretely, the lower LCD 62 has a target image 105 displayed at the center of the screen so as to overlap with a game space image, as shown in FIG. 11. When the second player provides a predetermined pitching instruction (e.g., the instruction being provided by pressing the button 64B), the pitcher 102 throws a ball (ball object) 104 to a position indicated by the target image 105. In this manner, the second player can cause the pitcher 102 to throw a ball by specifying the pitching direction with an operation to change the attitude of the hand-held device 9.

As described above, in the pitching scene, the second player provides the pitching instruction after determining the pitching direction by changing the attitude of the hand-held device 9. An instruction to start pitching can be provided by, for example, operating a button or a touch panel. Correspondingly, the first player operates the batter 101 to hit a ball 104 thrown by the pitcher 102 with a bat (bat object) 103. As will be described in detail later, the movement of the bat 103 is controlled based on the attitude of the operating device 7, and the first player causes the batter 101 to swing the bat 103 by performing an operation to swing the operating device 7.

When the pitcher 102 throws the ball 104 and then the bat 103 is swung, the game apparatus 3 determines whether or not the bat 103 and the ball 104 have contacted. When they are determined to have contacted (when the batter 101 has hit the ball 104 with the bat 103), the behavior of the ball 104 hit with the bat 103 is calculated, and the ball 104 moves in accordance with the calculated behavior. In this case, the scene switches to the aforementioned fielding scene (the situation where a fielder attempts to catch the ball hit by the batter). On the other hand, when the bat 103 and the ball 104 have not contacted so that the ball 104 has reached the catcher, a strike or a ball is determined, and the game process for the pitching scene is executed again.

Next, the game process will be described with respect to the fielding scene. When the batter 101 hits the ball 104, the game apparatus 3 calculates the behavior of the ball 104, and causes display devices (the television 2 and the lower LCD 62) to display the ball 104 moving in accordance with the calculated behavior. In the fielding scene, the second player performs a game operation to cause the fielder to catch the ball 104.

Figure 13:
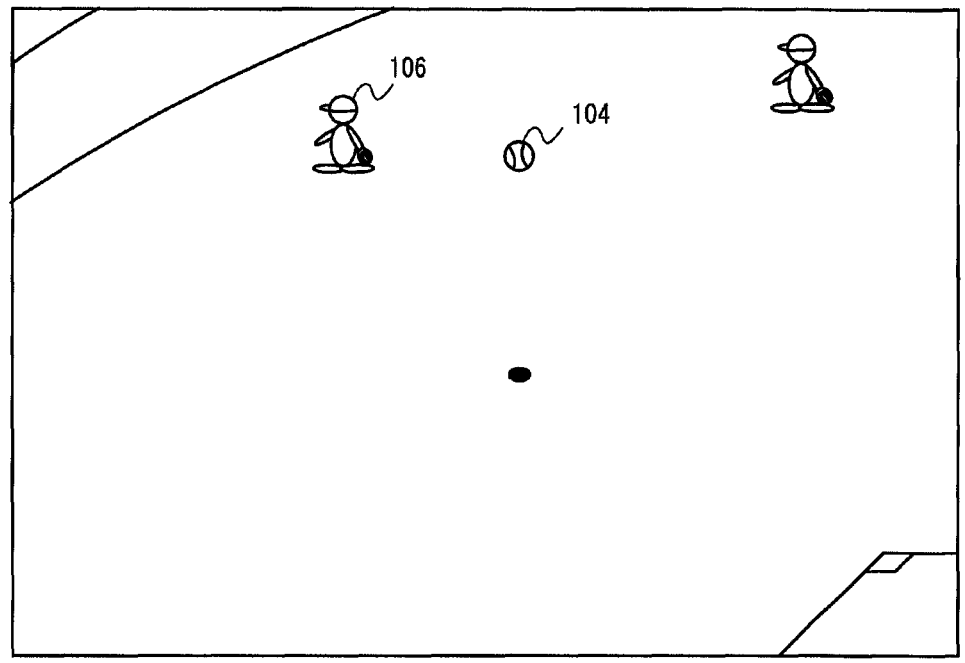
FIG. 13 is a diagram illustrating an exemplary game image to be displayed as the fielding scene on the television.

FIG. 13 is a diagram illustrating an exemplary game image to be displayed as the fielding scene on the television 2. In the fielding scene, an image showing the ball 104 that is moving is displayed on the television 2 as a first game image, as shown in FIG. 13. Specifically, the position and the attitude of the first virtual camera are calculated such that the ball 104 is included in the range of the camera's field of view. In FIG. 13, the first virtual camera is controlled to include the fielder (fielder object) 106 to be operated by the second player, in addition to the ball 104. Note that the first game image is preferably an image including the ball 104 or the shadow of the ball 104 in order to allow the players to readily recognize the destination of the batted ball. Also, in the fielding scene, no game operation may be required to be performed by the first player or some game operation (e.g., an operation related to base running by a runner object) may be required to be performed by the first player.

Figure 14:
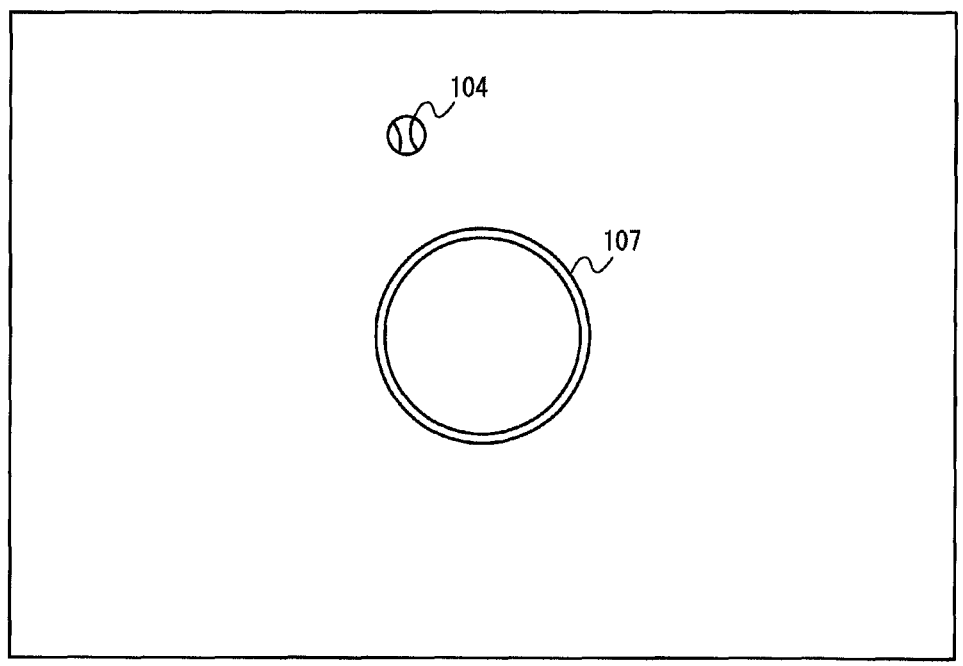
FIG. 14 is a diagram illustrating an exemplary game image to be displayed as the fielding scene on the hand-held device.

FIG. 14 is a diagram illustrating an exemplary game image to be displayed as the fielding scene on the hand-held device 9. In the fielding scene, a game space image as viewed from the position of the fielder 106 that is supposed to catch the ball 104 is displayed as the second game image, as shown in FIG. 14. Note that in the game image shown in FIG. 14, the fielder 106 is not displayed in order to achieve easy viewing of the ball 104, but in another embodiment, the fielder 106 may be displayed or all or part (e.g., the glove) of the fielder 106 may be displayed translucently. Also, in the present embodiment, the fielder 106 that is supposed to catch the ball 104 is automatically determined by the game apparatus 3 from among all the fielders arranged in the game space. Also, the action of the fielder 106 is automatically controlled by the game apparatus 3. Accordingly, the position of the second virtual camera, which is determined based on the position of the fielder 106, is also determined by the game apparatus 3.

In the fielding scene, as in the pitching scene, the attitude of the second virtual camera is determined so as to accord with the attitude of the hand-held device 9. Also, in the fielding scene, the lower LCD 62 displays a frame image 107 at the center of the screen so as to overlap with the game space image. The frame image 107 represents a basis upon which to determine whether or not the fielder 106 succeeds in catching the ball 104. Specifically, whether the fielder 106 succeeds in catching the ball 104 or not is determined based on whether the ball 104 lies within the frame image 107 on the second game image. Accordingly, the second player performs an operation to move the hand-held device 9 to cause the ball 104 that is moving to lie within the frame image 107, thereby causing the fielder 106 to catch the ball 104. Note that successful catching is determined when the ball 104 lies within the frame image 107 at the time the ball 104 reaches the fielder 106. On the other hand, at the aforementioned time, if the ball 104 lies outside the frame image 107 or if the ball 104 passes the fielder 106, unsuccessful catching is determined. In this manner, the second player can specify the catching direction by performing an operation to change the attitude of the hand-held device 9, thereby causing the fielder 106 to perform a catching action.

Note that after the game apparatus 3 makes a catching determination (a determination of whether catching is successful or not), processing is performed in accordance with the determination result. Although any processing may be performed after the catching determination, in the present embodiment, the game apparatus 3 continues the game with a determination "OUT" for successful catching or "HIT" for unsuccessful catching. Note that in another embodiment, after the catching determination, the second player may be able to perform an operation on the fielder 106 (e.g., an operation to move the fielder 106 or throw the ball 104). Also, after the catching determination, the game apparatus 3 may automatically control the action of the fielder 106 (to throw the ball 104 in the case of successful catching or chase the ball 104 in the case of unsuccessful catching).

As described above, in the present embodiment, besides the television 2, a display device is provided to the hand-held device 9, so that two virtual cameras are set for a single game space to display two game images for the game space being viewed from the virtual cameras. As a result, for each of the pitching scene and the fielding scene, it is possible to display game images which can be readily viewed (and which can facilitate easy operation) by each player. Also, when comparing the game processes for generating the two game images, the processing of the game space (e.g., object control in the game space) is almost common to the two game images. Therefore, the two game images can be generated simply by performing a rendering process on the common game space twice, which is advantageously higher in processing efficiency than in the case where such game processes are performed independently of each other.

Also, in the pitching scene, the target image 105 representing the pitching direction is only displayed on the hand-held device 9, and therefore the first player cannot see the position specified by the target image 105. Accordingly, there is no inconvenience in the game such as the first player knowing the pitching direction, which is disadvantageous for the second player. In this manner, in the present embodiment, if the game image being seen by one player causes any inconvenience in the game for the other player, the game image may be displayed on the hand-held device 9. As a result, it is possible to prevent inconveniences such as reduction in strategic fun of the game. Note that in another embodiment, depending on the content of the game (e.g., if any inconvenience as mentioned above is not caused by the second game image being viewed by the first player), the game apparatus 3 may display both the first game image and the second game image on the television 2.

Note that in the present embodiment, the range (display range) of the game space represented by the second game image on the hand-held device 9 changes in accordance with the attitude of the hand-held device 9 (FIG. 12). Here, the television 2 displays the first game image in a different display range from the second game image, and therefore the first player can play the game while viewing the first game image. Accordingly, the second player can freely change the display range of the second game image on the hand-held device 9 without being concerned about impact on the first player.

7. Details of the Game Process

Figure 15:
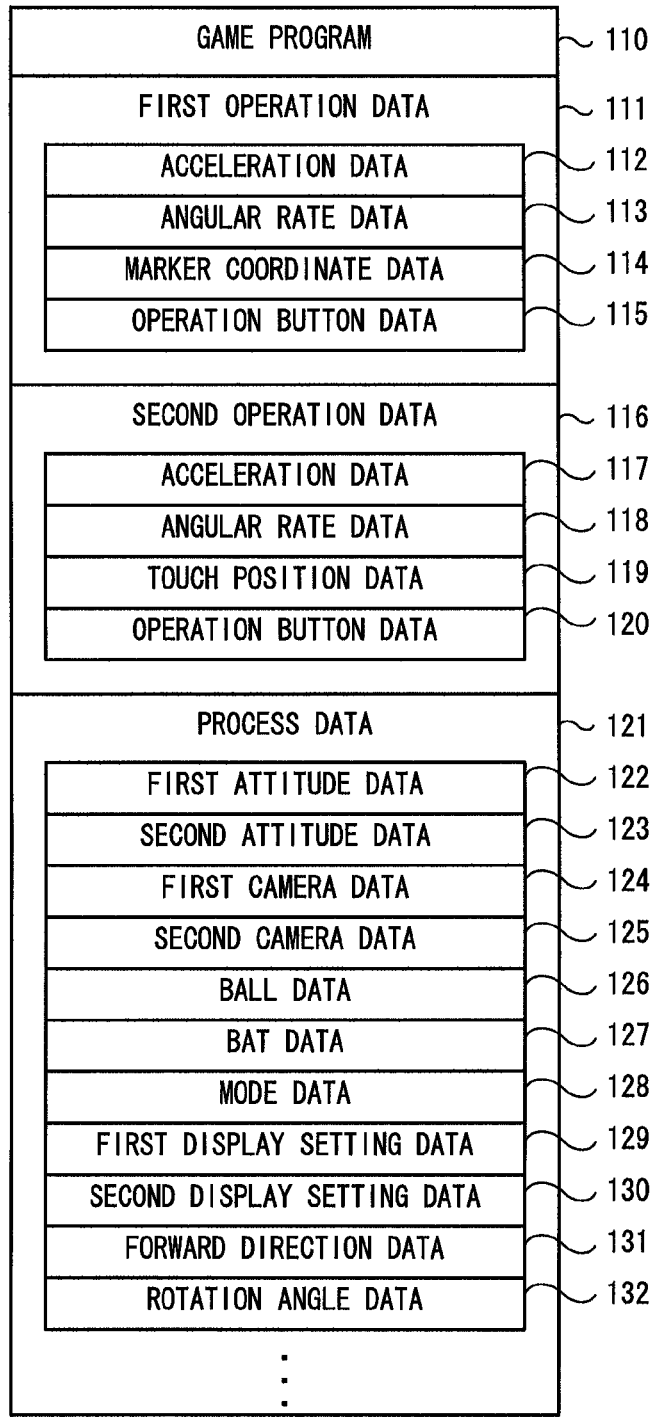
FIG. 15 is a diagram illustrating various types of data for use in a game process.

Next, the game process to be executed in the present game system will be described in detail. First, various types of data for use in the game process will be described. FIG. 15 is a diagram illustrating the data for use in the game process. In FIG. 15, main data stored in the main memory (the external main memory 12 or the internal main memory 11*e*) of the game apparatus 3 is shown. As shown in FIG. 15, the main memory of the game apparatus 3 has stored therein a game program 110, first operation data 111, second operation data 116, and process data 121. Note that in addition to the data shown in FIG. 15, the main memory has stored therein data required for the game such as image data for various objects appearing in the game and sound data to be used in the game.

The game program 110 is partially or entirely read from the optical disc 4 at an appropriate time after the power-on of the game apparatus 3, and then stored to the main memory. Note that the game program 110 may be acquired from a device external to the game apparatus 3 (e.g., via the Internet), rather than from the optical disc 4. Also, a portion of the game program 110 (e.g., a program for calculating the attitude of the operating device 7 and/or the attitude of the hand-held device 9) may be prestored in the game apparatus 3.

The first operation data 111 is data representing the user's operation on the operating device 7. The first operation data 111 is transmitted by the operating device 7 and then acquired by the game apparatus 3. The first operation data 111 includes acceleration data 112, angular rate data 113, marker coordinate data 114, and operation button data 115. Note that the main memory may have stored therein the first operation data up to a predetermined number of pieces counted from the latest piece (the last acquired piece).

The acceleration data 112 is data representing acceleration (acceleration vector) detected by the acceleration sensor 37. Here, the acceleration data 112 represents three-dimensional acceleration whose components are acceleration values associated with the directions of three axes, X-, Y-, and Z-axes, shown in FIG. 3, but in another embodiment, the data may represent acceleration associated with any one or more directions.

The angular rate data 113 is data representing angular rates detected by the gyroscopes 55 and 56 in the gyroscope unit 6. Here, the angular rate data 113 represents angular rates about three axes, X-, Y-, and Z-axes, shown in FIG. 3, but in another embodiment, the data may represent an angular rate about each of any one or more axes.

The marker coordinate data 114 is data representing a coordinate point calculated by the image processing circuit 41 of the imaging information calculation section 35, i.e., the data represents the marker coordinate point. The marker coordinate point is expressed by a two-dimensional coordinate system for representing a position in a plane that corresponds to a pickup image, and the marker coordinate data 114 represents coordinate values in the two-dimensional coordinate system.

The operation button data 115 is data representing an input state of each of the operation buttons 32*a* to 32*i* provided on the operating device 7.

Note that the first operation data 111 may include only part of the data items 112 to 115 so long as the operation by the player using the operating device 7 can be represented. Also, when the operating device 7 includes other input means (e.g., a touch panel, an analog stick, etc.), the first operation data 111 may include data representing operations on those other input means. Note that when the movement of the operating device 7 itself is used as a game operation, as in the present embodiment, the first operation data 111 is required to include data whose value changes in accordance with the movement of the operating device 7 itself, as in the case of the acceleration data 112, the angular rate data 113, and the marker coordinate data 114.

The second operation data 116 is data representing the user's operation on the hand-held device 9. The second operation data 116 is transmitted by the hand-held device 9 and acquired by the game apparatus 3. The second operation data 116 includes acceleration data 117, angular rate data 118, touch position data 119, and operation button data 120. Note that the main memory may store the second operation data up to a predetermined number of pieces counted from the latest piece (the last acquired piece).

The acceleration data 117 is data representing acceleration (acceleration vector) detected by the acceleration sensor 89. Here, the acceleration data 117 represents three-dimensional acceleration whose components are acceleration values associated with the directions of three axes, X-, Y-, and Z-axes, shown in FIG. 8, but in another embodiment, the data may represent acceleration associated with any one or more directions.

The angular rate data 118 is data representing angular rates detected by the gyroscope 90. Here, the angular rate data 118 represents angular rates about three axes, X-, Y-, and Z-axes, shown in FIG. 8, but in another embodiment, the data may represent an angular rate about each of any one or more axes.

The touch position data 119 is data representing a position at which an input has been made to the input surface of the touch panel 63. Here, touch position data 119 represents a coordinate value in a two-dimensional coordinate system, which indicates the position in the input surface.

The operation button data 120 is data representing an input state of each of the operation buttons 64A to 64L provided on the hand-held device 9.

Note that the second operation data 116 may simply may include only one of the data items 117 to 120 so long as the operation by the player using the hand-held device 9 can be represented. Also, when the hand-held device 9 includes other input means (e.g., a touch pad, the image pickup means of the operating device 7, etc.), the second operation data 116 may include data representing operations on those other input means. Note that when the movement of the hand-held device 9 itself is used as a game operation, as in the present embodiment, the second operation data 116 is required to include data whose value changes in accordance with the movement of the hand-held device 9 itself, as in the case of the acceleration data 117 and the angular rate data 118.

Figure 16:
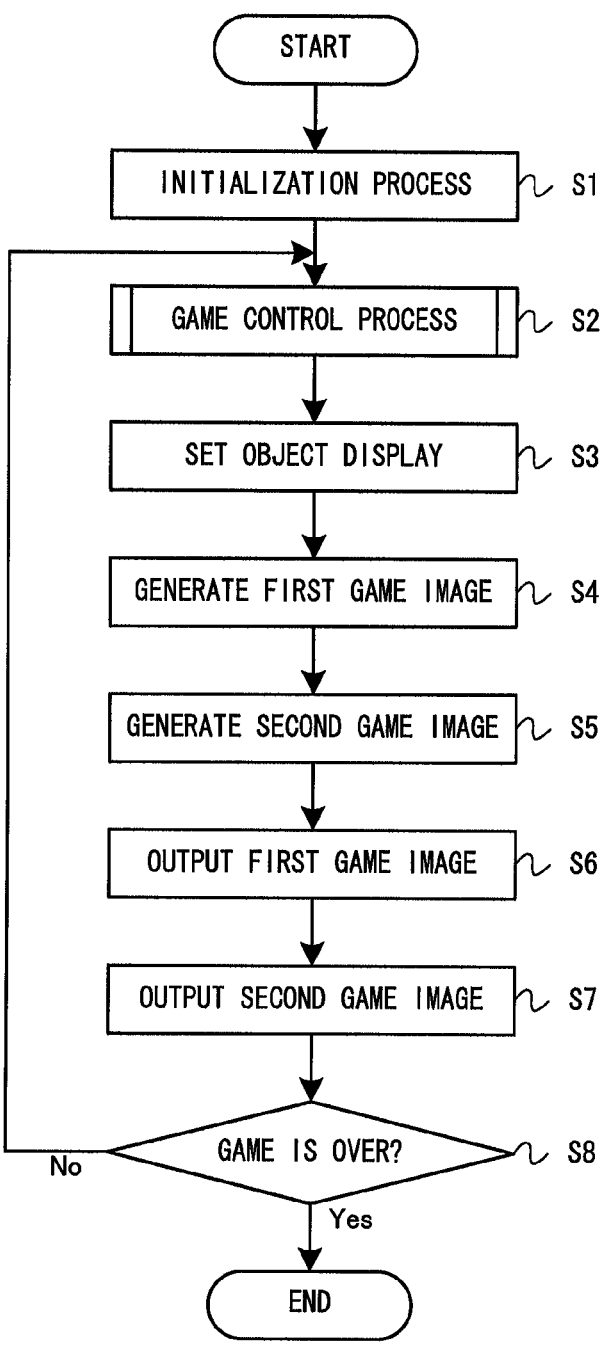
FIG. 16 is a main flowchart showing a flow of a game process to be performed by the game apparatus.

The process data 121 is data to be used in the game process to be described later (FIG. 16). The process data 121 includes first attitude data 122, second attitude data 123, first camera data 124, second camera data 125, ball data 126, bat data 127, mode data 128, first display setting data 129, second display setting data 130, forward direction data 131, and rotation angle data 132. Note that in addition to the data shown in FIG. 15, the process data 121 includes various types of data to be used in the game process, e.g., data representing parameters being set for various objects.

The first attitude data 122 is data representing the attitude of the operating device 7. In the present embodiment, the first attitude data 122 is calculated based on the acceleration data 112 and the angular rate data 113 included in the first operation data 111. The method for calculating the first attitude data 122 will be described later.

The second attitude data 123 is data representing the attitude of the hand-held device 9. In the present embodiment, the second attitude data 123 is calculated based on the acceleration data 117 and the angular rate data 118 included in the second operation data 116. The method for calculating the second attitude data 123 will be described later.

The first camera data 124 is data representing an arrangement of a first virtual camera for generating a first game image to be displayed on the television 2. Concretely, the first camera data 124 represents the position and the attitude of the first virtual camera in a virtual game space. As will be described in detail later, the first camera data 124 is calculated based on, for example, the position of the batter object 101 or the ball object 104, such that a game image for the first player (a game image allowing the first player to readily perform a game operation) is generated. Note that the first camera data 124 may include, for example, data representing the angle of view (the range of the field of view) of the first virtual camera.

The second camera data 125 is data representing an arrangement of a second virtual camera for generating a second game image to be displayed on the lower LCD 62 of the hand-held device 9. Concretely, the second camera data 125 represents the position and the attitude of the second virtual camera in a virtual game space. As will be described in detail later, the second camera data 125 is calculated based on, for example, the position of the pitcher object 102 or the fielder object 106, such that a game image for the second player (a game image allowing the second player to readily perform a game operation) is generated. Note that the second camera data 125 may include, for example, data representing the angle of view (the range of the field of view) of the second virtual camera.

The ball data 126 is data representing the position of the ball object 104 in the virtual game space. The ball data 126 is calculated such that the ball object 104 moves in accordance with a behavior of the ball object 104 that is determined by the second player performing a pitching operation or the first player performing a batting operation.

The bat data 127 is data representing the position and the attitude of the bat object 103 in the virtual game space. The bat data 127 is calculated based on the batting operation by the first player. Concretely, the bat data 127 is calculated based on the first attitude data 122 such that the attitude of the bat object 103 accords with the attitude of the operating device 7.

The mode data 128 is data representing the process mode of the game control process (step S2). The "process mode" indicates the content of processing in the game control process, and different process modes correspond to different contents of processing to be executed in the game control process. In the present embodiment, there are two process modes "pitching" and "fielding". The pitching mode is a mode to be set in the pitching scene, and the fielding mode is a mode to be set in the fielding scene. The mode data 128 represents one of the two modes.

The first display setting data 129 is data representing the settings for generating and displaying a first game image to be displayed on the television 2. Concretely, when there is any object not to be rendered when generating (rendering) the first game image, the first display setting data 129 represents the object. For example, when the batter object 101 is not rendered for generating the first game image, the first display setting data 129 represents the batter object 101.

The second display setting data 130 is data representing the settings for generating and displaying a second game image to be displayed on the lower LCD 62 of the hand-held device 9. Concretely, when there is any object no to be rendered when generating (rendering) the second game image, the second display setting data 130 represents the object.

Note that in the present embodiment, the game apparatus 3 prepares two types of display setting data 129 and 130 for two game images, but in another embodiment, only one type of display setting data may be prepared for one of the game images. For example, when there is no object that is not to be rendered for the first game image, the game apparatus 3 may store only the second display setting data 130 in the main memory, and may not store the first display setting data 129 in the main memory. Also, in another embodiment, when the two game images have a common object not rendered, only one type of display setting data may be prepared.

The forward direction data 131 is data representing a (forward) direction to be taken as a reference (forward) when calculating the attitude of the second virtual camera in the fielding scene based on the attitude of the hand-held device 9. As will be described in detail later, the forward direction data 131 is calculated so as to indicate the direction from the fielder 106 that is to catch the ball 104 in the fielding scene toward home plate within the game space.

The rotation angle data 132 is data representing an angle at which to rotate the second virtual camera in the fielding scene when the attitude of the second virtual camera is calculated based on the attitude of the hand-held device 9. As will be described in detail later, in the fielding mode, the attitude of the second virtual camera that has been calculated based on the attitude of the hand-held device 9 is subjected to a correction to rotate the attitude. The rotation angle data 132 represents the angle at which to rotate the attitude by the correction.

Next, the process to be performed by the game apparatus 3 will be described in detail with reference to FIGS. 16 to 21. FIG. 16 is a main flowchart showing a flow of the process to be performed by the game apparatus 3. When the game apparatus 3 is powered on, the CPU 10 of the game apparatus 3 executes a boot program stored in an unillustrated boot ROM, thereby initializing each unit, including the main memory. The game program stored in the optical disc 4 is loaded to the main memory, and the CPU 10 starts executing the game program. Note that the game apparatus 3 may be configured such that the game program stored in the optical disc 4 is executed immediately after the power-on or such that an internal program for displaying a predetermined menu screen is initially executed after the power-on and then the game program stored in the optical disc 4 is executed when the user provides an instruction to start the game. The flowchart of FIG. 16 illustrates a process to be performed when the processes described above are completed.

Note that processing in each step of the flowcharts shown in FIGS. 16, 17, 19, and 20 is merely illustrative, and if similar results can be achieved, the processing order of the steps may be changed. In addition, values of variables and thresholds to be used in determination steps are also merely illustrative, and other values may be used as necessary. Furthermore, while the present embodiment is described on the premise that the CPU 10 performs processing in each step of the flowcharts, part of the steps in the flowcharts may be performed by a processor other than the CPU 10 or by specialized circuits.

First, in step S1, the CPU 10 performs an initialization process. The initialization process is, for example, a process of constructing a virtual space, placing objects appearing in the virtual space at their initial positions, and setting initial values of various parameters to be used in the game process. Note that in the initialization process of the present embodiment, data representing the pitching mode is stored to the main memory as mode data 128. Following step S1, the process of step S2 is performed. Thereafter, a process loop including a series of processing in steps S2 to S8 is repeatedly performed once per a predetermined period of time (e.g., one frame period).

In step S2, the CPU 10 performs a game control process. The game control process is a process for causing the game to progress by performing the processing or suchlike to cause objects to move in accordance with game operations by the players. In the baseball game of the present embodiment, the content of processing by the game control process varies from one process mode to another. Specifically, at the start of the game control process, the CPU 10 reads the mode data 128 from the main memory, and identifies the current process mode. Then, the game control process is performed in accordance with the content of the current process mode. Hereinafter, the processing in the process loop of steps S2 to S8 will be described in detail for each process mode of the game control process.

(Processing in the Pitching Mode)

Figure 17:
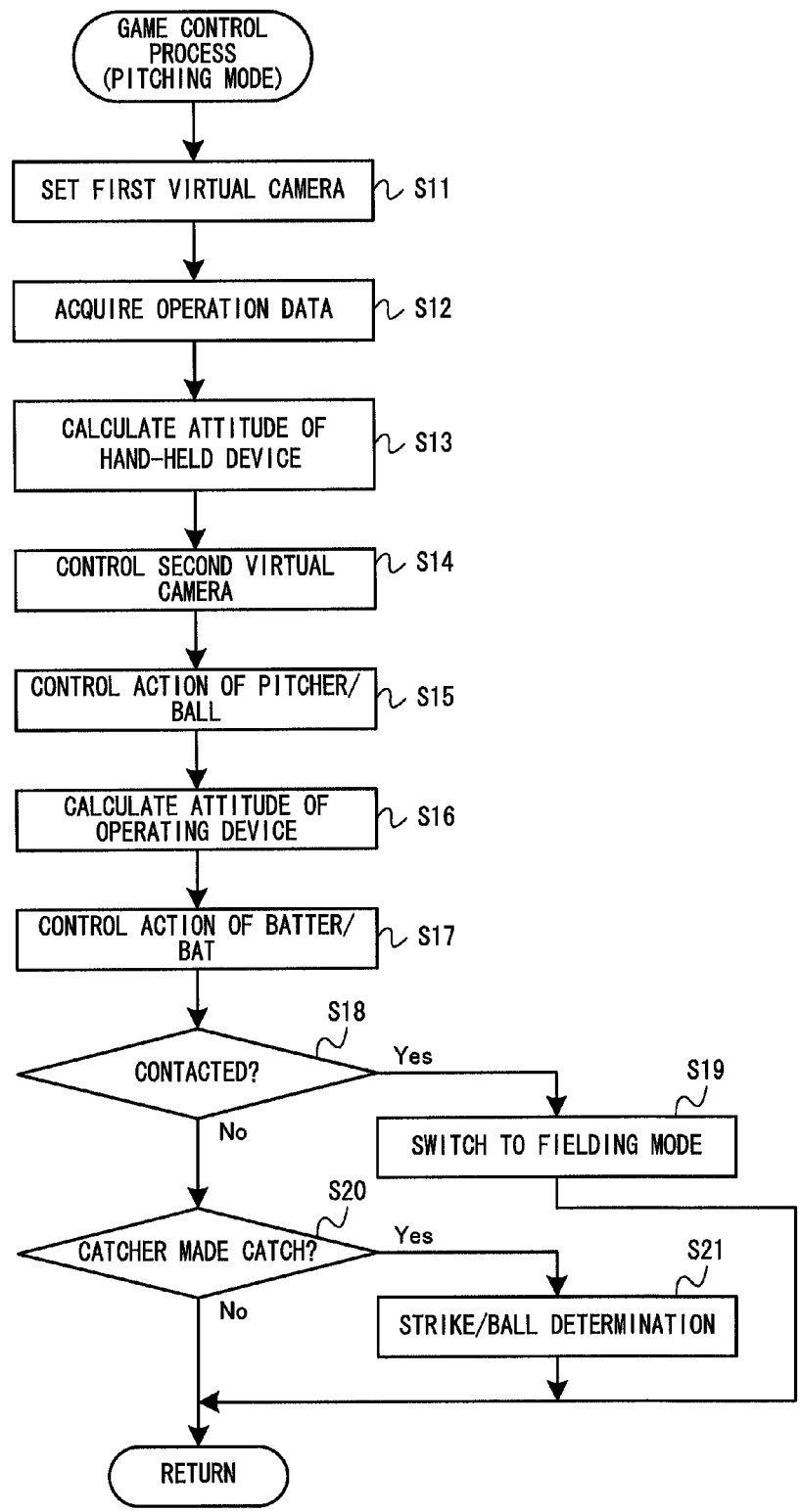
FIG. 17 is a flowchart illustrating a detailed flow of a game control process for the pitching mode.

FIG. 17 is a flowchart illustrating a detailed flow of the game control process for the pitching mode. In the pitching mode, initially, in step S11, the CPU 10 sets the position and the attitude of the first virtual camera. Note that in step S11, the first virtual camera is placed in the position and the attitude which are both predetermined. Specifically, the CPU 10 stores data representing the predetermined position and attitude to the main memory as first camera data 124. The specific position and attitude of the first virtual camera may be arbitrarily set, but in the present embodiment, the first virtual camera is set in a position slightly behind the batter 101, with the line of sight being set in a direction viewed from the batter 101 side toward the pitcher 102 side. As a result, a first game image including a ball 104 thrown by the pitcher 102 is generated, and therefore the first player can perform an operation to hit the ball 104 in a readily perceivable image. Also, in the present embodiment, the position and the attitude of the first virtual camera are fixed for the pitching mode. However, in another embodiment, the CPU 10 may change the position and/or the attitude of the first virtual camera in accordance with the first player's operation. For example, when the position of the batter is changed by the first player's operation, the position of the first virtual camera may be changed in accordance with the position of the batter. Following step S11, the process of step S12 is performed.

In step S12, the CPU 10 acquires operation data from both the operating device 7 and the hand-held device 9. The operating device 7 repeats transmitting data originally outputted from the acceleration sensor 37, the gyroscope unit 6, the imaging information calculation section 35 and the operating section 32, to the game apparatus 3 as first operation data, and therefore the game apparatus 3 sequentially receives the data from the operating device 7 and stores the received data to the main memory as first operation data 111. In step S12, the CPU 10 reads the latest first operation data 111 from the main memory. Also, the hand-held device 9 repeats transmitting data originally outputted from the acceleration sensor 89, the gyroscope 90, the touch panel 63, and the operation button group 64, to the game apparatus 3 as second operation data, and therefore the game apparatus 3 sequentially receives the data from the hand-held device 9, and stores the received data to the main memory as second operation data 116. In step S12, the CPU 10 reads the latest second operation data 116 from the main memory. Following step S12, the process of step S13 is performed.

In step S13, the CPU 10 calculates the attitude of the hand-held device 9. While the attitude of the hand-held device 9 may be calculated by any method so long as it is calculated based on the second operation data 116, in the present embodiment, the attitude is calculated by the following method. Hereinafter, the method for calculating the attitude of the hand-held device 9 will be described.

First, the CPU 10 calculates the attitude of the hand-held device 9 based on the angular rate data 118 stored in the main memory. While any method can be employed for calculating the attitude of the hand-held device 9 based on an angular rate, the attitude is calculated using the last attitude (the last calculated attitude) and the current angular rate (the angular rate acquired by the current process loop). Concretely, the CPU 10 calculates the attitude by rotating the last attitude at the current angular rate for a unit time. Note that the last attitude is indicated by the second attitude data 123 stored in the main memory, and the current angular rate is indicated by the angular rate data 118 stored in the main memory. Accordingly, the CPU 10 read the second attitude data 123 and the angular rate data 118 from the main memory, and calculates the attitude of the hand-held device 9. Data representing the "angular rate-based attitude" thus calculated is stored to the main memory.

Note that in the case where the attitude is calculated based on the angular rate, it is desirable to set an initial attitude. Specifically, in the case where the attitude of the hand-held device 9 is calculated based on the angular rate, the CPU 10 initially calculates an initial attitude of the hand-held device 9. The initial attitude of the hand-held device 9 may be calculated based on acceleration data. Alternatively, with the hand-held device 9 being set in a specific attitude, the player may perform a predetermined operation, so that the specific attitude at the time of the predetermined operation is used as the initial attitude.

Next, the CPU 10 corrects the attitude of the hand-held device 9 calculated based on the angular rate, based on the acceleration data 117. Concretely, the CPU 10 reads the acceleration data 117 from the main memory, and calculates the attitude of the hand-held device 9 based on the acceleration data 117. Here, when the hand-held device 9 is in almost static state, acceleration applied to the hand-held device 9 and detected by the acceleration sensor 89 represents gravitational acceleration. Accordingly, the direction of the detected gravitational acceleration (the direction of gravity) can be calculated using acceleration data 117 outputted by the acceleration sensor 89, and therefore the direction (attitude) of the hand-held device 9 with respect to the direction of gravity can be calculated based on the acceleration data 117. In this manner, in the situation where the acceleration sensor 89 detects the gravitational acceleration, the direction (attitude) of the hand-held device 9 with respect to the direction of gravity can be calculated based on the acceleration data 117. Data representing the "acceleration-based attitude" thus calculated is stored to the main memory.

Once the acceleration-based attitude is calculated, the CPU 10 then corrects the angular rate-based attitude using the acceleration-based attitude. Concretely, the CPU 10 reads the data representing the angular rate-based attitude and the data representing the acceleration-based attitude from the main memory, and performs a correction to cause the attitude based on the angular rate data to approach the attitude based on the acceleration data at a predetermined rate. The predetermined rate may be a predetermined constant or may be set in accordance with, for example, the acceleration indicated by the acceleration data 117. In addition, the acceleration-based attitude cannot be calculated for a rotational direction about the direction of gravity, and therefore the CPU 10 may be configured not to perform a correction related to the rotational direction. In the present embodiment, data representing the post-correction attitude thus obtained is stored to the main memory as second attitude data 123. Following step S13, the process of step S14 is performed.

By the aforementioned process of in step S13, the attitude of the hand-held device 9 is calculated. Here, among other methods for calculating the attitude of the hand-held device 9, the method using an angular rate makes it possible to calculate the attitude however the hand-held device 9 is moving. On the other hand, the method using an angular rate calculates the attitude by cumulatively adding angular rates that are sequentially detected, and therefore there is a possibility of poor accuracy due to, for example, error accumulation or poor accuracy of the gyroscope due to a so-called temperature drift problem. Also, the method using acceleration does not cause error accumulation, but when the hand-held device 9 is being moved vigorously, attitude cannot be calculated with accuracy (because the direction of gravity cannot be detected with precision). In the present embodiment, the aforementioned two characteristically different methods are used, and therefore the attitude of the hand-held device 9 can be calculated with higher precision. While in the present embodiment, the game apparatus 3 calculates the attitude of the hand-held device 9 using the above two methods, in another embodiment, the attitude may be calculated using one of the two methods.

In step S14, the CPU 10 controls the second virtual camera based on the attitude of the hand-held device 9. Specifically, in step S14, the position and the attitude of the second virtual camera are calculated. Here, the position of the second virtual camera in the pitching mode is fixed to a previously determined position. The previously determined position is, for example, the position of the pitcher 102 or a position slightly behind the pitcher 102 (in a direction away from home plate). Thus, the second game image is generated with the line of sight being set as viewed from the pitcher 102 side toward the batter 101 side, as shown in FIG. 10.

Also, the attitude of the second virtual camera is set so as to accord with the attitude of the hand-held device 9. Hereinafter, referring to FIG. 18, a method for setting the attitude of the second virtual camera based on the attitude of the hand-held device 9 will be described.

FIG. 18 is a diagram illustrating the relationship between the attitude of the hand-held device 9 and the attitude of the second virtual camera. In FIG. 18, three vectors VA, VB, and VC represent attitudes of the hand-held device 9. Specifically, vectors VA, VB, and VC are vectors respectively pointing to the right (the x-axis positive direction shown in FIG. 8), the top (the y-axis positive direction shown in FIG. 8), and the front (the z-axis positive direction shown in FIG. 8) of the hand-held device 9. Also, three vectors Va, Vb, and Vc represent attitudes of the second virtual camera 140, and respectively point to the right, the top and the front of the second virtual camera 140.

The top column of FIG. 18 indicates a case where the hand-held device 9 is in a predetermined reference attitude. Any attitude can be set as the reference attitude of the hand-held device 9, for example, so long as vector VB points in a vertically upward direction (a direction opposite to the direction of gravity), vector VC horizontally points to the television 2, and vector VA points in the horizontal direction. When the hand-held device 9 is in the reference attitude, the second virtual camera 140 is also in the reference attitude. Any attitude can be used as the reference attitude of the second virtual camera 140, so long as in the present embodiment, vector Vb points in a vertically upward direction in a virtual space, vector Vc points in a direction from the position of the pitcher toward home plate, and vector Va points in the horizontal direction. As a result, when the hand-held device 9 is in the reference attitude, the second game image can be generated as viewed straight from the position of the pitcher toward the catcher. In this manner, the attitude of the second virtual camera 140 is set to the predetermined reference attitude when the hand-held device 9 is in the reference attitude.

Also, the attitude of the second virtual camera 140 is set to an attitude in which the second virtual camera 140 in the reference attitude is rotated in a direction and an amount corresponding to the rotation of the hand-held device 9 from the reference attitude. For example, the attitude is calculated such that, when the hand-held device 9 in the reference attitude is rotated to the right as shown in the middle column of FIG. 18, the second virtual camera turns right from the reference attitude. In addition, the attitude is calculated such that, when the hand-held device 9 in the reference attitude is rotated to the left as shown in the bottom column of FIG. 18, the second virtual camera turns left from the reference attitude. Note that in the foregoing, turning "right" and "left" refers to rotational directions as viewed in a vertically downward direction in the real or virtual space.

As shown in FIG. 18, in the present embodiment, the attitude of the second virtual camera 140 is calculated such that the attitude of the second virtual camera 140 in the virtual space matches the attitude of the hand-held device 9 in the real space. However, in another embodiment, it is not necessary for the attitude of the second virtual camera 140 to match the attitude of the hand-held device 9, and the attitude of the second virtual camera 140 may be calculated so as to change in accordance with the attitude of the hand-held device 9. Specifically, it is not necessary for the amount of rotation of the second virtual camera 140 to match the amount of rotation of the hand-held device 9, and the second virtual camera 140 may be sufficiently controlled by simply moving the hand-held device 9 to a slight degree. In addition, by setting the amount of rotation of the second virtual camera 140 to be less than the amount of rotation of the hand-held device 9, it may become possible for the player to finely adjust the direction of the second virtual camera 140.

In the specific process of step S14, the CPU 10 reads second attitude data 123 from the main memory, and calculates the attitude of the second virtual camera based on the second attitude data 123. Also, the position of the second virtual camera is set to the aforementioned predetermined position. Then, data representing the calculated attitude and the set position is stored to the main memory as second camera data 125. Following step S14, the process of step S15 is performed.

In step S14, the CPU 10 fixes the position of the second virtual camera, the attitude of the second virtual camera is caused to change in accordance with the attitude of the hand-held device 9. Here, in another embodiment, the position of the second virtual camera, rather than (or along with) the attitude, may be caused to change in accordance with the attitude of the hand-held device 9. For example, in the case where the second virtual camera is caused to turn left, the CPU 10 may move the second virtual camera left while turning the second virtual camera left.

In step S15, the CPU 10 controls the action of the pitcher 102 and the ball 104. Here, the pitcher 102 performs actions of changing its direction in accordance with the attitude of the second virtual camera, and then performs pitching actions in response to a predetermined pitching instruction. Specifically, the CPU 10 reads second camera data 125 from the main memory, and changes the direction of the pitcher 102 in accordance with the attitude of the second virtual camera (more specifically, the direction about a vertical axis). Also, operation button data 120 is read from the main memory to determine whether a pitching instruction (e.g., an instruction provided by pressing any button in the button group 64B) is provided or not. If the pitching instruction is provided, then the pitcher 102 is caused to perform pitching actions. Note that the CPU 10 causes the pitcher 102 to perform a series of pitching actions over a plurality of frames (i.e., the process of step S15 is repeated multiple times).

Also, the ball 104 is controlled to move in a predetermined pitching direction from the position of the pitcher 102 at a given speed in response to the pitching instruction. Here, the "predetermined pitching direction" is determined by the position and the attitude of the second virtual camera. Concretely, the predetermined pitching direction is a position pointed at by the line of sight direction of the second virtual camera, i.e., a position pointed at by a target image 105 (determined by the attitude of the second virtual camera). Note that the target image 105 may be positioned to accord with the line of sight direction of the second virtual camera or may be disposed in a position that deviates from the line of sight direction by a predetermined amount. Also, in an example where the target image 105 is not used, a pitching instruction may be provided via the touch panel 63, so that the pitching direction is determined based on the touched position on the touch panel 63. The given speed at which the ball 104 moves may be determined arbitrarily or previously or may be determined in accordance with a parameter being set for the pitcher 102. In this manner, when the pitching instruction is provided, in step S25, the CPU 10 reads the second camera data 125 from the main memory, and calculates the pitching direction based on the position and the attitude of the second virtual camera. Also, after the pitching instruction is provided, the CPU 10 reads ball data 126 from the main memory, and calculates a new position of the ball 104 by moving the current position of the ball 104 in the pitching direction by a predetermined distance. Data representing the new position is stored to the main memory as new ball data 126. The process of updating the ball data 126 as above (the process loop of steps S2 to S8) is repeatedly performed, thereby sequentially updating the position of the ball 104, so that the ball 104 is displayed as moving. Note that before the pitching instruction is provided, any process related to control over the ball 104 is performed. Following step S15 above, the process of step S16 is performed.

As described above in conjunction with step S15, in the present embodiment, the attitude of the hand-held device 9 is caused to accord with the attitude of the second virtual camera, thereby moving the ball 104 in the line of sight direction of the second virtual camera. Here, in another embodiment, the moving direction of the ball 104 may be determined by any method, so long as the determination is based on the second operation data 116. For example, the ball 104 may be controlled to move to a position within the game space that corresponds to a touched position (a position represented by the touch position data 119). Alternatively, the moving direction of the ball 104 may be determined with the cross button 64A or the analog stick 65. Also, the CPU 10 may allow the second player's operation to change the direction of the ball 104 that is moving. For example, the ball 104 may curve in a direction corresponding to the moving direction of the hand-held device 9. Alternatively, the direction in which to curve the ball 104 may be determined with the cross button 64A or the analog stick 65.

As described above in conjunction with steps S12 to S15, in the pitching mode, the process for changing the attitude of the second virtual camera in accordance with the attitude of the hand-held device 9 is performed. Also, in the present embodiment, the attitude of the second virtual camera accords with the pitching direction of the pitcher 102, and therefore the pitching direction changes in accordance with the attitude of the hand-held device 9. That is, the second player can change the pitching direction of the pitcher 102 by adjusting the attitude of the hand-held device 9.

In step S16, the CPU 10 calculates the attitude of the operating device 7. The attitude of the operating device 7 may be calculated by any method so long as it is calculated based on first operation data 111. In the present embodiment, the calculation may be performed by the same method as the attitude of the hand-held device 9. Specifically, the CPU 10 initially reads first attitude data 122 and angular rate data 113 from the main memory, and calculates the attitude of the operating device 7 by rotating the last attitude at the current angular rate for a unit time. Next, the CPU 10 read acceleration data 112 from the main memory, and calculates the attitude of the operating device 7 based on the acceleration data 112. Furthermore, the CPU 10 performs a correction to cause the attitude based on the angular rate data 113 to approach the attitude based on the acceleration data 112 at a predetermined rate, thereby calculating the final attitude of the operating device 7. Data representing the post-correction attitude thus calculated is stored to the main memory as first attitude data 122. Following step S16, the process of step S17 is performed.

While in the present embodiment, the CPU 10 calculates the attitude of the operating device 7 based on the acceleration and the angular rate of the operating device 7, in another embodiment, the attitude may be calculated based on either the acceleration or the angular rate. Also, in another embodiment, the attitude may be calculated based on marker coordinate data 114 in addition to (or in place of) the acceleration and the angular rate. Alternatively, the attitude calculated based on the acceleration and/or the angular rate may be corrected using the marker coordinate data 114.

Hereinafter, attitude calculation and correction methods based on the marker coordinate data 114 will be described. The marker coordinate data 114 indicates the positions of markers 8R and 8L in a pickup image, and therefore based on these positions, the attitude of the operating device 7 can be calculated for a roll direction (a rotational direction about the Z-axis). Specifically, the attitude of the operating device 7 can be calculated for the roll direction based on the slope of a straight line extending between the positions of the markers 8R and 8L in the pickup image. Also, in the case where the position of the operating device 7 with respect to the marker device 8 can be identified (e.g., in the case where the operating device 7 can be assumed to be positioned in front of the marker device 8), the attitude of the operating device 7 can be calculated for pitch and yaw directions based on the position of the marker device 8 in the pickup image. For example, when the positions of the markers 8R and 8L move left in the pickup image, it is possible to determine that the operating device 7 changes its direction (attitude) to right. In this manner, based on a midpoint between the positions of the markers 8R and 8L, the attitude of the operating device 7 can be calculated for the pitch and yaw directions. In this manner, the attitude of the operating device 7 can be calculated based on the marker coordinate data 114.

Furthermore, in the case where the marker coordinate data 114 is used to correct the acceleration-based attitude and/or the angular rate-based attitude, the CPU 10 performs a correction to cause the acceleration-based attitude and/or the angular rate-based attitude to approach the attitude based on the marker coordinate data 114 at a predetermined rate. The predetermined rate may be a predetermined constant. Also, the correction may be performed simply for one or two directions from among the roll direction, the pitch direction, and the yaw direction. For example, in the case where the marker coordinate data 114 is used, the attitude can be calculated with accuracy for the roll direction, and therefore the CPU 10 may correct only the roll direction using the attitude based on the marker coordinate data 114. Moreover, when the image pickup element 40 of the operating device 7 does not pick up an image of the marker device 8, the attitude based on the marker coordinate data 114 cannot be calculated, and therefore, in this case, the correction process using the marker coordinate data 114 does not have to be performed.

In step S17, the CPU 10 controls the action of the batter 101 and the bat 103 based on the attitude of the operating device 7. In the present embodiment, the attitude of the bat 103 is calculated based on the attitude of the operating device 7. Concretely, as in the process of step S14, the attitude of the bat 103 is calculated so as to accord with the attitude of the operating device 7. Therefore, the first player performs an operation of swinging the operating device 7, thereby swinging the bat 103. Note that the position of the bat 103 is calculated as necessary such that the action of the batter 101 swinging the bat 103 appears to be natural. Also, as for the action of the batter 101, the CPU 10 causes the batter 101 to perform an action of swinging the bat 103 in accordance with the movement of the bat 103, such that the action of the batter 101 swinging the bat 103 appears to be natural.

In the concrete process of step S17, the CPU 10 reads first attitude data 122 from the main memory, calculates the attitude of the bat 103 so as to accord with the attitude of the operating device 7, and then further calculates the position of the bat 103 in accordance with the attitude of the bat 103. Data representing the calculated position and attitude of the bat 103 is stored to the main memory as bat data 127. Following step S17, the process of step S18 is performed.

Note that control over the bat 103 may be performed by any method so long as the first operation data 111 is used. For example, the CPU 10 does not have to cause the attitude of the bat 103 to match the attitude of the operating device 7 with precision, but is required to correct the position and the attitude of the bat 103 or correct the timing of swinging the bat 103, such that the ball 104 can be readily hit with the bat 103. Also, the CPU 10 may detect first operation data 111 and hence an operation of swinging the operating device 7, and may cause the bat 103 to be swung in response to such an operation. The operation of swinging the operating device 7 can be detected based on, for example, the attitude of the operating device 7 changing in a predetermined direction (or an arbitrary direction) by a predetermined angle or more, or acceleration of a predetermined value or more being applied to the operating device 7 in a predetermined direction (e.g., the Z-axis direction shown in FIG. 3). Note that in this case, the position and the attitude of the bat 103 may be appropriately calculated in accordance with the trajectory of the ball 104 (such that the ball 104 is hit with the bat 103 if the swinging operation is performed with good timing).

In step S18, the CPU 10 determines whether or not the ball 104 has hit the bat 103. Concretely, ball data 126 and bat data 127 are read from the main memory, and whether the bat 103 and the ball 104 have contacted or not is determined based on the position and the attitude of the bat 103 and the position of the ball 104. When the determination result of step S18 is affirmative, the process of step S19 is performed. On the other hand, when the determination result of step S18 is negative, the process of step S20 is performed.

In step S19, the CPU 10 changes the process mode to the fielding mode. Concretely, the CPU 10 changes (updates) mode data 128 stored in the main memory to data representing the fielding mode. As a result, in a game control process to be performed in the next process loop, processing for the fielding mode is performed. After step S19, the CPU 10 ends the game control process.

On the other hand, in step S20, the CPU 10 determines whether or not the catcher has caught the ball 104. Specifically, the CPU 10 reads ball data 126 from the main memory, and determines whether or not the ball 104 has reached the position of the catcher. When the determination result of step S20 is affirmative, the process of step S21 is performed. On the other hand, when the determination result of step S20 is negative, the CPU 10 ends the game control process.

As described above, in the game control process for the pitching scene, the ball 104 moves in a moving direction that is determined so as to change in accordance with the movement of the hand-held device 9 (step S15). The first virtual camera is set such that a first game image including the ball 104 is generated (step S11). The bat 103 is moved in accordance with the movement of the operating device 7 (step S17). Then, a determination is made regarding contact between the ball 104 and the bat 103 (step S18), and processing is performed in accordance with the determination result (steps S19 or S21). Consequently, a game image in accordance with the determination result is generated in steps S4 to S7 to be described later. Thus, the game control process makes it possible to realize the baseball game in which the second player moves the hand-held device 9 to adjust the moving direction of the ball 104, and the first player moves the operating device 7 to operate the bat 103 so as to hit the ball 104.

In step S21, the CPU 10 determines whether a pitch is a strike or a ball. Specifically, the CPU 10 memorizes the trajectory of the ball 104 (the positional history of the ball 104), and determines whether the pitch is a strike or a ball based on the trajectory. Data representing the determination result is stored to the main memory, and is referenced in the game image generation process to be performed later (steps S4 and S5). After step S21, the CPU 10 ends the game control process.

Returning to the description of FIG. 16, in step S3, the CPU 10 performs an object display setting process. The display setting process is a process in which any object that is not to be displayed (that is to be processed so as to be transparent) in game images to be generated is set for each game image. Concretely, the CPU 10 reads mode data 128 from the main memory, and identifies the current process mode. Then, any object that is not to be displayed is specified for each of the first and second game images in accordance with the current process mode. In the present embodiment, the CPU 10 specifies an object that is not to be displayed for each process mode in accordance with the following correspondence.

(1) pitching mode
first display setting data: catcher object
second display setting data: pitcher object
(2) fielding mode
first display setting data: none
second display setting data: fielder object in an attempt to catch the ball The CPU 10 stores data representing the objects as specified above to the main memory as display setting data 129 and 130. Specifically, in the pitching mode, data representing the catcher object is stored to the main memory as the first display setting data, and data representing the pitcher object is stored to the main memory as the second display setting data. Also, in the fielding mode, data representing there being no object to be displayed is stored to the main memory as the first display setting data, and data representing the fielder object is stored to the main memory as the second display setting data. Following step S3, the process of step S4 is performed.

While in the present embodiment, the content of the display setting data vary for each process mode of the game control process, the display setting data does not have to vary at the change of the process mode and may vary at another time. For example, in another embodiment, the display setting data may vary during a single process mode. Concretely, in the pitching mode, the pitcher 102 may be displayed before throwing the ball 104, but the pitcher 102 may not be displayed after the throwing. Also, in the fielding mode, the fielder may not be displayed before catching the ball 104, but the fielder may be displayed after the catching.

In step S4, the CPU 10 or the GPU 11*b* generates a first game image. Specifically, the CPU 10 or the GPU 11*b* generates a game space image as viewed from the first virtual camera set in step S11 (a game space image as viewed from the position of the first virtual camera and in the attitude of the first virtual camera) as the first game image. In the pitching mode, a game space image with the pitcher 102 side being viewed from the batter 101 side is generated as the first game image (see FIG. 10). The generated first game image is stored to the VRAM 11*d*. Here, the first game image is generated so as not to display the object specified in step S3. Concretely, the CPU 10 reads first camera data 124 and first display setting data 129 from the main memory, and generates a game space image as viewed from the first virtual camera, without rendering the object represented by the first display setting data 129 (or with such an object being made transparent). In the pitching mode, the catcher object is not rendered, so that the first game image does not include any image of the catcher object.

Also, when the strike or ball determination has been made in step S21, a first game image in which an image representing the determination result (e.g. the word "STRIKE" or "BALL") is placed over a game space image is generated in step S4. Note that in this case, the image representing the determination result is displayed for a predetermined period of time (about a few seconds). Note that while the image is being displayed, the CPU 10 may stop the progression of the game. Following step S4, the process of step S5 is performed.

In step S5, the CPU 10 or the GPU 11*b* generates a second game image. Specifically, the CPU 10 or the GPU 11*b* generates a game space image as viewed from the second virtual camera set in step S14 (a game space image as viewed from the position of the second virtual camera and in the attitude of the second virtual camera) as the second game image. In the pitching mode, a game space image with the batter 101 side being viewed from the pitcher 102 side is generated as the second game image (see FIG. 11). The generated second game image is stored to the VRAM 11*d*. Here, the second game image is generated so as not to display the object specified in step S3. Concretely, the CPU 10 reads second camera data 125 and second display setting data 130 from the main memory, and generates a game space image as viewed from the second virtual camera, without rendering the object represented by the second display setting data 130 (or with such an object being made transparent). In the pitching mode, the pitcher object 102 is not rendered, so that the second game image does not include any image of the pitcher object 102.

Note that when the strike or ball determination has been made in step S21, a first game image in which an image representing the determination result overlaps with a game space image is generated in step S5, as in step S4. Also, in the present embodiment, the CPU 10 generates a target image 105 at the center of the game space image so as to overlap therewith (see FIG. 10). Following step S5, the process of step S6 is performed.

In step S6, the CPU 10 outputs the first game image generated in step S4 to the television 2. Concretely, the CPU 10 sends image data for the first game image stored in the VRAM 11*d* to the AV-IC 15, and the AV-IC 15 outputs the image data to the television 2 via the AV connector 16. As a result, the first game image is displayed on the television 2. Following step S6, the process of step S7 is performed.

In step S7, the CPU 10 outputs the second game image generated in step S5 to the hand-held device 9. Concretely, the CPU 10 sends image data for the second game image stored in the VRAM 11*d* to the image compression section 27, and the image compression section 27 performs a predetermined compression process on the data before the high-speed wireless communication module 28 transmits the data to the hand-held device 9 via the antenna 29. The hand-held device 9 receives the image data transmitted from the game apparatus 3 at the wireless communication module 86, and causes the image decompression section to perform a predetermined decompression process on the received image data. The CPU 811 outputs the decompressed image data to the lower LCD 62 after storing the data to the VRAM 813 as necessary. As a result, the second game image is displayed on the lower LCD 62. Following step S7, the process of step S8 is performed.

In step S8, the CPU 10 determines whether or not to end the game. The determination of step S7 is made based on, for example, whether or not the game has gone final or the player has provided an instruction to cancel the game. When the determination result of step S8 is negative, the process of step S2 is performed again. On the other hand, when the determination result of step S8 is affirmative, the CPU 10 ends the game process shown in FIG. 16. Thereafter, a series of processes of steps S2 to S8 are repeated until a determination to end the game is made in step S8.

As described above, in the pitching scene (pitching mode), the television 2 displays a game space image as viewed from the batter side (a first game image), and the hand-held device 9 (the lower LCD 62) displays a game space image as viewed from the pitcher side (a second game image). Accordingly, in the pitching scene, the second player throws a pitch after deciding a pitching direction by performing an operating of tilting the hand-held device 9 (to change the attitude) while viewing the second game image displayed on the lower LCD 62 of the hand-held device 9. On the other hand, the first player swings the bat 103 by performing an operation of swinging the operating device 7 while viewing the first game image displayed on the television 2. When the bat 103 hits the ball 104, transition to the fielding scene (fielding mode) occurs.

(Process in the Fielding Mode)

Figure 19:
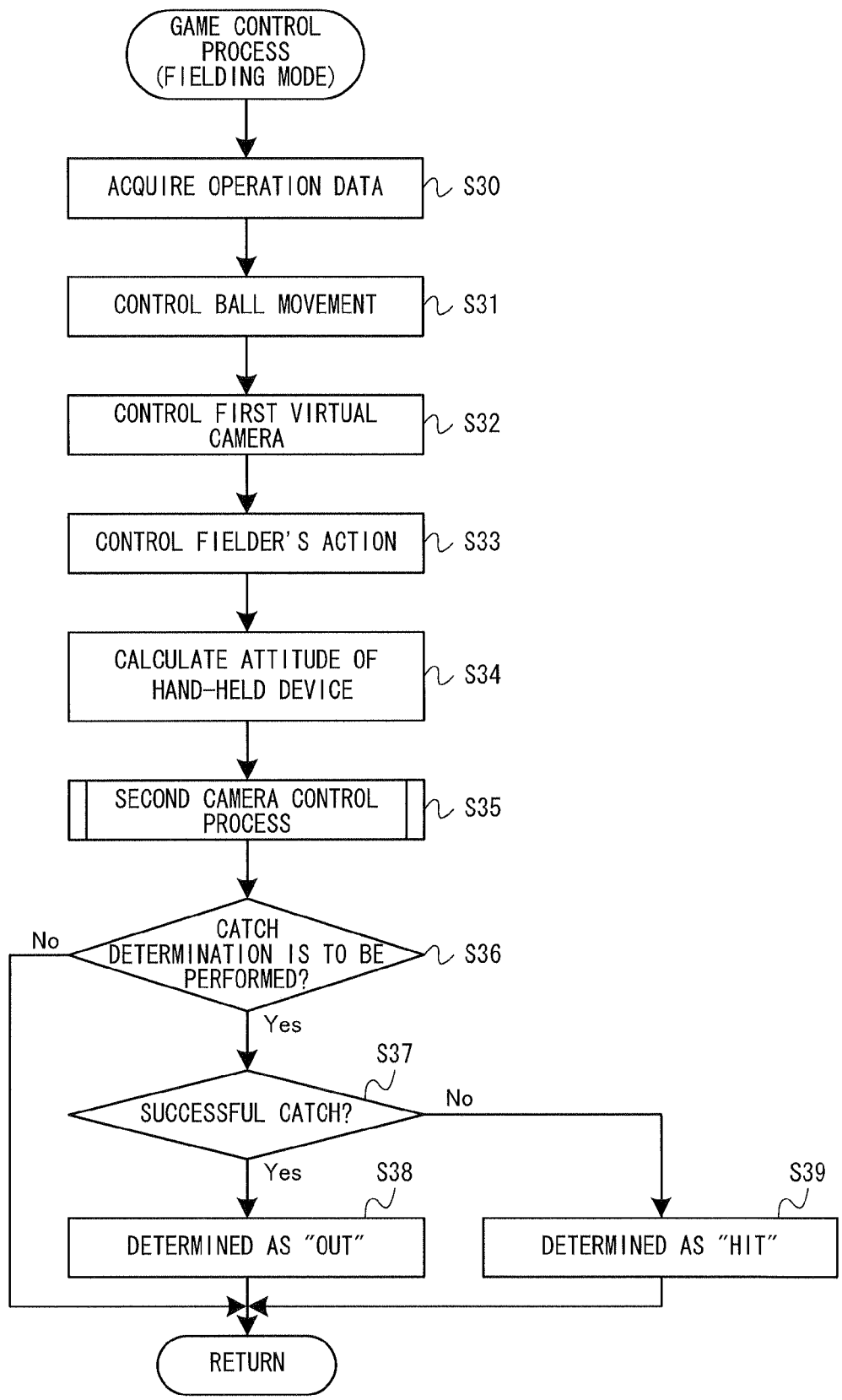
FIG. 19 is a flowchart illustrating a detailed flow of a game control process for the fielding mode.

Next, the game process for the fielding mode will be described. FIG. 19 is a flowchart illustrating a detailed flow of the game control process for the fielding mode. In the fielding mode, the CPU 10 initially acquires operation data from the operating device 7 and the hand-held device 9 in step S30. The process of step S30 is the same as the process of step S12. Following step S30, the process of step S31 is performed.

In step S31, the CPU 10 controls the action of the ball 104. Specifically, the CPU 10 calculates the behavior of the ball 104 (the moving direction and speed of the ball 104), and moves the ball 104 based on the behavior. The behavior of the ball 104 is calculated based on the actions of the bat 103 and the ball 104. Any specific method can be employed for calculating the behavior of the ball 104, and the behavior can be calculated, for example, based on an angle of contact between the bat 103 and the ball 104 and an intensity of the contact (the speeds of the bat 103 and the ball 104). Also, when the ball 104 hits the ground or the fence, the behavior after the hitting is calculated. Note that for each process of step S31, the CPU 10 may calculate the behavior simply for one frame or collectively for more than one frame. Also, the CPU 10 moves the ball 104 in accordance with the calculated behavior. Specifically, the distance of moving for one frame period and the moving direction are calculated based on the calculated behavior, and the position of the ball 104 is changed by the calculated distance in the moving direction. Data representing the changed position of the ball 104 is stored to the main memory as new ball data 126. Following step S31, the process of step S32 is performed.

In step S32, the CPU 10 controls the first virtual camera. For the fielding mode in the present embodiment, the position and the attitude of the first virtual camera is calculated such that the ball 104 is included in the range of the field of view of the camera. Specifically, the CPU 10 reads ball data 126 from the main memory, and calculates the position and the attitude of the first virtual camera based on the position of the ball 104. Data representing the calculated position and attitude is stored to the main memory as new first camera data 124. Following step S32, the process of step S33 is performed.

In step S33, the CPU 10 controls the action of the fielder. In the present embodiment, the action of the fielder is controlled based on the behavior (or the position) of the ball 104. Note that any detailed algorithm can be employed for controlling the action of the fielder, and for example, the action of the fielder may be controlled such that the fielder chases the ball 104 (i.e., the fielder moves toward the ball 104). Also, the CPU 10 specifies one of the fielders in the game space that is to catch the ball (referred to as a "catching fielder"), and stores data representing the catching fielder to the main memory. For example, the closest fielder to the ball 104 is specified as the catching fielder. As will be described in detail later, in the fielding mode, the position of the second virtual camera is determined based on the position of the catching fielder. Note that in another embodiment, each fielder's (or catching fielder's) action may be controlled by the second player (based on the second operation data 116). For example, the CPU 10 may control the position of the fielder in accordance with an operation on the cross button 64A or the analog stick 65. Following step S33, the process of step S34 is performed.

In step S34, the CPU 10 calculates the attitude of the hand-held device 9. The process of step S34 is the same as the process of step S13. Following step S34, the process of step S35 is performed.

In step S35, the CPU 10 performs a second camera control process. The second camera control process is a process for calculating the attitude of the second camera in the fielding mode based on the attitude of the hand-held device 9. Hereinafter, referring to FIGS. 20 and 21, the second camera control process will be described in detail.

Figure 20:
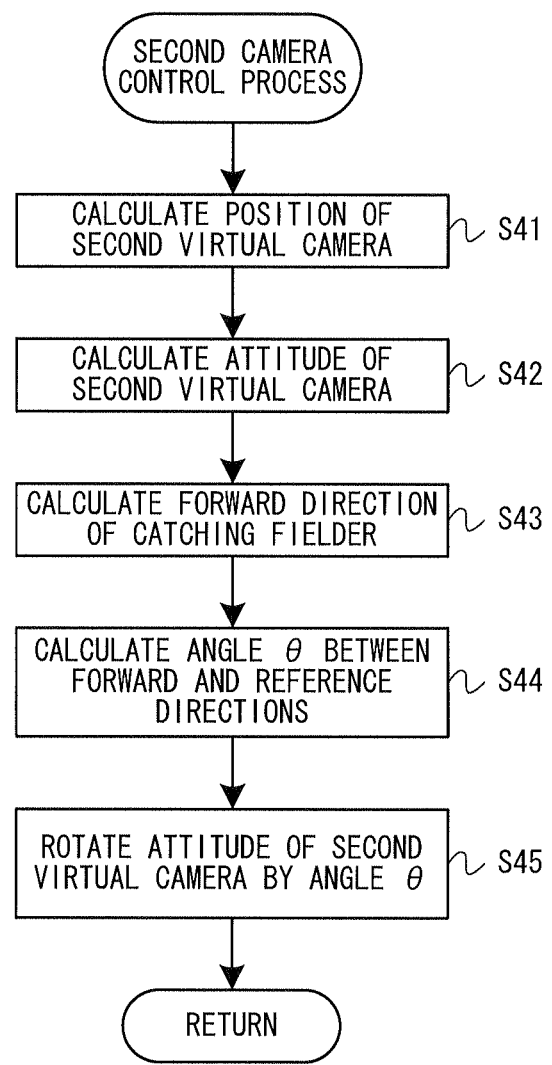
FIG. 20 is a flowchart illustrating a detailed flow of the process of step S35 (second camera control process) in FIG. 19.

FIG. 20 is a flowchart illustrating a detailed flow of the process of step S35 (the second camera control process) in FIG. 19. In the second camera control process, the CPU 10 initially calculates the position of the second virtual camera in step S41. The position of the second virtual camera is determined based on the position of the catching fielder. Concretely, the position of the second virtual camera is determined to be a position slightly behind the catching fielder (in a direction away from home plate). Note that in another embodiment, the position of the catching fielder may be the position of the second virtual camera. Following step S41, the process of step S42 is performed.

In step S42, the CPU 10 calculates the attitude of the second virtual camera based on the attitude of the hand-held device 9, such that the reference attitude of the hand-held device 9 corresponds to the reference attitude of the second virtual camera. The process of step S42 is the same as the process of step S14. Accordingly, data representing the calculated attitude is stored to the main memory as second camera data 125. Following step S42, the process of step S43 is performed.

Figure 21:
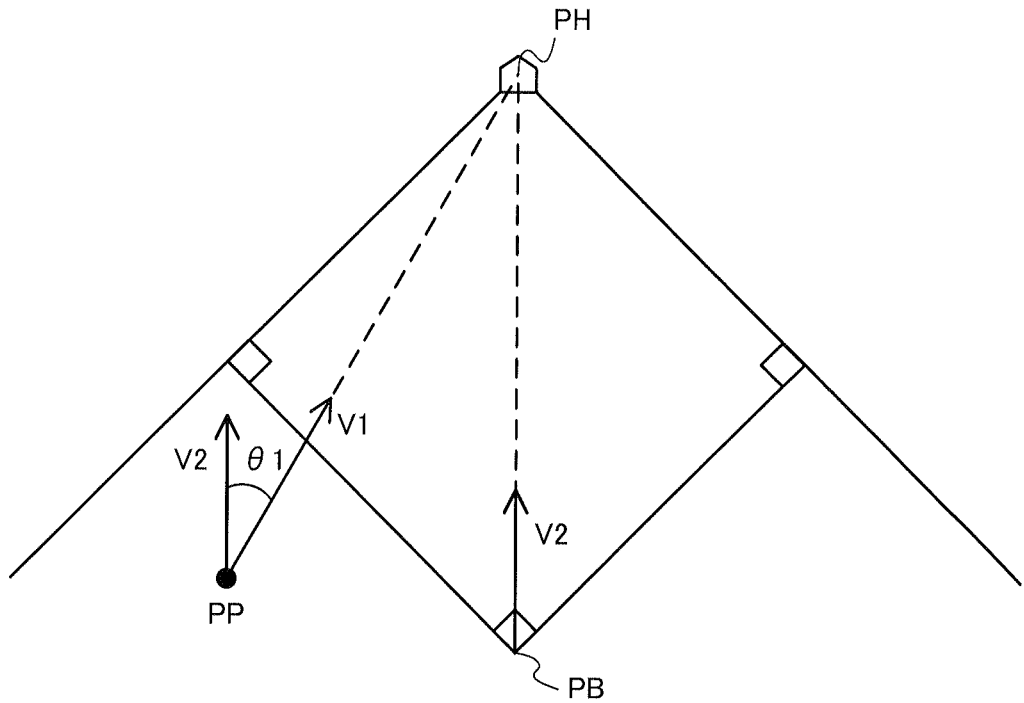
FIG. 21 is a diagram of a virtual game space as viewed from above.

FIG. 21 is a diagram of a virtual game space as viewed from above. In FIG. 21, position PP is a position of catching fielder, and vector V1 is a vector indicating a direction from catching fielder to home plate. Also, vector V2 is a vector indicating the line of sight direction of the second virtual camera where the second virtual camera is in the reference attitude (such a direction being referred to as a "reference direction"). Specifically, vector V2 is a vector directed from the position of second base PB toward the position of home plate PH. Note that vectors V1 and V2 are parallel to the horizontal direction of the game space.

In the process of step S42, when the hand-held device 9 is in the reference attitude, the line of sight direction of the second virtual camera is calculated so as to accord with the reference direction (vector V2). Here, in the pitching scene, the position of the second virtual camera coincides with the position of the pitcher, and therefore when the hand-held device 9 is in the reference attitude, the line of sight direction of the second virtual camera accords with the reference direction (vector V2) and hence with the direction toward home plate, which causes no problem. Specifically, in the pitching scene, there is no problem in calculating the attitude of the second virtual camera by the method of step S42.

On the other hand, in the fielding scene, the position of the second virtual camera matches the position of catching fielder PP. Accordingly, when the hand-held device 9 is in the reference attitude and the line of sight direction of the second virtual camera is in the direction of vector V2, the second virtual camera is not directed to home plate. Even when the hand-held device 9 is in the reference attitude, the second virtual camera is not directed to home plate, and therefore if the attitude of the second virtual camera is calculated simply by the process of step S42, the second player might perceive the operation of the second camera to be unnatural and feel the second camera to be hard to operate. In particular, when there is a switch in game image from the pitching scene to the fielding scene, the game image as viewed toward home plate in the pitching scene is switched to a game image as viewed toward anywhere but not home plate at the moment of the switch to the fielding scene, so that the second player might lose sight of the ball 104.

Therefore, for the fielding scene in the present embodiment, the attitude calculated by the process of step S42 is corrected by the following processes of steps S43 to S45, so that the line of sight direction of the second virtual camera can be appropriate. Hereinafter, the processes of steps S43 to S45 will be described in detail.

In step S43, the CPU 10 calculates the forward direction of the catching fielder. Here, the forward direction of the catching fielder is a direction from the position of catching fielder PP to home plate PH (vector V1 shown in FIG. 21). The CPU 10 calculates vector V1 based on the position of catching fielder and the position of home plate. Data representing the calculated vector V1 is stored to the main memory as forward direction data 131. Following step S43, the process of step S44 is performed.

In step S44, the CPU 10 calculates an angle between the forward direction and the reference direction (angle θ1 shown in FIG. 21). Specifically, the CPU 10 reads data representing vector V1 from the main memory, and calculates angle θ1 between vector V1 and a predetermined reference direction (vector V2). Here, angle θ1 is an angle of vector V1 with respect to vector V2, i.e., a rotation angle of vector V2 toward vector V1. In this manner, data representing the calculated angle θ1 is stored to the main memory. Following step S44, the process of step S45 is performed.

In step S45, the CPU 10 performs a correction to rotate the attitude of the second virtual camera calculated in step S42 by angle θ1. Concretely, the CPU 10 reads data representing angle θ1 and second camera data 125 from the main memory, and calculates an attitude obtained by rotating the attitude of the second virtual camera by angle θ1. Then, data representing the calculated attitude and the position calculated in step S41 is stored to the main memory as new second camera data 125. As a result, the attitude of the second virtual camera calculated in step S42 is corrected. After step S45, the CPU 10 ends the second camera control process.

When the hand-held device 9 is in the reference attitude in the fielding scene, the second camera control process controls the second virtual camera to be directed toward home plate (regardless of the position of the camera). Thus, it is possible to display a game image that can be readily viewed by the second player.

Returning to the description of FIG. 19, the process of step S36 is performed following the second camera control process (step S35). In step S36, the CPU 10 determines whether or not to perform a catch determination process. The catch determination process is a process for determining whether or not the catching fielder has successfully caught the ball 104 (step S37). The determination process of step S36 is performed based on the positional relationship between the catching fielder and the ball 104. Concretely, the CPU 10 determines whether or not the distance between the catching fielder and the ball 104 is less than a predetermined value. When the distance is less than the predetermined value, the catch determination process is determined to have been performed. Inversely, when the distance is great than or equal to the predetermined value, the catch determination process is determined not to have been performed. When the determination result of step S36 is affirmative, the process of step S37 is performed. On the other hand, when the determination result of step S36 is negative, the CPU 10 ends the game control process.

Figure 22:
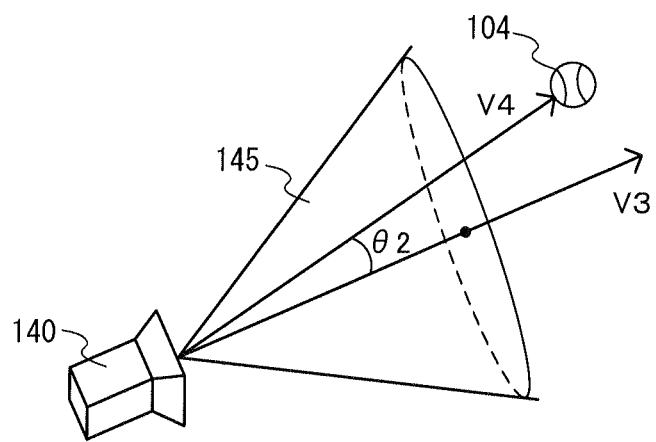
FIG. 22 is a diagram illustrating the second virtual camera and a ball in the game space.

In step S37, the CPU 10 determines whether or not the catching fielder has successfully made a catch. As has been described in conjunction of FIG. 14, whether or not the catching fielder has successfully caught the ball 104 is determined based on whether the ball 104 is inside the frame image 107 in the second game image. Accordingly, the determination of step S37 can be made based on whether or not the line of sight direction of the second virtual camera 140 falls within a predetermined range including the ball 104 in the game image. FIG. 22 is a diagram illustrating the second virtual camera and the ball 104 in the game space. In step S37, the CPU 10 determines whether or not angle θ2 between vector V3, which represents the line of sight direction, and vector V4, which extends from the second virtual camera 140 to the ball 104, is less than or equal to a predetermined angle. In other words, a determination is made as to whether or not vector V4 is directed toward a range 145 within a predetermined angle with respect to the line of sight direction. In step S37, the CPU 10 reads second camera data 125 and ball data 126 from the main memory, and makes the aforementioned determination based on the position and the attitude of the second virtual camera and the position of the ball 104. When the determination result of step S37 is affirmative, the process of step S38 is performed. On the other hand, when the determination result of step S37 is negative, the process of step S39 is performed.

In step S38, the CPU 10 makes a determination "OUT". Specifically, the CPU 10 stores data representing the determination result to the main memory. Note that the stored data is referenced in a game image generation process to be performed later (steps S3 and S4). After step S38, the CPU 10 ends the game control process. Note that the aforementioned determination "OUT" is made when a fly is caught but is not necessarily made when a grounder or suchlike is caught.

On the other hand, in step S39, the CPU 10 makes a determination "HIT". As in step S38, the CPU 10 stores data representing the determination result to the main memory. After step S39, the CPU 10 ends the game control process.

Note that when the process of step S38 or S39 is performed, an image representing the determination result "OUT" or "HIT" is displayed for a predetermined period of time (about a few seconds) in the game image generation process (steps S3 and S4). Accordingly, in the game control process, the CPU 10 does not perform a series of processes of steps S11 to S21 for the predetermined period of time. Although not shown the flowchart of FIG. 19, when the image representing the determination result disappears (after the lapse of the predetermined period of time), the CPU 10 changes the process mode of the game control process to the pitching mode. Concretely, the CPU 10 changes (updates) mode data 128 stored in the main memory to data representing the pitching mode. As a result, the game control process is performed for the pitching mode in the next process loop.

As described above, in the game control process for the fielding scene, the behavior of the ball 104 to be determined in accordance with the movement of the operating device 7 is calculated based on the first operation data, and the ball 104 moves in accordance with the calculated behavior (step S31). The second virtual camera moves in accordance with the movement of the hand-held device 9. Then, a determination is made as to whether the second virtual camera is directed toward a predetermined range including the ball 104 (step S37), and the game process is performed in accordance with the determination result (steps S38 and S39). Then, by steps S4 to S7 to be described later, a game image is generated in accordance with the determination result. Thus, by the game control process, it is possible to realize a baseball game in which the first player moves the operating device to determine the behavior of the ball 104, and the second player moves the hand-held device 9 to direct the second virtual camera toward the ball 104 (and catch the ball 104). It is also possible to provide a novel game operation in which the hand-held device 9 (the second virtual camera) is set in an appropriate direction with respect to the ball 104 to catch the ball 104.

Note that for the fielding mode in the present embodiment, the first player has been described as not performing a game operation, but in another embodiment, the first player may be able to perform some game operation. For example, in the fielding mode, the first player may be able to operate base running of the batter and runners.

In the fielding mode, the processes of steps S3 to S8 are performed following the game control process (step S2), as in the pre- and post-pitching modes. Specifically, in step S3, the CPU 10 performs an object display setting process. In step S3 for the fielding mode, data representing there being no object that fails to be displayed is stored to the main memory as first display setting data 129, and data representing the catching fielder is stored to the main memory as second display setting data 130.

Also, in step S4, a first game image is generated. In the fielding mode, by the process of step S32, a game space image including the ball 104 hit by the batter 101 is generated as the first game image (see FIG. 13). Note that in the fielding mode, the first display setting data 129 represents that there is no object fails to be displayed, and therefore there is no objects that fails to be rendered in step S3 for the fielding mode.

Also, in the fielding mode, when either the process of step S38 or the process of step S39 is performed, the CPU 10 displays an image representing the determination result of the performed process. Specifically, in the above case, the CPU 10 reads data representing the determination result from the main memory, a first game image is generated in which an image indicating the determination result (e.g., the word "HIT" or "OUT") overlaps with the game space image. In this case, the image representing the determination result is displayed for a predetermined period of time (about a few seconds).

In step S5, a second game image is generated. In the fielding mode, the second game image is an image game space as viewed from the position of the catching fielder (see FIG. 14). Note that in step S5, the CPU 10 references the second display setting data 130 and generates the second game image such that the catching fielder object 106 is not rendered. Also, in step S5 for the fielding mode, as in step S4, when either the process of step S38 or the process of step S39 is performed, the CPU 10 displays an image representing the determination result of the performed process.

In step S6, the first game image is outputted to and displayed on the television 2. Also, in step S7, the second game image is outputted to the hand-held device 9 and displayed on the lower LCD 62. As a result, two game images of the game space as viewed from different viewing points with different lines of sight are displayed on two different display devices. Note that the process of step S8 for the fielding mode is the same as that for the pitching mode. This is the end of the description of the game process in the present embodiment.

In the pitching scene by the game process of the present embodiment, a first game image of the game space as viewed from the batter side is displayed on the television 2, and a second game image of the game space as viewed from the pitcher side is displayed on (the lower LCD 62 of) the hand-held device 9. Also, in the fielding scene, a first game image including the ball hit by the batter is displayed on the television 2, and a second game image of the game space as viewed from the position of the catching fielder is displayed on the hand-held device 9. Accordingly, in any of the scenes, the first game image and the second game image can be displayed so as to be readily viewed by the first player and the second player, respectively. As described above, in the present embodiment, a plurality of virtual cameras are set in a single game space, and game images generated based on the virtual cameras are displayed on individual display devices, making it possible to provide game images that are readily viewed by their respective players.

Furthermore, in the above embodiment, the CPU 10 detects an operation of swinging the operating device 7 based on the first operation data (step S16), and also detects an operation of tilting the hand-held device 9 based on the second operation data (step S13). Thereafter, game control processes are performed in accordance with the swinging operation and the tilting operations (steps S14, S15, and S17). In this manner, in the present embodiment, the first player can play the game by performing the operation of swinging the operating device, and the second player can play the game by performing the operation of tilting the hand-held device.

Here, in the present embodiment, the operating device 7 is not provided with any display means for displaying game images, and therefore the first player plays the game while viewing the television 2 provided independently of the operating device 7, which makes it easy for the first player to perform the operation of the operating device 7 itself. On the other hand, the second game image is displayed on the screen of the hand-held device 9, and therefore the second player plays the game while viewing the hand-held device 9, which makes it difficult for the second player to perform an operation by such an action as to swing the hand-held device 9. Therefore, in the present embodiment, different operation methods are employed for the operating device 7 and the hand-held device 9, thereby enabling intuitive game operations by moving the devices themselves and allowing the operations to be readily performed considering characteristics of the devices.

8. Other Embodiments

The above embodiment is an example of carrying out the present invention, and in another embodiment, the present invention may be carried out with, for example, configurations as described below.

(Exemplary Game Operation)

In the above embodiment, the CPU 10 performs a game control process in accordance with the movement (concretely, the attitude) of the hand-held device 9. Specifically, the hand-held device 9 has sensors (acceleration sensor 89 and gyroscope 90) for outputting data whose values change in accordance with the movement of the hand-held device 9, and outputs second operation data including data outputted by the sensors. Thereafter, the CPU 10 performs game control processes (S14, S15, S34, and S35) in accordance with the attitude of the hand-held device 9 based on the output data included in the second operation data. Here, in another embodiment, the operation of moving the hand-held device 9 itself is not restrictive, and any operation may be performed on the hand-held device 9. For example, the CPU 10 may perform game control processes in accordance with operations on the button group 64, the touch panel 63, or the analog stick 65, rather than the operation of moving the hand-held device 9.

Also, when any game control process is performed in accordance with the movement of the hand-held device 9, the CPU 10 may perform the game control process in accordance with values other than the attitude of the hand-held device 9. For example, the game control process may be performed in accordance with a positional change of the hand-held device 9. Concretely, the CPU 10 can calculate the positional change of the hand-held device 9 based on acceleration obtained by excluding gravitational acceleration from acceleration represented by the acceleration data 117. Accordingly, for example, in the process of step S14, the CPU 10 may change the attitude of the second virtual camera in accordance with the positional change of the hand-held device 9. Thus, the attitude of the second virtual camera can be changed by moving the hand-held device 9 up and down and right to left.

(Variant on the Game Control Process Based on the Second Operation Data)

In the above embodiment, the game control process based on the second operation data from the hand-held device 9 has been described by taking as an example the case where the process of moving the second virtual camera in accordance with the movement of the hand-held device 9 is performed. Here, in another embodiment, the game control process based on the second operation data is not limited to controlling the virtual camera and may be performed for any other control. For example, in another embodiment, the CPU 10 may perform a process of controlling the pitching direction based on the second operation data (while keeping the second virtual camera stationary).

(Variant on the Content of the Game)

While in the above embodiment, the game to be played between a plurality of players has been described by taking as an example the game process for playing the baseball game, the content of the game may be arbitrary. For example, the present invention can be applied to the following game (so-called "whack-a-mole").

Figure 23:
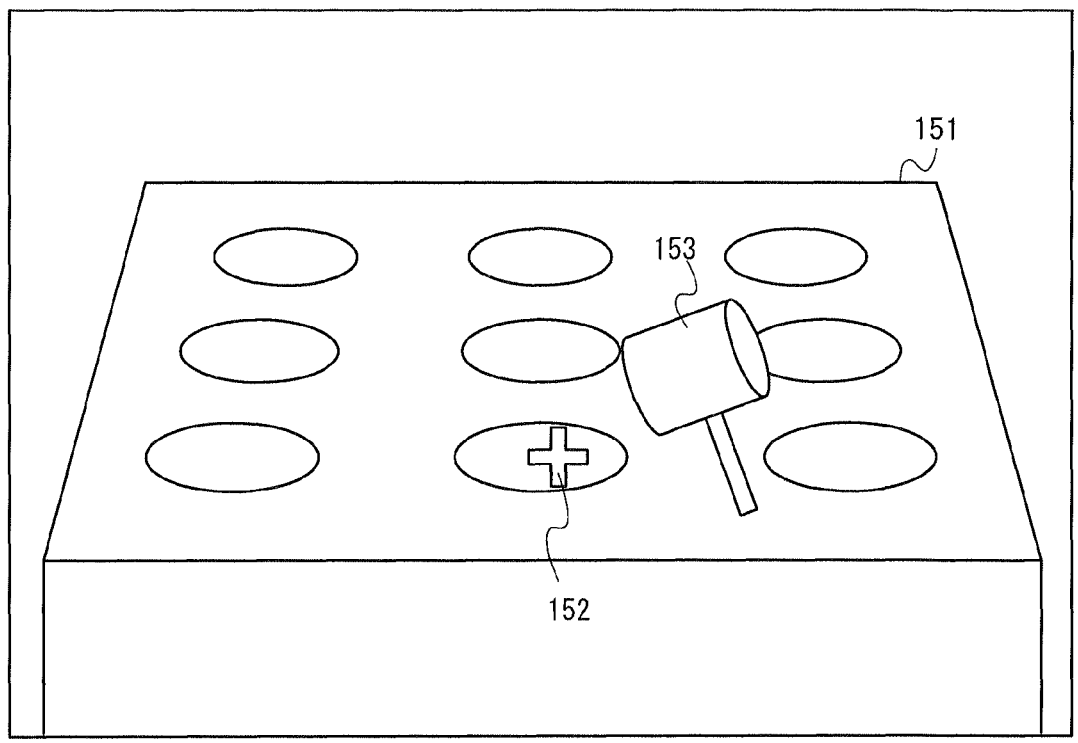
FIG. 23 is a diagram illustrating an exemplary first game image to be displayed on the television in another exemplary game.
Figure 24:
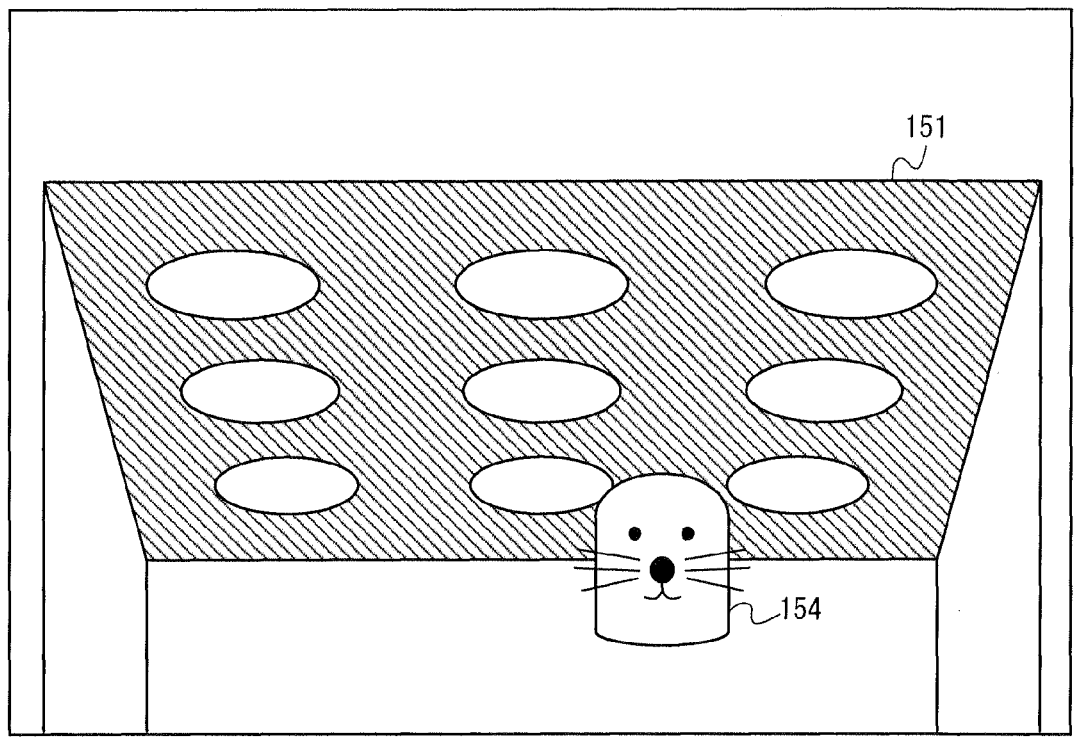
FIG. 24 is a diagram illustrating an exemplary second game image to be displayed on the hand-held device in the exemplary game shown in FIG. 23.

FIG. 23 is a diagram illustrating an exemplary first game image to be displayed on the television 2 in another exemplary game. Also, FIG. 24 is a diagram illustrating an exemplary second game image to be displayed on the hand-held device 9 in the exemplary game shown in FIG. 23. As shown in FIG. 23, the television 2 displays the first game image with a ground (ground object) 151, a cursor 152, and a hammer (hammer object) 153. The first game image shown in FIG. 23 is an image as viewed from the top of the ground 151. That is, the first virtual camera is disposed on the top side of the ground 151.

In the game ("whack-a-mole") of the present variant, the first player operates the cursor 152 thereby to operate the hammer 153 to hit a mole (operated by the second player) coming out of a hole in the ground 151. As will be described in detail later, the position of the cursor 152 on the screen is calculated based on marker coordinate data 114 so as to match the position specified by the operating device 7 (more concretely, specified by the pickup direction (Z-axis) of the operating device 7). The hammer 153 is controlled in its action so as to hit the position specified by the cursor 152 in accordance with a predetermined hitting operation (e.g., an operation of pressing the A button 32*d*). That is, the first player plays "whack-a-mole" by moving the cursor 152 with the operating device 7, and performing a hitting operation with the cursor 152 being placed over the hole from which the mole comes out.

Also, as shown in FIG. 24, the ground object 151 and the mole object 154 are displayed on the hand-held device 9. The second game image shown in FIG. 24 is an image as viewed from under the ground 151. That is, the second virtual camera is disposed at the backside of the ground 151. The second player operates the mole 154 so as to emerge from the hole in the ground 151. Any operation method can be applied to the mole 154, but in the present variant, the mole 154 is operated with the cross button 64A of the hand-held device 9 so as to move up and down and right to left and with the button 64B so as to emerge from the hole.

In the "whack-a-mole" game shown in FIGS. 23 and 24, as in the above embodiment, two virtual cameras are set in a single game space, and two types of game image of the game space as viewed from their respective virtual cameras are displayed. Specifically, the television 2 displays the first game image as viewed from the top of the ground 151 for the first player, and the hand-held device 9 displays the second game image as viewed from under the ground 151 for the second player. Thus, in the present variant, it is possible to display game images that can be readily viewed (readily operated) by the players, as in the above embodiment.

Note that in the present variant, the position of the cursor 152 (instruction position) is calculated as follows. Initially, the CPU 10 calculates a midpoint between two marker coordinate points based on marker coordinate data 114 included in first operation data 111. Then, the CPU 10 performs a correction to rotate the midpoint between the marker coordinate points about the center of a pickup image, such that a vector extending between the marker coordinate points becomes parallel to an axis representing the horizontal direction of the marker coordinate system. By this correction, it is possible to calculate the instruction position with precision even when the operating device 7 is tilted from its reference attitude about the Z-axis. Next, the CPU 10 transforms the coordinates that indicate the position of the midpoint after the correction into coordinates representing a position on the screen of the television 2. Note that the instruction position of the operating device 7 moves in an opposite direction to the position of the midpoint in the pickup image, and therefore the transformation is performed for flipping both horizontal and vertical. The position on the screen that is obtained by the transformation is employed as the instruction position. In this manner, the method using the marker coordinate data 114 makes it possible to calculate the instruction position with precision.

In addition to the baseball game and the "whack-a-mole" game as mentioned above, the present invention can also be applied to other games in which two types of game image of a single game space as viewed from different viewpoints are generated and displayed. For example, the present invention can also be applied to a soccer penalty kick game and a tennis game. In the case of the soccer penalty kick game, assuming that one player operates the kicker and the other player operates the goalkeeper, the game apparatus 3 displays a game image on one display device with the goalkeeper viewed from the position of the kicker, and another game image on the other display device with the kicker viewed from the position of the goalkeeper. Note that similar to the pitching direction operation in the above embodiment, the game apparatus 3 may control the direction in which the kicker kicks the ball, or the position at which the goalkeeper catches the ball, in accordance with the attitude of the hand-held device 9. Furthermore, in the case of the tennis game, the game apparatus 3 displays an image on one display device with one player in the court being viewed from the other player's side, and another image viewed from the opposite side of the court on the other display device. Note that similar to the pitching direction operation in the above embodiment, the game apparatus 3 may control the direction in which the ball is hit in accordance with the attitude of the hand-held device 9.

(Variant on the Device for Performing the Game Process)

While in the above embodiment, the game apparatus 3 performs a series of game processes shown in FIG. 16, part of the game processes may be performed by another device. For example, in another embodiment, part of the game processes (e.g., the second game image generation process) may be performed by the hand-held device 9. Also, in another embodiment, game processes may be shared within a game system by a plurality of information processing devices capable of communicating with one another. Specifically, a game system including a game apparatus, an operating device, and a hand-held device may include: (a) an operation data acquisition section for acquiring first operation data and second operation data, wherein the first operation data represents an operation by a first player operating the operating device, and the second operation data represents an operation by a second player operating the hand-held device; (b) a game process section for performing a game control process based on the first operation data and the second operation data; (c) a first image generation section for generating a first game image for the first player based on a first virtual camera being set in a virtual game space representing a result of the game control process, wherein the first game image is an image of the virtual game space; (d) a second image generation section for generating a second game image for the second player based on a second virtual camera being set in the virtual game space, wherein the second game image is an image of the virtual game space; (e) a first image display control section for displaying the first game image on a first display device provided independently of the hand-held device; and (f) a second image display control section for displaying the second game image on a second display device provided in the hand-held device. In this case, one of the devices may include all of the sections (a) to (f), or more than one device may include all of the sections (a) to (f).

(Variant on the Configuration of the Hand-Held Device)

The hand-held device 9 in the above embodiment is an example, the shape of the operation buttons and the housing 50 of the hand-held device 9, the number and arrangement of components, etc., are merely illustrative, and other shape, number, and arrangement may be employed. For example, a terminal device to be described below may be used as the hand-held device. Hereinafter, referring to FIGS. 25 to 31, a variant on the hand-held device will be described.

Figure 25:
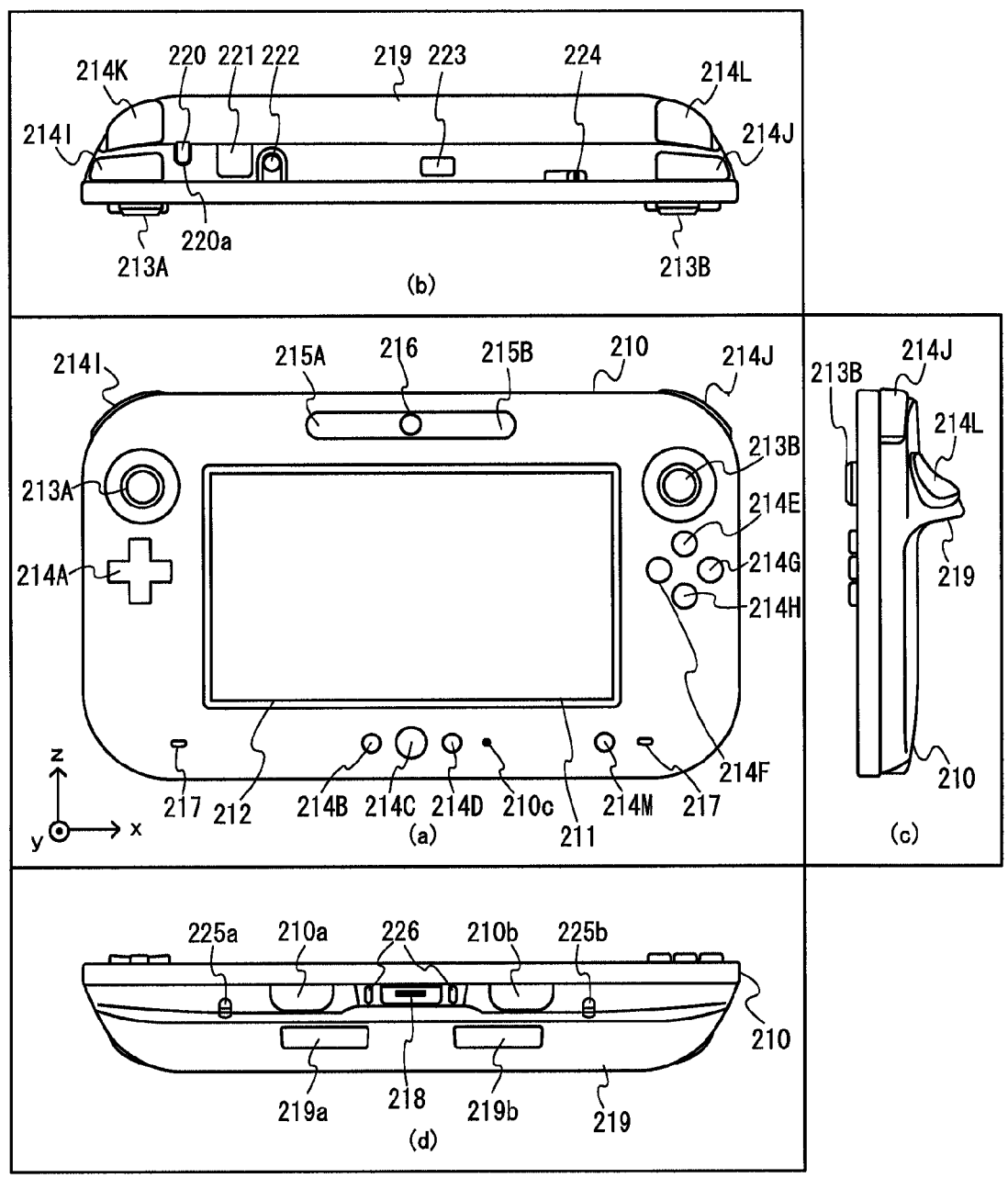
FIG. 25 provides views illustrating an external configuration of a terminal device in a variant of the embodiment.
Figure 26:
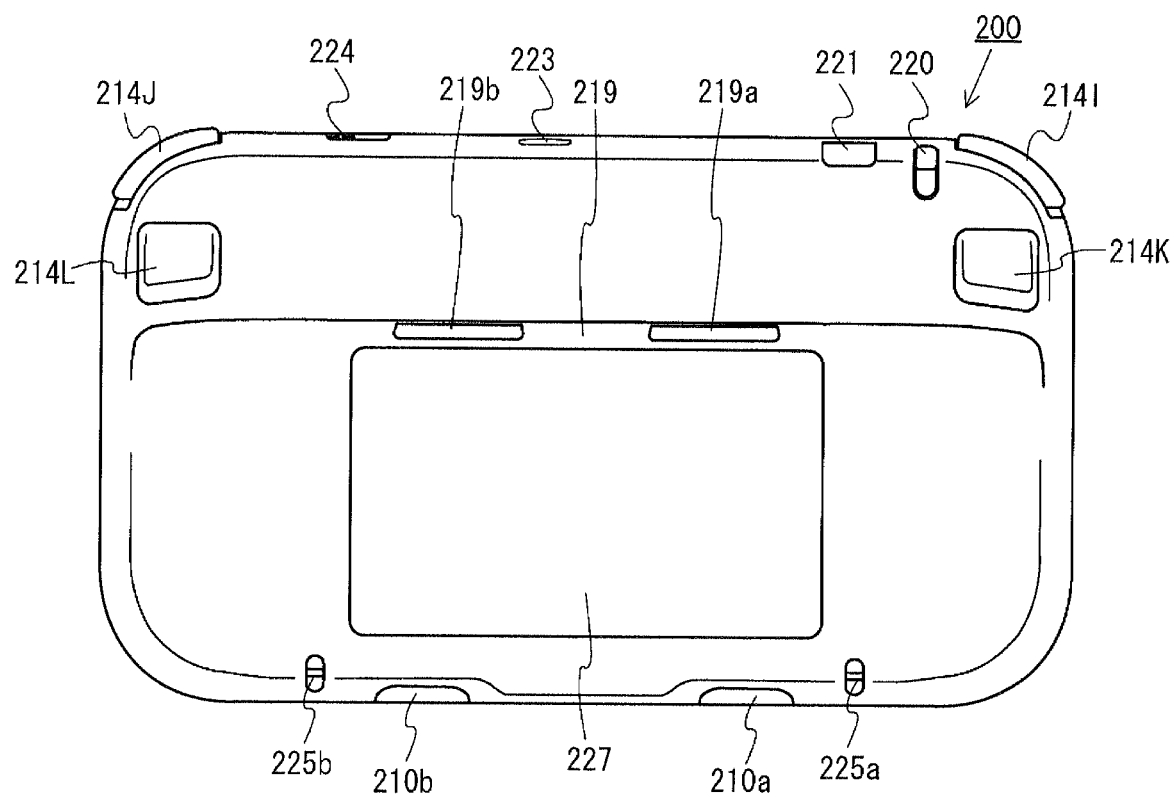
FIG. 26 is a view illustrating an external configuration of the terminal device in the variant of the embodiment.
Figure 27:
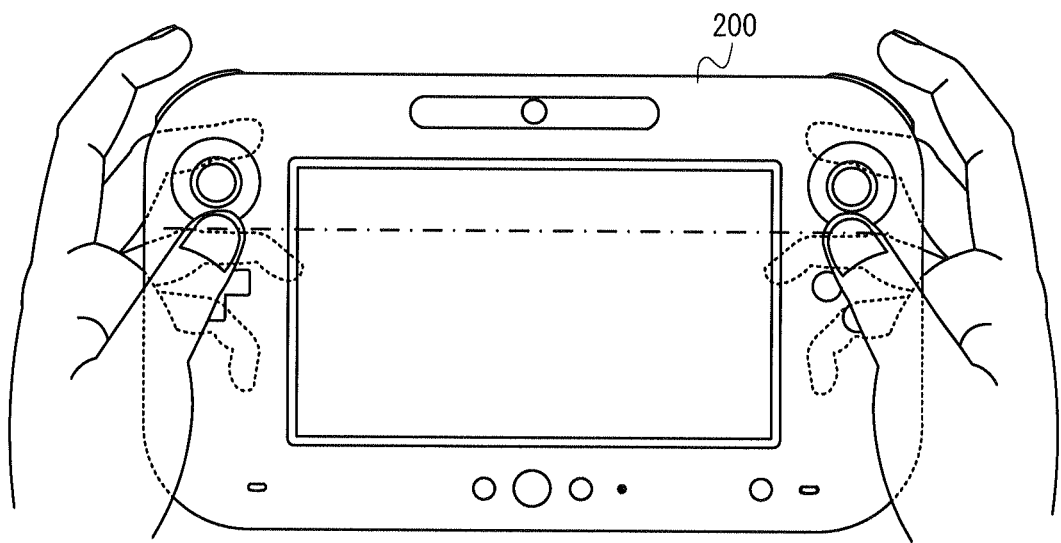
FIG. 27 is a diagram illustrating the terminal device being held horizontal by a user.
Figure 28:
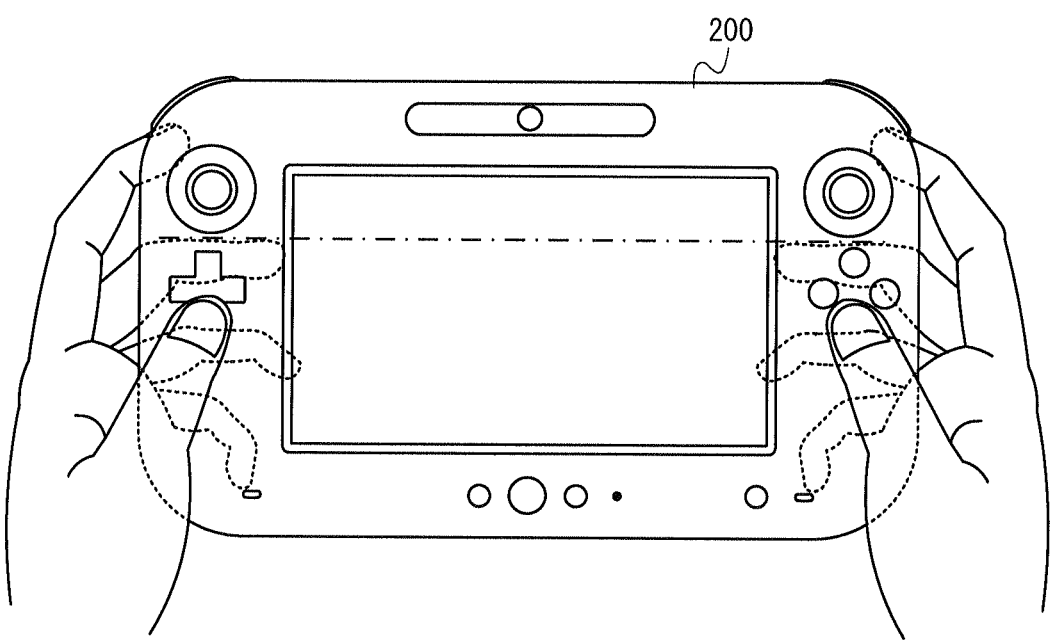
FIG. 28 is another diagram illustrating the terminal device being held horizontal by a user.
Figure 29:
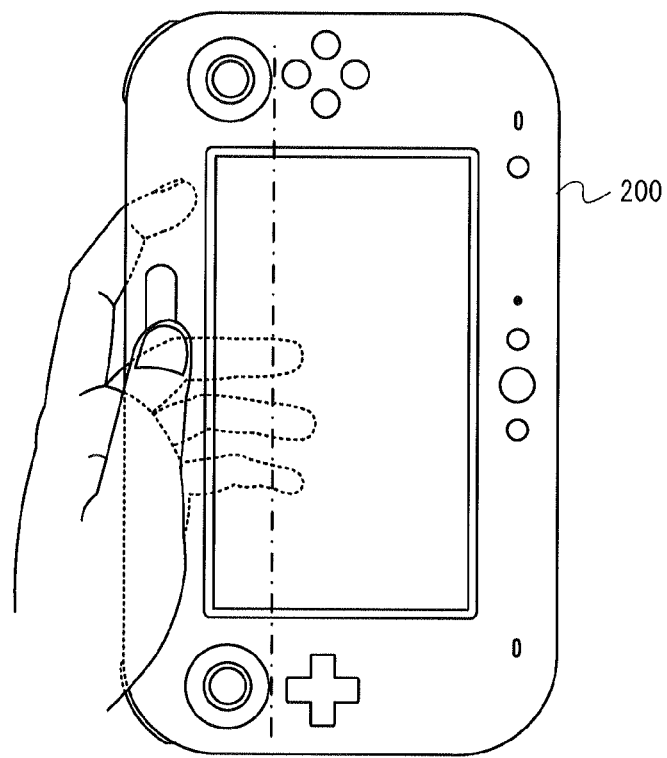
FIG. 29 is a diagram illustrating the terminal device being held vertical by a user.
Figure 30:
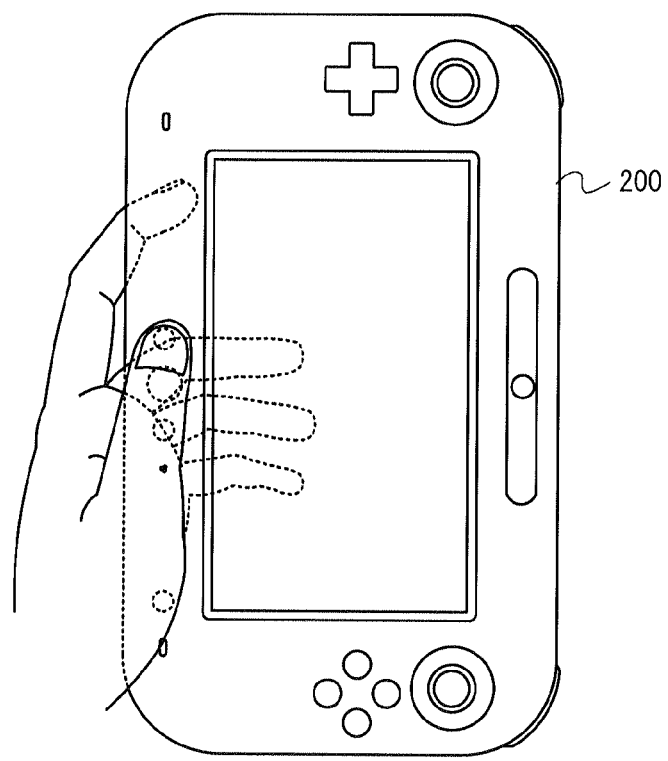
FIG. 30 is another diagram illustrating the terminal device being held vertical by a user.

First, referring to FIGS. 25 to 30, an external configuration of a terminal device according to a variant of the above embodiment will be described. FIG. 25 provides views illustrating an external configuration of a terminal device 200, in which part (a) is a front view, part (b) is a top view, part (c) is a right side view, and part (d) is a bottom view. FIG. 26 is a back view of the terminal device 200. FIGS. 27 and 28 are diagrams illustrating the terminal device 200 being held horizontal by the user. FIGS. 29 and 30 are diagrams illustrating the terminal device 200 being held vertical by the user.

As shown in FIG. 25, the terminal device 700 includes a housing 210 which is generally in the shape of a horizontally elongated rectangle. That is, it can be said that the terminal device 200 is a tablet-shaped information processing device. Note that the housing 210 may have a curved surface or may have protrusions or suchlike in its part, so long as it has a generally plate-like shape. The housing 210 is sized to be held by the user. Thus, the user can hold and move the terminal device 200, and can change the installation position of the terminal device 7. The vertical length (z-axis direction) of the terminal device 200 is preferably in the range of from 100 to 150 millimeters (mm), and 133.5 mm in the present embodiment. The horizontal length (x-axis direction) of the terminal device 200 is preferably in the range of from 200 to 250 mm, and 228.26 mm in the present embodiment. The thickness (the dimension in the y-axis direction) of the terminal device 200 is preferably in the range of from about 15 to about 30 mm in plate-like portions, from about 30 to about 50 mm including the thickest portion, and 23.6 mm (40.26 mm at the thickest portion) in the present embodiment. Also, the terminal device 200 weighs in the range of from about 400 to 600 grams (g), and 530 g in the present embodiment. As will be described in detail later, the terminal device 200 can be readily carried and operated by the user even though it is a relatively large-sized terminal device (operating device) as described above.

The terminal device 200 includes an LCD 211 on the (front-side) surface of the housing 210. Note that the screen size of the LCD 211 is preferably 5 inches or more, and 6.2 inches in present embodiment. The terminal device 200 of the present embodiment is designed to be readily carried and operated, even though the LCD is relatively large. Note that in another embodiment, the LCD 211 may be provided in a smaller size so that the terminal device 200 can be provided in a relatively small size. The LCD 211 is provided approximately at the center of the surface of the housing 210. Therefore, the user can hold and move the terminal device 200 while viewing the screen of the LCD 211 by holding the housing 210 by edges to the left and right of the LCD 211, as shown in FIGS. 27 and 28. While FIGS. 27 and 28 show examples where the user holds the terminal device 200 horizontal (horizontally long) by holding the housing 210 by edges to the left and right of the LCD 211, the user can hold the terminal device 200 vertical (vertically long) as shown in FIGS. 29 and 30.

As shown in FIG. 25(a), the terminal device 200 includes a touch panel 212 on the screen of the LCD 211 as an operating means. In the present embodiment, the touch panel 212 is a resistive touch panel. However, the touch panel is not limited to the resistive type, and may be of any type such as capacitive. The touch panel 212 may be single-touch or multi-touch. In the present embodiment, a touch panel having the same resolution (detection precision) as the LCD 211 is used as the touch panel 212. However, the touch panel 212 and the LCD 211 do not have to be equal in resolution. While a stylus 220 is usually used for providing input to the touch panel 212, input to the touch panel 212 can be provided not only by the stylus 220 but also by the user's finger. The housing 210 is provided with an accommodation hole 220a for accommodating the stylus 220 used for performing operations on the touch panel 212 (see FIG. 25(b)). Here, in order not to drop the stylus 220, the accommodation hole 220a is provided in the top surface of the housing 210, but it may be provided in a side or back surface. In this manner, the terminal device 200 includes the touch panel 212, and the user can operate the touch panel 212 while moving the terminal device 200. Specifically, the user can provide input directly to the screen of the LCD 211 (from the touch panel 52) while moving the screen.

As shown in FIG. 25, the terminal device 200 includes two analog sticks 213A and 213B and a plurality of buttons 214A to 214M, as operating means (operating sections). The analog sticks 213A and 213B are devices capable of directing courses. Each of the analog sticks 213A and 213B is configured such that its movable member (stick portion) to be operated with the user's finger is slidable in an arbitrary direction (at an arbitrary angle in any of the up, down, left, right, and oblique directions) with respect to the surface of the housing 210. That is, the analog sticks 213A and 213B are pointing devices which are also referred to as "slide pads". Note that the movable members of the analog sticks 213A and 213B may be of types that can tilt in an arbitrary direction with respect to the surface of the housing 210. In the present embodiment, the analog sticks are of a type with a movable member capable of sliding, and therefore the user can operate the analog sticks 213A and 213B without moving his/her thumbs substantially, and hence can securely hold the housing 210 during the operation. Note that in the case where the analog sticks 213A and 213B are of a type with a movable member capable of tilting, the user can readily perceive the degree of input (the degree of tilting), and therefore can readily perform detailed operations.

The left analog stick 213A is provided to the left of the screen of the LCD 211, and the right analog stick 213B is provided to the right of the screen of the LCD 211. Therefore, the user can provide a direction-specifying input by using the analog stick with either the left or the right hand. As shown in FIGS. 27 and 28, the analog sticks 213A and 213B are positioned so as to allow the user to operate them while holding the left and right sides of the terminal device 200 (holding the terminal device 200 by edges to the left and right of the LCD 211), and therefore the user can readily operate the analog sticks 213A and 213B even when holding and moving the terminal device 200.

The buttons 214A to 214L are pressable keys functioning as operating means (operating sections) for providing predetermined input. As will be discussed below, the buttons 214A to 214L are positioned so as to allow the user to operate them while holding the left and right sides of the terminal device 200 (see FIGS. 27 and 28), and therefore the user can readily operate the operating means even when holding and moving the terminal device 200.

As shown in FIG. 25(a), of all the operation buttons 214A to 214L, the cross button (direction input button) 214A and the buttons 214B to 214H and 214M are provided on the front surface of the housing 210. That is, these buttons 214A to 214H and 214M are positioned so as to allow the user to operate them with his/her thumbs (see FIGS. 27 and 28).

The cross button 214A is provided to the left of the LCD 211 and below the left analog stick 213A. That is, the cross button 214A is positioned so as to allow the user to operate it with his/her hand. The cross button 214A is a cross-shaped button which makes it possible to specify at least up, down, left and right directions.

Also, the buttons 214B to 214D are provided below the LCD 211. These three buttons 214B to 214D are provided at such positions as to allow the user to operate them with either hand. Furthermore, the terminal device 200 has a power button 214M for turning the terminal device 200 on/off. It is also possible to remotely turn the game apparatus 3 on/off by operating the power button 214M. As with the buttons 214B to 214D, the power button 214M is provided below the LCD 211. The power button 214M is provided to the right of the buttons 214B to 214D. Accordingly, the power button 214M is positioned so as to be (readily) operable with the right hand. Moreover, the four buttons 214E to 214H are provided to the right of the LCD 211 and below the right analog stick 213B. That is, the four buttons 214E to 214H are positioned so as to allow the user to operate them with the right hand. In addition, the four buttons 214E to 214H are positioned above, to the left of, to the right of, and below the central position among them. Therefore, the four buttons 214E to 214H of the terminal device 200 can be used to function as buttons for allowing the user to specify the up, down, left and right directions.

Note that in the present embodiment, the analog sticks 213A and 213B are positioned above the cross button 214A and the buttons 214E to 214H. Here, the analog sticks 213A and 213B protrude higher than the cross button 214A and the buttons 214E to 214H in the thickness direction (the y-axis direction). Therefore, if the analog stick 213A and the cross button 214A are switched in position, when the user operates the cross button 214A with the thumb, the thumb might hit the analog stick 213A, resulting in misoperation. Note that a similar problem might occur if the analog stick 213B and the buttons 214E and 214H are switched in position. On the other hand, in the present embodiment, the analog sticks 213A and 213B are positioned above the cross button 214A and the buttons 214E to 214H, and therefore when compared to the aforementioned case, it is less likely for the user's finger to hit the cross button 214A or any of the buttons 214E to 214H when the user operates the analog stick 213A or 213B. In this manner, the present embodiment makes it possible to reduce the possibility of misoperation, thereby improving operability of the terminal device 200. However, in another embodiment, the analog stick 213A and the cross button 214A may be switched in position as necessary, and the analog stick 213B and the buttons 214E to 214H may be switched in position.

Here, in the present embodiment, some operating sections (the analog sticks 213A and 213B, the cross button 214A, and the three buttons 214E to 214G) are provided either to the right or left of the display section (LCD 211) and above the center of the housing 210 in the vertical direction (the y-axis direction). When any of these operating sections is operated, the user holds the terminal device 200 mainly by its portions above the center in the vertical direction. Here, if the user holds the housing 210 by its lower portions, the terminal device 200 loses stability (particularly when the terminal device 200 is relatively large-sized as in the present embodiment), making it difficult for the user to hold the terminal device 200. On the other hand, in the present embodiment, when any of the operating sections is operated, the user holds the terminal device 200 mainly by its portions above the center in the vertical direction, and can also support the housing 210 with the palms from the sides. Accordingly, the user holds the housing 210 in a stabilized state, and can readily hold the terminal device 200, so that the operating sections can be readily operated. Note that in another embodiment, at least one operating section may be provided each to the right and left of the display section above the center of the housing 210. For example, only the analog sticks 213A and 213B may be provided above the center of the housing 210. Also, for example, when the cross button 214A is provided above the left analog stick 213A, and the four buttons 214E to 214H are provided above the right analog stick 213B, the cross button 214A and the four buttons 214E to 214H may be provided above the center of the housing 210.

Also, in the present embodiment, the housing 210 has a protrusion (projection 219) provided at its bottom side (opposite to the surface on which the LCD 211 is provided; see FIGS. 25(c) and 26). As shown in FIG. 25(c), the projection 219 is a ridge-like member provided to stick outward from the back surface of the housing 210 which has a generally plate-like shape. The protrusion has such a height (thickness) as to allow the user's fingers to be rested upon it when the user is holding the back surface of the housing 210. The protrusion has a height of preferably from 10 to 25 mm, and 16.66 mm in the present embodiment. Also, the protrusion preferably has the bottom surface slanted at 45° or more (more preferably, 60° or more) with respect to the back surface of the housing 210 such that the user's fingers can be readily placed on the protrusion. As shown in FIG. 25(c), the protrusion may be formed such that the bottom surface is slanted at a greater angle than the top surface. As shown in FIGS. 27 and 28, the user can hold the terminal device 200 with his/her fingers in contact with the projection 219 (the projection 219 being put on the fingers), and therefore the terminal device 200 can be held in a stabilized state without tiring the user, even if the terminal device 200 is relatively large-sized. That is, the projection 219 can be said to be a support for sustaining the housing 210 with fingers and can also said to be a finger rest.

Also, the projection 219 is provided above the center of the housing 210 with respect to the vertical direction. The projection 219 is positioned approximately opposite to the operating sections (the analog sticks 213A and 213B) provided on the front surface of the housing 210. Specifically, the protrusion is provided in an area including opposite positions to the operating sections provided to the right and left, respectively, of the display section. Accordingly, when manipulating the operating sections, the user can hold the terminal device 200 while supporting the projection 219 with his/her middle fingers or ring fingers (see FIGS. 27 and 28). Thus, the terminal device 200 can be readily held, and the operating sections can be manipulated more readily. Also, in the present embodiment, the protrusion is shaped like an overhang that extends side to side (at the projecting edge), and therefore the user can readily hold the terminal device 200 by placing his/her middle fingers or ring fingers along the bottom surface of the protrusion. Note that the projection 219 is not limited to the horizontally extending shape as shown in FIG. 26, so long as it is formed to extend toward the right and left sides (at the projecting edge). In another embodiment, the projection 219 may extend in a direction slightly slanted from the horizontal direction. For example, the projection 219 may be provided so as to be slanted upward (or downward) from both the right and left ends toward the center.

Note that in the present embodiment, the projection 219 having an overhang-like shape is employed as a protrusion to be formed on the back surface of the housing for the purpose of providing the projection 219 with a catch hole to be described later, but the protrusion may have any shape. For example, in another embodiment, two protrusions may be provided on the right and left sides of the back of the housing 210 (no protrusion is provided at the center in the horizontal direction; see FIG. 29). Also, in another embodiment, the protrusion may have a hooked shape (a shape with a concaved bottom surface) in cross section (perpendicular to the x-axis direction) such that the terminal device 200 can be securely supported by the user's fingers (the protrusion can have the fingers placed thereon in a more secure manner).

Note that the protrusions (projections 219) may be arbitrarily distanced from the top side and the bottom side of the housing 210. For example, the protrusions may be formed so as to project from the top side. Specifically, the top surfaces of the protrusions may be formed so as to be flush with the top surface of the housing 210. In this case, the housing 210 is configured in two terraced portions so as to be thinner in the lower portion and thicker in the upper portion. In this manner, the housing 210 preferably has downward-facing surfaces (the bottom surfaces of the protrusions) formed on the right side and the left side of the back surface. Thus, the user can easily hold the operating device by putting his/her fingers on the surfaces. Note that the "downward-facing surfaces" may be formed at any positions on the back surface of the housing 210, but it is preferable that they be positioned above the center of the housing 210.

As shown in FIGS. 25(*a*), 25(*b*) and 25(*c*), the first L button 214I and the first R button 214J are provided at the left and right edges on the top surface of the housing 210. In the present embodiment, the first L button 214I and the first R button 214J are provided at the upper (left and right) corners of the housing 210. Specifically, the first L button 214I is provided at the left edge of the top surface of the plate-like housing 210 so as to be exposed from the upper left-side surface (i.e., exposed both from the top surface and the left-side surface). The first R button 214J is provided at the right edge of the top surface of the housing 210 so as to be exposed from the upper right-side surface (i.e., exposed both from the top surface and the right-side surface). Thus, the first L button 214I is provided at such a position as to be operable by the user's left index finger, and the first R button 214J is provided at such a position as to be operable by the user's right index finger (see FIG. 27). Note that in another embodiment, the operating sections provided on the left and right sides of the top surface of the housing 210 do not have to be provided at the left and right edges and may be provided in any portions other than the edges. Also, the operating sections may be provided on the left- and right-side surfaces of the housing 210.

As shown in FIGS. 25(*c*) and 26, the second L button 214K and the second R button 214L are positioned on the protrusion (projection 219). The second L button 214K is provided near the left edge of the projection 219. The second R button 214L is provided near the right edge of the projection 219. Specifically, the second L button 214K is provided at a comparatively high position on the right side of the back surface of the housing 210 (i.e., the left side as viewed from the front surface side), and the second R button 214L is provided at a comparatively high position on the left side of the back surface of the housing 210 (i.e., the right side as viewed from the front surface side). In other words, the second L button 214K is provided at a position approximately opposite to the left analog stick 213A provided on the front surface, and the second R button 214L is provided at a position approximately opposite to the right analog stick 213B provided on the front surface. Thus, the second L button 214K is provided at such a position as to be operable by the user's left middle finger or index finger, and the second R button 214L is provided at such a position as to be operable by the user's right middle finger or index finger (see FIGS. 27 and 28). The second L button 214K and the second R button 214L are provided on the top surface of the projection 219, as shown in FIG. 25(*c*). Therefore, the second L button 214K and the second R button 214L have button faces directed (obliquely) upward. When the user holds the terminal device 200, the middle fingers or the index fingers will probably be able to move in the up/down direction, and therefore the button surfaces directed upward will allow the user to readily press the second L button 214K and the second R button 214L.

As described above, in the present embodiment, operating sections (the analog sticks 213A and 213B) are provided to the left and right of the display section (the LCD 211) above the center of the housing 210, and furthermore, other operating sections (the second L button 214K and the second R button 214L) are provided on the back side of the housing 210 at opposite positions corresponding to the operating sections on the front side. As a result, the operating sections are positioned on the front and back sides of the housing 210 so as to oppose each other with respect to the housing 210, and therefore the user can manipulate the operating sections while holding the housing 210 both from the front and back sides. Also, when manipulating the operating sections, the user holds the housing 210 in places above the center in the vertical direction, and therefore the user can hold the upper portions of the terminal device 200 while supporting the terminal device 200 with the palms (see FIGS. 27 and 28). Thus, the user can manipulate at least four operating sections while stably holding the housing 210, which makes it possible to provide an operating device (terminal device 200) which can be readily held by the user and offer superior operability.

As described above, in the present embodiment, by holding the terminal device 200 with the fingers put on the bottom surface of the protrusion (projection 219), the user can hold the terminal device 200 with ease. Also, since the second L button 214K and the second R button 214L are provided on the top surface of the protrusion, the user can readily operate the buttons while in the aforementioned state. The user can readily hold the terminal device 200, for example, in the following fashion.

Specifically, the user can hold the terminal device 200 with the ring fingers put on the bottom surface (indicated by the dashed line in FIG. 27) of the projection 219 (so as to support the projection 219 with the ring fingers), as shown in FIG. 27. In this case, the user can manipulate four buttons (the first L button 214I, the first R button 214J, the second L button 214K, and the second R button 214L) with the index fingers and the middle fingers. For example, in the case where the game operation to be performed requires using quite a few buttons and therefore is complicated, holding the device as shown in FIG. 27 enables easy manipulation of a number of buttons. Note that the analog sticks 213A and 213B are provided above the cross button 214A and the buttons 214E to 214H, and therefore where relatively complicated manipulation is required, the user can conveniently manipulate the analog sticks 213A and 213B with the thumbs. Also, in FIG. 27, the user holds the terminal device 200 with the thumbs on the front surface of the housing 210, the index fingers on the top surface of the housing 210, the middle fingers on the top surface of the projection 219 on the back surface of the housing 210, the ring fingers on the bottom surface of the projection 219, and the little fingers on the back surface of the housing 210. In this manner, the user can securely hold the terminal device 200 so as to wrap the housing 210 from all sides.

Furthermore, the user can also hold the terminal device 200 with the middle fingers put on the bottom surface (indicated by the dashed line in FIG. 28) of the projection 219, as shown in FIG. 28. In this case, the user can readily manipulate two buttons (the second L button 214K and the second R button 214L) with the index fingers. For example, in the case where the game operation to be performed requires using only a few buttons and therefore is relatively simple, the device may be held as shown in FIG. 28. In FIG. 28, the user can securely hold the terminal device 200 by holding the lower portion of the housing 210 with two pairs of fingers (the ring fingers and the little fingers).

Note that in the present embodiment, the projection 219 is provided so as to have its bottom surface positioned between the analog stick 213A and the cross button 214A and also between the analog stick 213B and the four buttons 214E to 214H (the bottom surface being positioned below the analog sticks 213A and 213B but above the cross button 214A and the four buttons 214E to 214H). Accordingly, in the case where the terminal device 200 is held with the ring fingers put on the projection 219 (FIG. 27), the analog sticks 213A and 213B can be readily manipulated with the thumbs, and in the case where the terminal device 200 is held with the middle fingers put on the projection 219 (FIG. 28), the cross button 214A and the four buttons 214E to 214H can be readily manipulated with the thumbs. Thus, in both of the above two cases, the user can perform operations of specifying directions while securely holding the terminal device 200.

Also, as described above, the user can hold the terminal device 200 lengthwise. Specifically, the user can hold the terminal device 200 longitudinally by holding the top side of the terminal device 200 with the left hand, as shown in FIG. 29. Moreover, the user can also hold the terminal device 200 longitudinally by holding the bottom side of the terminal device 200 with the left hand, as shown in FIG. 30. While the terminal device 200 is shown to be held by the left hand in FIGS. 29 and 30, it can be held by the right hand as well. In this manner, the user can hold the terminal device 200 with one hand, and therefore, for example, it is possible to perform an operation of providing input to the touch panel 212 with one hand while holding the terminal device 200 with the other hand.

Also, in the case where the terminal device 200 is held as shown in FIG. 29, the user can securely hold the terminal device 200 by putting fingers other than the thumb (in FIG. 29, the middle finger, the ring finger, and the little finger) on the bottom surface of the projection 219 (indicated by the dashed line in FIG. 29). Particularly in the present embodiment, since the projection 219 is formed so as to extend side to side (in FIG. 29, top to bottom), the user can put fingers other than the thumb on the projection 219 by holding the terminal device 200 with the hand in any position along the top side, which makes it possible to securely hold the terminal device 200. Accordingly, in the case where the terminal device 200 is used lengthwise, the projection 219 can be used as a handle. On the other hand, in the case where the terminal device 200 is held as shown in FIG. 30, the user can manipulate the buttons 214B to 214D with the left hand. Accordingly, for example, it is possible to provide input to the touch panel 212 with one hand while manipulating the buttons 214B to 214D with the hand holding the terminal device 200, which makes it possible to perform a larger number of operations.

Note that the terminal device 200 in the present embodiment has the protrusion (projection 219) provided at the back surface, and therefore when the terminal device 200 is placed with the screen of the LCD 211 (the front surface of the housing 210) facing up, the screen is set in slightly tilted state. As a result, the screen can be more readily viewed when the terminal device 200 is placed. In addition, it is also possible to readily perform an input operation on the touch panel 212 when the terminal device 200 is placed. Furthermore, in another embodiment, an additional protrusion about the same height as the projection 219 may be formed on the back surface of the housing 210. As a result, when the terminal device 200 is placed with the screen of the LCD 211 facing up, the protrusions contact the floor surface, so that the screen is kept horizontal. Furthermore, the additional protrusion may be of a detachable (or foldable) type. As a result, it becomes possible to place the terminal device with the screen being set either in slightly tilted state or in horizontal state. That is, when the terminal device 200 is placed and used, the projection 219 can be used as a leg.

The buttons 214A to 214L are each appropriately assigned a function in accordance with the game program. For example, the cross button 214A and the buttons 214E to 214H may be used for direction-specifying operations, selection operations, etc., whereas the buttons 214B to 214E may be used for setting operations, cancellation operations, etc. Also, the terminal device 200 may include a button for turning ON/OFF the screen display of the LCD 211, and a button for performing a connection setting (pairing) with the game device 3.

As shown in FIG. 25(a), the terminal device 200 has a marker section 215, including markers 215A and 215B, provided on the front surface of the housing 210. The marker section 215 is provided in the upper portion of the LCD 211. The markers 215A and 215B are each formed by one or more infrared LEDs, as are the markers 6R and 6L of the marker device 6. The infrared LEDs included in the markers 215A and 215B are disposed inside a window which transmits infrared light therethrough. The marker section 215 is used for the game device 3 to calculate the movement, etc., of the controller 5, as is the marker device 6 described above. The game device 3 can control the lighting of the infrared LEDs included in the marker section 215.

The terminal device 200 includes the camera 216 which is an image pickup means. The camera 216 includes an image pickup element (e.g., a CCD image sensor, a CMOS image sensor, or the like) having a predetermined resolution, and a lens. As shown in FIG. 25, the camera 216 is provided on the front surface of the housing 210 in the present embodiment. Therefore, the camera 216 can capture an image of the face of the user holding the terminal device 200, and can capture an image of the user playing a game while viewing the LCD 211, for example. In the present embodiment, the camera 216 is disposed between the two markers 215A and 215B.

Note that the terminal device 200 includes a microphone 239 which is a sound input means. A microphone hole 210c is provided in the front surface of the housing 210. The microphone 239 is provided inside the housing 210 behind the microphone hole 210c. The microphone 239 detects sounds around the terminal device 200 such as the voice of the user.

The terminal device 200 includes speakers 237 which are sound output means. As shown in FIG. 25(d), speaker holes 217 are provided in the lower portion of the front surface of the housing 210. Sound emitted by the speakers 237 is outputted from the speaker holes 217. In the present embodiment, the terminal device 200 includes two speakers, and the speaker holes 217 are provided at positions corresponding to the left and right speakers. Note that the terminal device 200 includes a knob 224 for controlling the volume of the speakers 237. Also, the terminal device 200 includes a sound output terminal 222 to be connected to a sound output member such as an earphone. Here, considering any additional device to be connected to the bottom surface of the housing, the sound output terminal 222 and the knob 224 are provided at the top surface of the housing 210, but they may be provided at the left- or right-side surface or the bottom surface.

Also, the housing 210 is provided with a window 223 for emitting an infrared signal derived from the infrared communication module 242 to the outside of the terminal device 200. Here, the window 223 is provided at the top surface of the housing 210, such that the infrared signal is emitted forward from the user holding both sides of the housing 210 just outside the LCD 211. However, in another embodiment, the window 223 may be provided in any other position such as the bottom surface.

Also, the terminal device 200 includes an expansion connector 218 for connecting another device to the terminal device 200. The expansion connector 218 is a communication terminal for transmitting/receiving data (information) to/from another device connected to the terminal device 200. In the present embodiment, the expansion connector 218 is provided at the bottom surface of the housing 210, as shown in FIG. 25(d). Any additional device may be connected to the expansion connector 218, including, for example, a game-specific controller (a gun-shaped controller or suchlike) or an input device such as a keyboard. The expansion connector 218 may be omitted if there is no need to connect any additional devices to terminal device 200. The expansion connector 218 may include a terminal for supplying power to an additional device and/or a charging terminal.

In addition to the expansion connector 218, the terminal device 200 also has a charging terminal 226 for obtaining power from an additional device. When the charging terminal 226 is connected to a predetermined charging stand, power is supplied from the charging stand to the terminal device 200. In the present embodiment, the charging terminal 226 is provided at the bottom surface of the housing 210. Accordingly, when the terminal device 200 and an additional device are connected, it is possible to supply power from one device to the other in addition to information exchange via the expansion connector 218. In this manner, by providing the charging terminal 226 around the expansion connector 218 (so as to sandwich the connector 218 from both the right and left sides), it becomes possible to, when the terminal device 200 and an additional device are connected, performs information exchange and power supply between them. Moreover, the terminal device 200 has a charging connector, and the housing 210 has a cover 221 to protect the charging connector. The charging connector is connectable to a charger 246 to be described later, and once the charging connector is connected to the charger, power is supplied from the charger 246 to the terminal device 200. In the present embodiment, the charging connector (cover 221) is provided at the top surface of the housing 210 considering that an additional device is connected to the bottom surface of the housing, but it may be provided at the right- or left-side surface or the bottom surface.

Also, the terminal device 200 has a battery lid 227 removable from the housing 210. A battery (battery 245 shown in FIG. 31) is disposed under the battery lid 227. In the present embodiment, the battery lid 227 is provided below the protrusion (projection 219) on the back surface of the housing 210.

Also, the housing 210 of the terminal device 200 has holes 225a and 225b provided therein for tying straps. In the present embodiment, the holes 225a and 225b are provided in the bottom surface of the housing 210, as shown in FIG. 25(d). Furthermore, in the present embodiment, the two holes 225a and 225b are provided one at each of the right and left sides of the housing 210. Specifically, the holes 225a and 225b are positioned to the left and right, respectively of the center at the bottom surface of the housing 210. The user may tie a strap to either the hole 225a or 225b, and attach the strap to his/her own wrist. As a result, in case the user drops the terminal device 200 or in case the terminal device 200 slips from the hand, it is possible to prevent the terminal device 200 from falling on the ground or floor or from hitting anything. Note that in the present embodiment, since the holes are provided both on the right and left sides, the user can conveniently attach the strap to either hand.

Note that for the terminal device 200 shown in FIGS. 25 to 30, the shape of the operation buttons and the housing 210, the number and arrangement of components, etc., are merely illustrative, and other shape, number, and arrangement may be employed.

Figure 31:
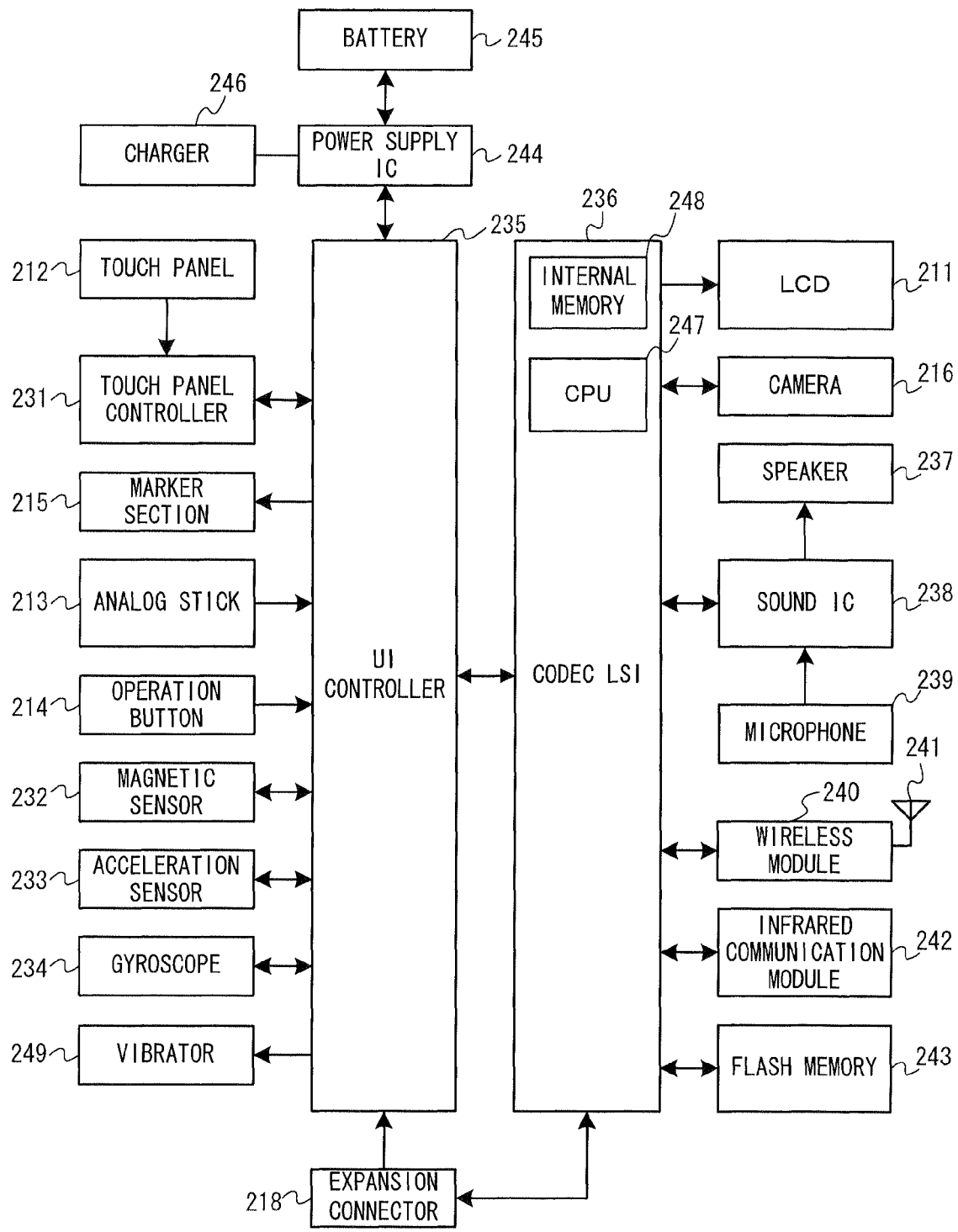
FIG. 31 is a block diagram illustrating an internal configuration of the terminal device shown in FIG. 25.

Next, an internal configuration of the terminal device 200 will be described with reference to FIG. 31. FIG. 31 is a block diagram illustrating an internal configuration of the terminal device 200. As shown in FIG. 31, in addition to the components shown in FIG. 25, the terminal device 200 includes a touch panel controller 231, a magnetic sensor 232, the acceleration sensor 233, the gyroscope 234, a user interface controller (UI controller) 235, a codec LSI 236, the speaker 237, a sound IC 238, the microphone 239, a wireless module 240, an antenna 241, an infrared communication module 242, flash memory 243, a power supply IC 244, a battery 245, and a vibrator 249. These electronic components are mounted on an electronic circuit board and accommodated in the housing 210.

The UI controller 235 is a circuit for controlling the input/output of data to/from various input/output sections. The UI controller 235 is connected to the touch panel controller 231, the analog sticks 213 (analog sticks 213A and 213B), the operation buttons 214 (operation buttons 214A to 214L), the marker section 215, the magnetic sensor 232, the acceleration sensor 233, the gyroscope 234, and the vibrator 249. The UI controller 235 is connected to the codec LSI 236 and the expansion connector 218. The power supply IC 244 is connected to the UI controller 235, and power is supplied to various sections via the UI controller 235. The built-in battery 245 is connected to the power supply IC 244 to supply power. A charger 246 or a cable with which power can be obtained from an external power source can be connected to the power supply IC 244 via a charging connector, and the terminal device 200 can be charged with power supplied from an external power source using the charger 246 or the cable. Note that the terminal device 200 can be charged by being placed in an unillustrated cradle having a charging function. Specifically, although not shown, the power supply IC 244 can be connected to a cradle which can obtain power from an external power supply, via the charging terminal 226, and the terminal device 200 can be charged with power supplied from the external power supply using the cradle.

The touch panel controller 231 is a circuit connected to the touch panel 212 for controlling the touch panel 212. The touch panel controller 231 generates touch position data of a predetermined format based on signals from the touch panel 212, and outputs it to the UI controller 235. The touch position data represents, for example, the coordinates of a position on the input surface of the touch panel 212 at which an input has been made. The touch panel controller 231 reads a signal from the touch panel 212 and generates touch position data once per a predetermined period of time. Various control instructions for the touch panel 212 are outputted from the UI controller 235 to the touch panel controller 231.

The analog stick 213 outputs, to the UI controller 235, stick data representing the direction and the amount of sliding (or tilting) of the stick portion operated with the user's finger. The operation button 214 outputs, to the UI controller 235, operation button data representing the input status of each of the operation buttons 214A to 214L (regarding whether it has been pressed).

The magnetic sensor 232 detects an azimuthal direction by sensing the magnitude and the direction of a magnetic field. Azimuthal direction data representing the detected azimuthal direction is outputted to the UI controller 235. Control instructions for the magnetic sensor 232 are outputted from the UI controller 235 to the magnetic sensor 232. While there are sensors using, for example, an MI (magnetic impedance) element, a fluxgate sensor, a Hall element, a GMR (giant magnetoresistance) element, a TMR (tunnel magnetoresistance) element, or an AMR (anisotropic magnetoresistance) element, the magnetic sensor 232 may be of any type so long as it is possible to detect the azimuthal direction. Strictly speaking, in a place where there is a magnetic field in addition to the geomagnetic field, the obtained azimuthal direction data does not represent the azimuthal direction. Nevertheless, if the terminal device 200 moves, the azimuthal direction data changes, and it is therefore possible to calculate the change in the attitude of the terminal device 200.

The acceleration sensor 233 is provided inside the housing 210 for detecting the magnitude of linear acceleration along each direction of three axes (the x-, y- and z-axes shown in FIG. 25(*a*)). Specifically, the acceleration sensor 233 detects the magnitude of linear acceleration along each axis, where the longitudinal direction of the housing 210 is taken as the x-axis, a direction perpendicular to the front-side surface of the housing 210 as the y-axis, and the width direction of the housing 210 as the z-axis. Acceleration data representing the detected acceleration is outputted to the UI controller 235. Also, control instructions for the acceleration sensor 233 are outputted from the UI controller 235 to the acceleration sensor 233. While in the present embodiment, the acceleration sensor 233 is assumed to be a capacitive MEMS acceleration sensor, for example, in another embodiment, an acceleration sensor of another type may be employed. The acceleration sensor 233 may be an acceleration sensor for detection in one axial direction or two axial directions.

The gyroscope 234 is provided inside the housing 210 for detecting angular rates about the three axes, i.e., the x-, y-, and z-axes. Angular rate data representing the detected angular rates is outputted to the UI controller 235. Also, control instructions for the gyroscope 234 are outputted from the UI controller 235 to the gyroscope 234. Note that any number and combination of gyroscopes may be used for detecting angular rates about the three axes, and similar to the gyroscope unit 6, the gyroscope 234 may include a two-axis gyroscope and a one-axis gyroscope. Alternatively, the gyroscope 234 may be a gyroscope for detection in one axial direction or two axial directions.

The vibrator 249 is, for example, a vibration motor or a solenoid, and is connected to the UI controller 235. The terminal device 200 is vibrated by actuation of the vibrator 249 based on a command from the UI controller 235. Therefore, the vibration is conveyed to the player's hand holding the terminal device 200, and thus a so-called vibration-feedback game is realized.

The UI controller 235 outputs, to the codec LSI 236, operation data including touch position data, stick data, operation button data, azimuthal direction data, acceleration data, and angular rate data received from various components described above. If another device is connected to the terminal device 200 via the expansion connector 218, data representing an operation performed on that device may be further included in the operation data.

The codec LSI 236 is a circuit for performing a compression process on data to be transmitted to the game device 3, and a decompression process on data transmitted from the game device 3. The LCD 211, the camera 216, the sound IC 238, the wireless module 240, the flash memory 243, and the infrared communication module 242 are connected to the codec LSI 236. The codec LSI 236 includes a CPU 247 and internal memory 248. While the terminal device 200 does not perform any game process itself, the terminal device 200 needs to execute a minimal set of programs for its own management and communication purposes. Upon power-on, the CPU 247 executes a program loaded into the internal memory 248 from the flash memory 243, thereby starting up the terminal device 200. Also, some area of the internal memory 248 is used as VRAM for the LCD 211.

The camera 216 captures an image in response to an instruction from the game device 3, and outputs data for the captured image to the codec LSI 236. Also, control instructions for the camera 216, such as an image pickup instruction, are outputted from the codec LSI 236 to the camera 216. Note that the camera 216 can also record video. Specifically, the camera 216 can repeatedly capture images and repeatedly output image data to the codec LSI 236.

The sound IC 238 is a circuit connected to the speaker 237 and the microphone 239 for controlling input/output of sound data to/from the speaker 237 and the microphone 239. Specifically, when sound data is received from the codec LSI 236, the sound IC 238 outputs to the speaker 237 a sound signal obtained by performing D/A conversion on the sound data so that sound is outputted from the speaker 237. The microphone 239 detects sound propagated to the terminal device 200 (e.g., the user's voice), and outputs a sound signal representing the sound to the sound IC 238. The sound IC 238 performs A/D conversion on the sound signal from the microphone 239 to output sound data of a predetermined format to the codec LSI 236.

The codec LSI 236 transmits, as terminal operation data, image data from the camera 216, sound data from the microphone 239 and operation data from the UI controller 235 to the game device 3 via the wireless module 240. In the present embodiment, the codec LSI 236 subjects the image data and the sound data to a compression process as the image compression section 27 does. The terminal operation data, along with the compressed image data and sound data, is outputted to the wireless module 240 as transmission data. The antenna 241 is connected to the wireless module 240, and the wireless module 240 transmits the transmission data to the game device 3 via the antenna 241. The wireless module 240 has a similar function to that of the high-speed wireless communication module 28 of the game device 3. Specifically, the wireless module 240 has a function of connecting to a wireless LAN by a scheme in conformity with the IEEE 802.11n standard, for example. Data to be transmitted may or may not be encrypted as necessary.

As described above, the transmission data to be transmitted from the terminal device 200 to the game device 3 includes operation data (terminal operation data), image data, and sound data. In the case where another device is connected to the terminal device 200 via the expansion connector 218, data received from that device may be further included in the transmission data. In addition, the infrared communication module 242 performs infrared communication with another device in accordance with, for example, the IRDA standard. Data received via infrared communication may be included as necessary in the transmission data to be transmitted to the game device 3 by the codec LSI 236.

As described above, compressed image data and sound data are transmitted from the game device 3 to the terminal device 200. These data items are received by the codec LSI 236 via the antenna 241 and the wireless module 240. The codec LSI 236 decompresses the received image data and sound data. The decompressed image data is outputted to the LCD 211, and images are displayed on the LCD 211. The decompressed sound data is outputted to the sound IC 238, and the sound IC 238 outputs sound from the speaker 237.

Also, in the case where control data is included in the data received from the game device 3, the codec LSI 236 and the UI controller 235 give control instructions to various sections in accordance with the control data. As described above, the control data is data representing control instructions for the components of the terminal device 200 (in the present embodiment, the camera 216, the touch panel controller 231, the marker section 215, sensors 222 to 224, and the infrared communication module 242). In the present embodiment, the control instructions represented by the control data are conceivably instructions to activate or deactivate (suspend) the components. Specifically, any components that are not used in a game may be deactivated in order to reduce power consumption, and in such a case, data from the deactivated components is not included in the transmission data to be transmitted from the terminal device 200 to the game device 3. Note that the marker section 215 is configured by infrared LEDs, and therefore is simply controlled for power supply to be ON/OFF.

While the terminal device 200 includes operating means such as the touch panel 212, the analog stick 213 and the operation button 214, as described above, in another embodiment, other operating means may be included in place of or in addition to these operating means.

Also, while the terminal device 200 includes the magnetic sensor 232, the acceleration sensor 233 and the gyroscope 234 as sensors for calculating the movement of the terminal device 200 (including its position and attitude or changes in its position and attitude), in another embodiment, only one or two of the sensors may be included. Furthermore, in another embodiment, any other sensor may be included in place of or in addition to these sensors.

Also, while the terminal device 200 includes the camera 216 and the microphone 239, in another embodiment, the terminal device 200 may or may not include the camera 216 and the microphone 239 or it may include only one of them.

Also, while the terminal device 200 includes the marker section 215 as a feature for calculating the positional relationship between the terminal device 200 and the controller 5 (e.g., the position and/or the attitude of the terminal device 200 as seen from the controller 5), in another embodiment, it may not include the marker section 215. Furthermore, in another embodiment, the terminal device 200 may include another means as the aforementioned feature for calculating the positional relationship. For example, in another embodiment, the controller 5 may include a marker section, and the terminal device 200 may include an image pickup element. Moreover, in such a case, the marker device 6 may include an image pickup element in place of an infrared LED.

As discussed above, the various systems, methods, and techniques described herein may be implemented in digital electronic circuitry, computer hardware, firmware, software, or in combinations of these elements. Apparatus embodying these techniques may include appropriate input and output devices, a computer processor, and a computer program product tangibly embodied in a non-transitory machine-readable storage device for execution by a programmable processor. A process embodying these techniques may be performed by a programmable processor executing a suitable program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language, if desired; and in any case, the language may be a compiled or interpreted language. Suitable processors include, by way of example, both general and special purpose microprocessors. Generally, a processor will receive instructions and data from a read-only memory and/or a random access memory. Non-transitory storage devices suitable for tangibly embodying computer program instructions and data include all forms of computer memory including, but not limited to, non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

As described above, the present invention can be applied to, for example, a game system or program for the purpose of, for example, displaying game images that can be readily viewed by players of a multiplayer game.

While the invention has been described in detail, the foregoing description is in all aspects illustrative and not restrictive. It is understood that numerous other modifications and variations can be devised without departing from the scope of the invention.

What is claimed is:

1. A game system comprising a game apparatus, an operating device, and a hand-held device, wherein,
the game apparatus includes:
a first receiver for receiving data transmitted from the operating device and the hand-held device;
a game processor configured to generate a virtual game space representing a result of a game control process based on first operation data representing a first player's operation on the operating device and second operation data representing a second player's operation on the hand-held device;
a first image generator configured to generate, from a 3D representation of the virtual game space by performing first 3D rendering on the 3D representation of the virtual game space, a first game image for the first player based on a first virtual camera set in the virtual game space, the first game image being an image of the game space as viewed from the position of the first virtual camera and in the attitude of the first virtual camera, the first game image representing a result of the game control process, the first image generator being further configured to perform the first 3D rendering based on the first virtual camera on the generated virtual game space, thereby generating the first game image;
a second image generator configured to generate, from said 3D representation of said virtual game space by performing a second 3D rendering on said 3D representation of the virtual game space, a second game image for the second player based on a second virtual camera set in the game space, the second game image being an image of the game space as viewed from the position of the second virtual camera and in the attitude of the second virtual camera, the second image generator being configured to perform the second 3D rendering based on the second virtual camera on the same virtual game space as the virtual game space from which the first game image is generated, thereby generating the second game image;
a first image output circuit for outputting the first game image to a first display device provided independently of the hand-held device; and
a second image output circuit for outputting the second game image to the hand-held device over a wireless connection using compression,
the operating device includes:
a first operation data output circuit for outputting the first operation data; and
a first operation data transmitter for transmitting the first operation data to the game apparatus, and
the hand-held device includes:
a second operation data output circuit for outputting the second operation data;
a second operation data transmitter for transmitting the second operation data to the game apparatus;
a second receiver for wirelessly receiving the compressed second game image from the game apparatus; and
a display processor for displaying the second game image on a second display device provided in the hand-held device; and
an orientation sensor that senses orientation of the hand-held device, wherein the second virtual camera is controlled at least in part based on the sensed orientation of the handheld device.

2. The game system according to claim 1, wherein,
the second operation data output circuit includes the orientation sensor for outputting data whose value changes in accordance with movement of the hand-held device,
the second operation data includes data outputted by the orientation sensor, and
the game processor performs game control in accordance with movement of the hand-held device, based on the second operation data.

3. The game system according to claim 2, wherein,
the orientation sensor comprises an acceleration sensor and/or a gyroscope, and
the second operation data includes acceleration data sensed by the acceleration sensor and/or angular rate data sensed by the gyroscope.

4. The game system according to claim 2, wherein the game processor performs game control for moving the second virtual camera in accordance with movement of the hand-held device, based on the second operation data.

5. The game system according to claim 2, wherein,
the first operation data output circuit includes the orientation sensor for outputting data whose value changes in accordance with movement of the operating device,
the first operation data includes data outputted by the orientation sensor, and
the game processor performs the game control process for controlling an object arranged in the same game space based on the first operation data.

6. The game system according to claim 1, wherein the game processor sets the first virtual camera such that the first game image includes a predetermined object whose action is controlled based on the first operation data.

7. The game system according to claim 1, wherein,
the first operation data output circuit includes a sensor for outputting data whose value changes in accordance with movement of the operating device,
the first operation data includes data outputted by the sensor, and
the game processor performs the game control process for controlling an object arranged in the game space based on the first operation data.

8. The game system according to claim 7, wherein,
the first operation data output circuit includes an acceleration sensor and/or a gyroscope, and
the first operation data includes acceleration data sensed by the acceleration sensor and/or angular rate data sensed by the gyroscope.

9. The game system according to claim 7, wherein,
the game processor executes instructions including:
first processing instructions for determining a moving direction of a predetermined moving object so as to change in accordance with movement of the hand-held device and moving the moving object in the determined moving direction;
second processing instructions for setting the first virtual camera such that a first game image including the moving object is generated;
third processing instructions for moving a predetermined operation object in accordance with movement of the operating device; and
fourth processing instructions for determining whether the moving object and the operation object have contacted or not and generating a game image in accordance with the determination result.

10. The game system according to claim 7, wherein,
the game processor executes instructions including:
behavior calculating instructions for calculating behavior of a predetermined moving object based on the first operation data, the behavior being determined in accordance with movement of the operating device, and moving the moving object based on the behavior;
second virtual camera moving instructions for moving the second virtual camera in accordance with movement of the hand-held device; and
second virtual camera determining instructions for determining whether or not the second virtual camera is directed toward a predetermined range including the moving object, and generating a game image in accordance with the determination result.

11. The game system according to claim 7, wherein the game processor performs game control in accordance with an operation of swinging the operating device and an operation of tilting the hand-held device, the swinging operation and the tilting operation being detected based on the first operation data and the second operation data, respectively.

12. The game system according to claim 1, wherein,
the game apparatus further includes a display setter for setting first display setting data and second display setting data, the first display setting data representing any object to be arranged in the game space but not to be rendered in the first game image, the second display setting data representing any object to be arranged in the game space but not to be rendered in the second game image,
the first image generator generates the first game image based on the first display setting data, and
the second image generator generates the second game image based on the second display setting data.

13. The game system according to claim 1, wherein,
the second operation data output circuit includes a touch panel provided on a screen of the second display device,
the second operation data includes touch data representing an input position on the touch panel, and
the game processor performs game control based on the touch data.

14. The game system according to claim 1, wherein,
the second operation data output circuit includes at least one operation button, and
the second operation data includes operation button data representing whether or not an input has been made with the operation button.

15. The game system according to claim 1, wherein,
the first data output circuit includes an image pickup,
the first operation data includes data representing a position of a predetermined imaging target in an image taken by the image pickup, and
the game processor performs the game control process for calculating a position on a screen of the first display device based on the data representing the position of the imaging target.

16. The game system according to claim 1, wherein the second virtual camera attitude is based on both a reference attitude and the attitude of the hand-held device.

17. The game system according to claim 1, wherein the attitude of the second virtual camera does not need to match the attitude of the handheld device but nevertheless changes in response to changes in the handheld device's attitude.

18. A game apparatus capable of communicating with an operating device and a hand-held device, the operating device being capable of transmitting first operation data including data whose value changes in accordance with movement of the operating device, the hand-held device being capable of transmitting second operation data including data whose value changes in accordance with movement of the hand-held device, the apparatus comprising:
an operation data acquisition circuit for acquiring the first operation data and the second operation data, respectively, from the operating device and the hand-held device;
a processor operatively coupled to the operation data acquisition circuit, the processor configured to:
generate a virtual game space representing a result of a process based on the first operation data and the second operation data,
control an object arranged in the virtual game space based on the first operation data, and
set a first virtual camera in the virtual game space;
a first image generator for generating a first game image for a first player operating the operating device by performing first 3D rendering on the 3D representation of the virtual game space, based on the first virtual camera and a 3D representation of the virtual game space as viewed from the position of the first virtual camera and in the attitude of the first virtual camera, including performing the first 3D rendering based on the first virtual camera on the generated virtual game space, thereby generating the first game image;
a second virtual camera setter for controlling a second virtual camera in the game space based on the second operation data to move in accordance with orientation of the hand-held device;
a second image generator for generating a second game image for a second player operating the hand-held device by performing second 3D rendering on said 3D representation of the virtual game space, based on the second virtual camera and said 3D representation of the virtual game space as viewed from the position of the second virtual camera and in the attitude of the second virtual camera, including performing the second 3D rendering based on the second virtual camera on the same virtual game space as the virtual game space from which the first game image is generated, thereby generating the second game image;
a first image output circuit for outputting the first game image to a first display device provided independently of the hand-held device; and
a second image output circuit for wirelessly transmitting the second game image using compression to the hand-held device so as to be displayed on a second display device provided in the hand-held device.

19. The game apparatus according to claim 18, wherein the processor is further configured to determine a moving direction of a predetermined moving object so as to change in accordance with movement of the hand-held device and moving the moving object in the determined moving direction, wherein,
the first virtual camera setter sets the first virtual camera such that a first game image including the moving object is generated,
the object control moves a predetermined operation object in accordance with movement of the operating device, and
the game apparatus further comprises a collision detector for determining whether the moving object and the operation object have contacted or not, the first and/or second image generators generating a game image in accordance with the determination result.

20. The game apparatus according to claim 18, wherein,
the processor is further configured to provide object control by calculating behavior of a predetermined moving object based on the first operation data, the behavior being determined in accordance with movement of the operating device, and moving the moving object based on the behavior, and
the game apparatus further comprises a virtual camera range detector for determining whether or not the second virtual camera is directed toward a predetermined range including the moving object, the first and/or second image generator generating a game image in accordance with the determination result.

21. A non-transitory computer-readable storage medium having stored therein a game program executable in a computer of a game apparatus capable of communicating with an operating device and a hand-held device, the operating device being capable of transmitting first operation data including data whose value changes in accordance with movement of the operating device, the hand-held device being capable of transmitting second operation data including data whose value changes in accordance with movement of the hand-held device, the program including instructions causing the computer to perform:
acquiring the first operation data and the second operation data, respectively, from the operating device and the hand-held device;
generating a virtual game space representing a result of a process based on the first operation data and the second operation data;
controlling an object arranged in the virtual game space based on the first operation data;
setting a first virtual camera in the virtual game space;
generating a first game image for a first player operating the operating device by performing first 3D rendering on the 3D representation of the virtual game space, based on the first virtual camera and a 3D representation of the virtual game space as viewed from the position of the first virtual camera and in the attitude of the first virtual camera, including performing the first 3D rendering based on the first virtual camera on the generated virtual game space, thereby generating the first game image;
controlling a second virtual camera in the virtual game space based on the second operation data to move in accordance with orientation of the hand-held device;
generating a second game image for a second player operating the hand-held device by performing second 3D rendering on said 3D representation of the virtual game space, based on the second virtual camera and said 3D representation of the virtual game space as viewed from the position of the second virtual camera and in the attitude of the second virtual camera, including performing the second 3D rendering based on the second virtual camera on the same virtual game space as the virtual game space from which the first game image is generated, thereby generating the second game image;
outputting the first game image to a first display device provided independently of the hand-held device; and
wirelessly transmitting the second game image using compression to the hand-held device so as to be displayed on a second display device provided in the hand-held device.

22. The non-transitory computer-readable storage medium according to claim 21, wherein,
the game program includes further instructions causing the computer to perform determining a moving direction of a predetermined moving object so as to change in accordance with movement of the hand-held device and moving the moving object in the determined moving direction,
the first virtual camera setting sets the first virtual camera such that a first game image including the moving object is generated,
the first object controlling moves a predetermined operation object in accordance with movement of the operating device, and
the game program further causes the computer to perform determining whether the moving object and the operation object have contacted or not and generating a game image in accordance with the determination result.

23. The non-transitory computer-readable storage medium according to claim 21, wherein,
the first object controlling calculates behavior of a predetermined moving object based on the first operation data, the behavior being determined in accordance with movement of the operating device, and moving the moving object based on the behavior, and
the game program includes further instructions causing the computer to perform determining whether or not the second virtual camera is directed toward a predetermined range including the moving object, and generating a game image in accordance with the determination result.

24. A game process method executed in a game system including a game apparatus having at least one processor, an operating device having at least one processor, and a hand-held device,
the method comprising:
receiving, with the game apparatus at least one processor, data transmitted from the operating device and the hand-held device;
performing, with the game apparatus at least one processor, a game control process based on first operation data representing a first player's operation on the operating device and second operation data representing a second player's operation on the hand-held device;
generating, with the game apparatus at least one processor, a virtual game space representing a result of a process based on the first operation data and the second operation data;
generating, with the game apparatus at least one processor based on a 3D representation of a virtual game space, a first game image for the first player by performing first 3D rendering on the 3D representation of the virtual game space based on a first virtual camera set in the virtual game space, the first game image being an image of the game space as viewed from the position of the first virtual camera and in the attitude of the first virtual camera, the first game image being an image of the game space and representing a result of the game control process, including performing the first 3D rendering based on the first virtual camera on the generated virtual game space, thereby generating the first game image;
generating, with the game apparatus at least one processor based on said 3D representation of the virtual game space, a second game image for the second player by performing a second 3D rendering on said 3D representation of the virtual game space based on a second virtual camera set in the game space including setting the second virtual camera based at least in part on sensed orientation of the handheld device, the second game image being an image of the game space as viewed from the position of the second virtual camera and in the attitude of the second virtual camera, including performing the second 3D rendering based on the second virtual camera on the same virtual game space as the virtual game space from which the first game image is generated, thereby generating the second game image;

outputting, with the game apparatus at least one processor, the first game image to a first display device provided independently of the hand-held device; and wirelessly outputting, with the game apparatus at least one processor using data compression, the second game image to the hand-held device, outputting, with the operating device at least one processor, the first operation data; and transmitting, with the operating device at least one processor, the first operation data to the game apparatus, outputting the second operation data;

transmitting the second operation data to the game apparatus;

wirelessly receiving, with the game apparatus at least one processor, the data-compressed second game image from the game apparatus; and displaying, with the game apparatus at least one processor, the second game image on a second display device provided in the hand-held device.

25. In a game system including (1) a game apparatus having at least one processor, (2) an operating device, and (3) a hand-held device having a display, a game processing method comprising:

outputting, from the operating device, first operation data representing a first player's operation of the operating device and transmitting the first operation data from the operating device to the game apparatus, outputting, from the hand-held device, second operation data representing a second player's operation of the hand-held device and transmitting the second operation data from the handheld device to the game apparatus;

receiving, with the game apparatus at least one processor, the first operation data transmitted from the operating device and the second operation data transmitted from the hand-held device;

performing, with the game apparatus at least one processor, a unified game control process using a common 3D virtual game space and based on the received first operation data and the received second operation data, including:

(a) providing the common 3D virtual game space with the game apparatus at least one processor, the common 3D virtual game space representing a result of a process the game apparatus at least one processor performs based on the received first operation data and the received second operation data;

(b) performing first 3D rendering of the common 3D virtual game space to generate a first game image from the position and attitude of a first virtual camera, the first game image being an image of the common 3D virtual game space and representing a first result of the unified game control process; and (c) performing second 3D rendering of the common 3D virtual game space to generate a second game image from the position and attitude of a second virtual camera different from the first virtual camera, the second game image being an image of the common 3D virtual game space and representing a further result of the same unified game control process;

outputting the first game image to a first display device provided independently of the hand-held device;

wirelessly outputting, using data compression, the second game image to the hand-held device, wirelessly receiving the data-compressed second game image from the game apparatus; and displaying the second game image on a second display device provided in the hand-held device;

the second virtual camera being controlled at least in part based on the sensed posture of the handheld device.

* * * * *